US007581798B2

(12) United States Patent
Arazaki

(10) Patent No.: US 7,581,798 B2
(45) Date of Patent: Sep. 1, 2009

(54) PRINTING DEVICE, PROGRAM FOR CONTROLLING PRINTING DEVICE, METHOD OF CONTROLLING PRINTING DEVICE, PRINTING DATA CREATING DEVICE, PROGRAM FOR CONTROLLING PRINTING DATA AND METHOD OF CREATING PRINTING DATA

(75) Inventor: Shinichi Arazaki, Shimosuwa (JP)

(73) Assignee: Seiko Epson Corporation (JP)

( * ) Notice: Subject to any disclaimer, the term of this patent is extended or adjusted under 35 U.S.C. 154(b) by 450 days.

(21) Appl. No.: 11/374,631

(22) Filed: Mar. 13, 2006

(65) Prior Publication Data

US 2006/0209109 A1 Sep. 21, 2006

(30) Foreign Application Priority Data

Mar. 15, 2005 (JP) ............................ 2005-072423
Dec. 7, 2005 (JP) ............................ 2005-353529

(51) Int. Cl.
*B41J 29/38* (2006.01)
*B41J 2/205* (2006.01)
*B41J 29/393* (2006.01)
*G06F 15/00* (2006.01)
*G06K 1/00* (2006.01)

(52) U.S. Cl. ............................ 347/12; 347/15; 347/19; 358/1.9

(58) Field of Classification Search .................. 347/12, 347/42
See application file for complete search history.

(56) References Cited

U.S. PATENT DOCUMENTS 6,283,571 B1 9/2001 Zhou et al.
6,293,643 B1 9/2001 Shimada et al.
6,328,404 B1 12/2001 Fujimori
6,908,176 B2 6/2005 Koitabashi et al.
7,201,462 B2 * 4/2007 Shibata et al. ................ 347/19
2003/0085939 A1 5/2003 Koitabashi et al.

FOREIGN PATENT DOCUMENTS

JP 01-235655 9/1989
JP 05-030361 2/1993
JP 05-092559 4/1993
JP 05-269990 10/1993
JP 11-151821 8/1999
JP 11-254662 9/1999
JP 2000-79710 3/2000
JP 2000-190470 7/2000
JP 2000-225716 8/2000
JP 2002-019101 1/2002
JP 2003-063043 3/2003
JP 2003-136702 5/2003

* cited by examiner

*Primary Examiner*—Matthew Luu
*Assistant Examiner*—Lisa M Solomon
(74) *Attorney, Agent, or Firm*—Harness, Dickey & Pierce, P.L.C.

(57) ABSTRACT

A printing device which prints an image on a printing medium by a printing head, the printing head having a plurality of nozzles for forming a dot on the printing medium, the printing device includes: a printing unit that executes a printing process for reducing deterioration of a printed image quality caused by a banding phenomenon; and a printing control unit that controls the printing process for reducing the deterioration based on nozzle information indicating a characteristic of each nozzle and characteristic information for every predetermined region of the image.

11 Claims, 23 Drawing Sheets

| COLOR | Bk | Cy | Mg | Ye |
|---|---|---|---|---|
| CONCENTRATION CONTROLLING THRESHOLD VALUE th | 25 | 30 | 30 | 60 |

| | | |
|---|---|---|
| | TARGET PIXEL | 7/16 |
| 3/16 | 5/16 | 1/16 |

EXTRACT ATTENTION DOT

AVOID BANDING
(CHANGE PIXEL SIZE ON THE BASIS OF DEVIATED DATA)

CHANGE TARGET PIXEL DOT

CHANGE DATA HAVING BEEN SUBJECTED
TO N-VALUE CONVERSION PROCESS

| | | |
|---|---|---|
| 1 (i-1, j-1) | −2 (i, j-1) | 1 (i+1, j-1) |
| −2 (i-1, j) | 3 (i, j) | −2 (i+1, j) |
| 1 (i-1, j+1) | −2 (i, j+1) | 1 (i+1, j+1) |

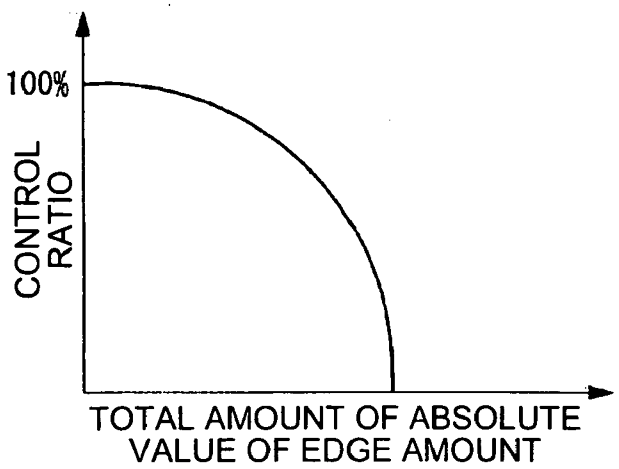
FIG.22
FIG.23A
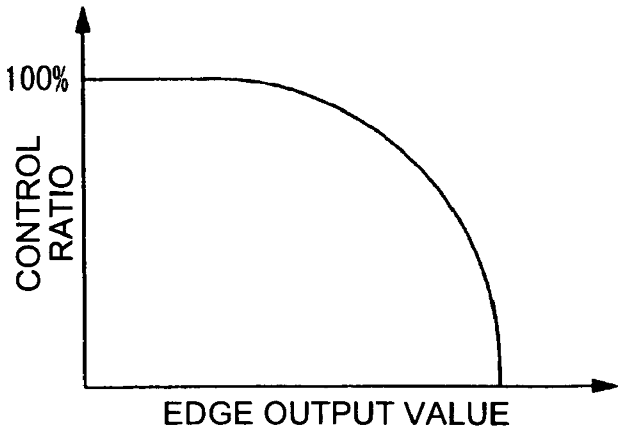
FIG.23B
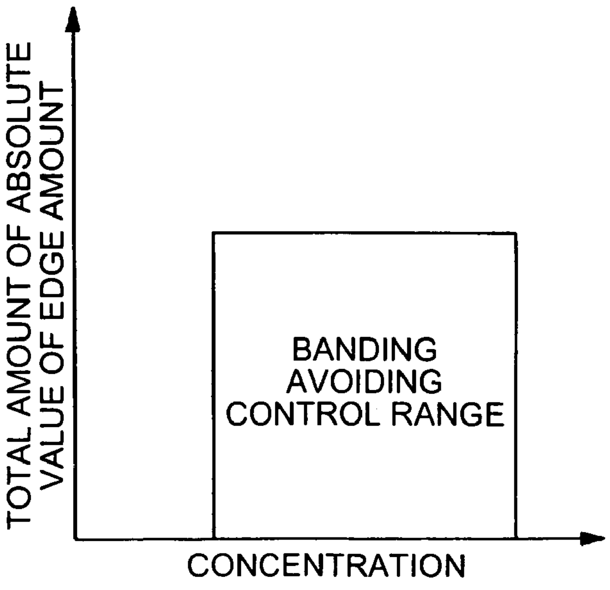

PRINTING DEVICE, PROGRAM FOR CONTROLLING PRINTING DEVICE, METHOD OF CONTROLLING PRINTING DEVICE, PRINTING DATA CREATING DEVICE, PROGRAM FOR CONTROLLING PRINTING DATA AND METHOD OF CREATING PRINTING DATA

RELATED APPLICATIONS

This application claims priority to Japanese Patent Application Nos. 2005-072423 filed Mar. 15, 2005 and 2005-353529 filed Dec. 7, 2005 which are hereby expressly incorporated by reference herein in their entirety.

BACKGROUND

1. Technical Field

The present invention relates to a printing device used for a facsimile device, a copy machine, an office automation (OA) device, or the like, a program for controlling a printing device, and a method of controlling a printing device. More particularly, the present invention relates to a printing device suitable for a so-called inkjet type printing process for ejecting minute particles of a plurality of colors of liquid ink onto printing paper (recording material) so as to draw a predetermined character or image, a program for controlling a printing device, a method of controlling a printing device, a printing data creating device, a program for creating printing data, and a method of creating printing data.

2. Related Art

Hereinafter, a printing device, particularly, an inkjet type of printer (hereinafter, referred to as 'inkjet printer') will be described.

Generally, since the inkjet printer has merits in that it is inexpensive and a color printing material of a high quality can be easily obtained, it has widely spread for office and general use as personal computers and digital cameras have widely spread.

This inkjet printer generally has the following structure. According to this structure, a movable body called a carriage, in which an ink cartridge and a printing head are integrally formed, ejects particles of liquid ink in a dot shape through nozzles of the printing head on a printing medium (paper) while reciprocally moving on the recording medium in a direction vertical to a paper transporting direction, and a predetermined character or image is drawn on the printing medium so as to create a desired printing material. In addition, the carriage includes ink cartridges of four colors (black, yellow, magenta, and cyan) including black and printing heads for the respective four colors, so that not only black-and-white printing but also full color printing having combined the respective colors are easily performed (In addition, ink cartridges of six colors including the above-mentioned four colors, light cyan, and light magenta or seven or eight colors has been practically used).

As such, in the inkjet printer in which the printing is performed while reciprocally moving the printing head of the carriage on the recording medium in a direction vertical to a paper transporting direction, the printing head needs to perform a reciprocal motion several tens of times to several hundred times or more so as to clearly perform printing corresponding to one page. Therefore, it takes a lot of time for the inkjet printer to perform printing, as compared with another type of printing device, for example, a laser printer using the electrophotographic technology of a copy machine or the like.

In the meantime, in an inkjet printer in which a printing head having a length corresponding to the same size (or a larger size) as a width of printing paper is arranged and a carriage is not used, since it is unnecessary for the printing head to move in a width direction of the printing paper and the printing can be made through so-called one scan (one pass), high speed printing can be performed in the same manner as the laser printer. In addition, since there is no need to provide the carriage mounting the printing heads thereon and a driving system moving it, a printer case becomes small-sized and light, and noise can be further reduced. The inkjet printer of the former is generally called a 'multipass-type printer' and the inkjet printer of the latter is generally called a 'line-head-type printer'.

In the meantime, in the printing head necessary for the inkjet printer, minute nozzles each having a very small diameter within a range of 10 to 70 μm are disposed in one row or a plurality of rows in a printing direction at predetermined intervals. As a result, an ink ejection direction of some nozzles may be inclined or the nozzle position may deviate from an ideal position due to a manufacturing error, so that a landing position of each dot formed by the nozzles may deviate from an ideal position, thereby causing a so-called 'flying curve phenomenon' to occur. In addition, the nozzles may have a large variation, each of which having an ink amount that increases or decreases extremely compared with an ideal ink amount, due to the variation characteristics of the nozzle.

As a result, a printing failure known as a so-called 'banding (stripe) phenomenon' occurs in a portion having been printed by using the defective nozzles, so that a printing quality may be extremely lowered. Specifically, if the 'flying curve' phenomenon occurs, the distance between dots ejected by adjacent nozzles does not become uniform. At this time, 'white stripes (in a case in which the printing paper is white)' occur in a portion where the distance between adjacent dots is larger than the normal distance, and 'thick stripes' occur in a portion where the distance between adjacent dots is smaller than the normal distance. In addition, even in a case in which an ink amount is different from an ideal ink amount, thick stripes occur in dots formed by the nozzles ejecting a large amount of ink, and white stripes occur in dots formed by the nozzles ejecting a small amount of ink.

Specifically, it is likely for the banding phenomenon to occur more in 'a line-head-type printer' where the printing head or the printing medium is fixed (one pass printing) than in the above-mentioned 'multipass-type printer' (in the multipass-type printer, there is a technology in which the printing head performs a reciprocal motion many times to prevent the banding from occurring).

For this reason, in order to prevent the printing failure caused by 'the banding phenomenon', research and development have been performed for hardware, such as improving a manufacturing technology of the printing head and design improving thereof. However, it is not possible to provide a printing head capable of preventing the 'banding phenomenon' perfectly because of the limits imposed by manufacturing cost or technology.

Accordingly, in addition to the improvement in the hardware, a technology which reduces the 'banding phenomenon' by using printing control, that is, a software-like method, which will be described in detail below, has been used.

For example, in JP-A-2002-19101 or JP-A-2003-136702, which will be described below, in order to resolve problems of the nozzle variation or non-ejection of the ink, the problem of the head variation is resolved by using a shading correction technology in a portion having the low printing density, and the problem of the banding or variation is resolved by using another color (for example, when being printed with black, cyan or magenta is alternatively used) in a portion having the high printing density.

Further, in JP-A-2003-63043, which will be described below, a method has been suggested in which for a solid image (that is, a base is covered such that the base is not seen), an ink ejection amount of each nozzle adjacent to the non-ejection nozzle is increased and a solid image is formed using all of nozzles.

Furthermore, in JP-A-05-30361, a method is used in which a variation amount of each nozzle is fed back to an error spreader, so that the variation of the ink ejection amount of the nozzle is absorbed, thereby preventing a banding phenomenon from occurring.

However, according to the methods disclosed in JP-A-2002-19101, JP-A-2003-136702, JP-A-2003-63043, and JP-A-5-30361, since the process, which reduces an image quality from being deteriorated due to the banding phenomenon, is controlled so as to be performed at all portions which become the process subject (locations where the banding occurs), a correction process is performed with respect to locations where deterioration of an image quality (banding phenomenon) is not observed even when the correction process is not performed. As a result, deterioration of another image quality may be observed at these locations due to the correction process.

SUMMARY

An advantage of some aspects of the invention is that it provides a printing device capable of avoiding or reducing deterioration of an image quality caused by a banding phenomenon occurring due to a flying curve phenomenon and controlling an execution range of a process for avoiding or reducing deterioration of an image quality, a program for controlling a printing device, a method of controlling a printing device, a printing data creating device, a program for creating printing data, and a method of controlling printing data.

Another advantage of some aspects of the invention is that it provides a printing device capable of avoiding or reducing deterioration of an image quality caused by a banding phenomenon occurring due to an ejection failure of ink and controlling an execution range of a process for avoiding or reducing deterioration of an image quality, a program for controlling a printing device, a method of controlling a printing device, a printing data creating device, a program for creating printing data, and a method of controlling printing data.

According to a first aspect of the invention, there is provided a printing device which prints an image on a printing medium by a printing head, the printing head having a plurality of nozzles for forming a dot on the printing medium. The printing device includes: a printing unit that executes a printing process for reducing deterioration of a printing quality caused by a banding phenomenon; and a printing control unit that controls a printing process for reducing the deterioration on the basis of nozzle information indicating a characteristic of each nozzle and characteristic information for every predetermined region of the image.

According to this aspect, the printing process, which reduces the deterioration of the printed image quality due to the banding phenomenon, can be executed by the printing unit, and the printing process, which reduces the deterioration of the printed image quality, can be controlled by the printing control unit on the basis of the nozzle information indicating the characteristic of each nozzle and the characteristic information of the image.

That is, so long as the creating process of the information for reducing the deterioration of the printed image quality due to the banding (the correction process of the pixel value or the like) is performed, the image quality is improved before performing the creating process of the information for reducing the deterioration of the image quality. However, if the correction process is performed, since the image deterioration (the color change, the deterioration of granularity, or the like) necessarily occurs. As a result, the control can be performed such that the correction process is performed as little as one can at the locations where the banding is not seen even though the banding occurs or the locations where the deterioration may increase more and more even though the correction process is performed.

Accordingly, for example, when executing the printing process for reducing the deterioration of the printed image quality such as 'the white stripes' or 'thick stripes' caused by 'the banding phenomenon' occurring by 'the flying curve phenomenon' of the nozzle whose dot forming position deviates from the ideal position, it is possible to control the execution content such as the existence and nonexistence of the execution of the printing process on the basis of the characteristic information of the predetermined region of the image corresponding to the banding phenomenon. Thereby, since the printing process can be executed at only locations where the process for reducing the image deterioration is necessary (for example, locations where the banding can be easily seen), it is possible to effectively reduce the deterioration of the printed image quality such as 'the white stripes' or 'thick stripes' caused by 'the banding phenomenon', and it is possible to suppress an adverse effect for the original quality of printed image caused by the process for reducing the corresponding image deterioration at the minimum.

In this case, the dot refers to one region formed by landing the ink ejected from one or a plurality of nozzles on the recording medium. In addition, the area of 'the dot' is not 'zero', the dot has a predetermined size (area), and a plurality of different kinds of dots exists for every size. However, the dot formed by ejecting the ink is not necessarily a circular shape. When the dot is formed to have an elliptical shape other than a circular shape, the average diameter may be handled as the dot diameter or by assuming an equivalent dot of a circular shape having the same area as an area of the dot formed by ejecting any amount of ink, the diameter of the equivalent diameter may be handled as the dot diameter. In addition, as a method of selectively impacting the dot having the different density, for example, a method of impacting each dot having the same dot size and the different density, a method of impacting each dot having the same density and the different dot size, and a method of differentiating the density of each dot having the same density and the different ink ejection amount by the overlapping impacting may be considered. In addition, in a case in which one ink drop ejected from one nozzle is divided into small ink drops and then lands, it is assumed as one dot. However, in a case in which dots of two or more sequentially formed from two nozzles or one nozzle are coupled with each other, it is assumed that two dots are formed. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the nozzle information' refers to information indicating whether each nozzle of the printing head is related to the banding or not, information which can determine whether each nozzle is related to the banding or not, or the like. For example, the nozzle information refers to information indicating the deviated amount from the ideal forming location of the actually formed dot, the information indicating the deviated amount between the actually formed dot size and the ideal dot size, and the information which can easily control each deviated amount (for example, format converted into a flag indicating whether each nozzle of the printing head is related to the banding or the like). Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the characteristic information' refers to specific information of each image obtained by analyzing the image data or the like, information indicating a color, a density, and a luminance of the image, and high-frequency information of the image (including information about the edge of the image). Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the adverse affect' refers to the deterioration of the granularity of the printed image which occurs by forming large dots (which is originally unnecessary) in order to reduce the deterioration of the printed image quality and mixing the large dots with each other. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, the 'banding phenomenon' refers to a printing failure in which 'white stripes' and 'thick stripes' simultaneously occur in the printing result because of a so-called 'flying curve phenomenon' caused by the nozzle whose dot forming position deviates from the ideal dot forming position. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the flying curve phenomenon' is different from the simple ink non-ejection phenomenon of some of nozzles, which has been described above. Specifically, it refers to a phenomenon that the ink is ejected, but the ink ejection direction of some of nozzles is inclined and the position of the dot deviates from the ideal position. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the white stripe' refers to a portion (region) where the phenomenon that the distance between adjacent dots becomes larger than the predetermined distance by 'the flying curve phenomenon' continuously occurs and the color of the base of the printing medium is visible in a stripe shape. In addition, 'the thick stripe' refers to a portion (region) where the phenomenon that the distance between adjacent dots becomes smaller than the predetermined distance by 'the flying curve phenomenon' continuously occurs and the color of the base of the printing medium is not seen or where the distance between the dots becomes smaller than the predetermined distance and the color of the base of the printing medium is relatively thickly seen or where a part of the dots formed so as to be deviated from the normal position overlaps the normal dot and the overlapping portion is visible in a thick stripe shape. In addition, the white stripe may occur due to the nozzle having a small ink ejection amount and the thick stripe may occur due to the nozzle having a large ink ejection amount. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the printing process for reducing the deterioration of the printed image quality' refers to the process which reduces the deterioration of the printed image quality which occurs due to the result that the dot forming location of the nozzle deviates from the ideal dot forming location. For example, it refers to a process by which the dot forming by using the nozzle is not made with respect to at least one of the nozzle related to the banding phenomenon and the nozzle adjacent to the nozzle related to the banding phenomenon or the dot is formed with the dot pattern in which the banding is not seen with respect to the image portion corresponding to the corresponding nozzle. However, the printing process about the dot forming content is different from the process about the dot forming content with respect to the same pixel value in a case of the normal nozzle which is not related to the banding phenomenon in the content. Hereinafter, this is applicable to 'a program for controlling a printing device' of the form 13, 'a method of controlling a printing device' of the form 24, various types of 'a recording medium where the program is recorded', and preferred embodiments, which will be described in detail below.

According to a second aspect of the invention, there is provided a printing device which prints an image on a printing medium by a printing head, the printing head having a plurality of nozzles for forming a dot on the printing medium. The printing device includes: a nozzle information storing unit that stores nozzle information indicating characteristics of the respective nozzle; an image data acquiring unit that acquires image data having a plurality of pixel data corresponding to a pixel value of an M value ($M \geqq 2$) constituting the image; a pixel data selecting unit that selects predetermined pixel data from the image data; a banding determining unit that determines whether the selected pixel data is related to a banding phenomenon or not on the basis of the nozzle information; a characteristic information extracting unit that extracts characteristic information of an image of a predetermined region formed by including a pixel of the selected pixel data having been determined that the selected pixel data is related to the banding phenomenon; a deterioration determining unit that determines whether deterioration of a printed image quality caused by the banding phenomenon is visible or not; a printing data creating unit that creates printing data having information about dot forming contents of each pixel value of the image data; and a printing unit that prints the image on the recording medium by the printing head on the basis of the printing data. Further, the printing data creating unit performs a process of creating information concerning the dot forming contents including the information for reducing the deterioration of the printed image quality caused by the banding phenomenon with respect to only a part or all of the image of the predetermined region having been determined in the deterioration determining unit that the deterioration of the printed image quality is visible.

According to this aspect, the nozzle information storing unit can store nozzle information indicating the characteristic of each nozzle, the image data acquiring unit can acquire image data having a pixel value of an M value (M≧2) constituting the image, the pixel data selecting unit can select the predetermined image data from the image data, the banding determining unit can determine whether selected pixel data is related to the banding phenomenon or not on the basis of the nozzle information, the characteristic information extracting unit can extract the characteristic amount of the image of the predetermined region constructed by including the pixel of the pixel data determined by the banding determining unit that the image data is related to the banding phenomenon, the deterioration determining unit can determine whether the deterioration of the printed image quality due to the banding phenomenon is visible or not on the basis of the characteristic information, the printing data creating unit can create the printing data having the information related to the dot forming content for each pixel value of the image data, and the printing unit can print the image on the printing medium by using the printing head on the basis of the printing data.

Further, the printing data creating unit can perform a creating process of information about the dot forming contents including the information for reducing the deterioration of the printed image quality caused by the banding phenomenon with respect to only a part or all of the image of the predetermined region having been determined by the deterioration determining unit that the deterioration of the printed image quality is visible.

That is, so long as the creating process of the information for reducing the deterioration of the printed image quality due to the banding is performed, the image quality is improved before performing the creating process of the information for reducing the deterioration of the image quality. However, if the correction process is performed, since the image deterioration (the color change, the deterioration of granularity, or the like) necessarily occurs. As a result, the control can be performed such that the printing data creating process is performed as little as one can at the locations where the banding is not seen even though the banding occurs or the locations where the deterioration may increase more and more even though the correction process is performed.

Accordingly, for example, when executing the printing process for reducing the deterioration of the printed image quality such as 'the white stripes' or 'thick stripes' caused by 'the banding phenomenon' occurring by 'the flying curve phenomenon' of the nozzle whose dot forming position deviates from the ideal position, it is possible to control the execution content such as the existence and nonexistence of the execution of the printing process on the basis of the characteristic information of the predetermined region of the image corresponding to the banding phenomenon. Therefore, it is possible to effectively reduce the deterioration of the printed image quality such as 'the white stripes' or 'thick stripes' caused by 'the banding phenomenon', and it is possible to suppress an adverse effect for the original quality of printed image caused by the process for reducing the corresponding image deterioration at the minimum.

In addition, the image data acquiring unit acquires the image data inputted from an optical printing result reading unit such as a scanner or actively or passively acquires the image data stored in the external device through a network such as a LAN or a WAN, or acquires the image data from the recording medium such as a CD-ROM, a DVD-ROM or the like through a driving device such as a CD drive, a DVD drive or the like included in the printing device, or acquires the image data stored in the storage device included in the printing device. That is, the acquiring of the image data includes input, obtainment, reception or reading. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the nozzle information storing unit' stores the nozzle information in all of the storing units at all times. In addition, it may store the nozzle information in advance and may store the nozzle information through the input from the external device at the time of operating the printing device without storing the nozzle information in advance. For example, before the printing device is manufactured and is then sold as the product at the time of a shipment in a factory, by an optical printing result reading unit such as a scanner or the like, the variation amount of the dot forming position of each nozzle constituting the printing head or the ink ejection state is tested from the printing result by the printing head and the test result is stored in advance. Alternatively, at the time of using the printing device, in the same manner as the time of shipment in the factory, the variation amount of the dot forming position of each nozzle constituting the printing head is tested, and the test result is stored. Like this, if being timing when the nozzle information can be stored at the time of using the product, any timing may be possible. In addition, after the printing device is used, in order to cope with the case in which the characteristic of the printing head is changed, the deviation amount of the position printed by the printing head or the ink ejection state of each nozzle is tested from the printing result through the printing head by using the optical printing result reading unit such as the scanner or the like, and the tested result and the data at the time of a shipment in the factory are stored or the tested result is overwritten on the data at the time of a shipment in the factor so as to be updated. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below).

In addition, 'the pixel data determined that it is related to the banding phenomenon' refers to the pixel data in which the dot corresponding to the selected pixel data is formed by the nozzle causing 'the flying curve phenomenon to occur and the dot forming location deviates from the ideal dot forming location, or the pixel data in which the dot is formed by the nozzle having the non-proper ink ejection amount and the corresponding dot forming size is different from the ideal dot forming size. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, the information related to the dot forming content of the nozzle includes information, such as information about the dot existence or non-existence with respect to each pixel value of the image data (indicating where the dot is formed or not by the nozzle) and information about the dot forming size (for example, any one of three kinds of large, middle, and small), which are necessary for forming the dot by the nozzle. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, 'the information for reducing the deterioration of the printed image quality' refers to the information that reduces the deterioration of the printed image quality occurring when the dot forming location by the nozzle is deviated from the ideal location. For example, it becomes a type of information which is related to the dot forming content like a case in which the dot is not formed by at least one of the nozzle related to the banding or the peripheral nozzle of the corresponding nozzle or a case in which the dot is formed with the dot pattern in which the banding is not seen with respect to the image portion corresponding to the nozzle related to the banding. The information related to the dot forming content is different from the information related to the dot forming content in the case with respect to the same pixel value and the normal nozzle not related to the banding in the contents. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

In addition, examples of the process for creating the information, which is related to the dot forming content including the information for reducing the deterioration of the printed image quality due to the banding phenomenon, include the printing data creating processes for avoiding or reducing the deterioration of the printed image quality due to the banding phenomenon, which are respectively disclosed in JP-A-2004-292205, JP-A-2004-339909, JP-A-2004-359542, JP-A-2005-016490, and JP-A-2005-035641. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

Preferably, the deterioration determining unit compares a characteristic amount indicating the characteristic information with a predetermined threshold value, and determines that the deterioration of the printed image quality caused by the banding phenomenon is visible, when the characteristic amount is equal to or greater than the predetermined threshold value.

According to this structure, in accordance with the nature of the characteristic, for example, by setting the threshold value obtained by the experiment or the like, it is possible to easily determines whether the deterioration of the printed image quality due to the banding phenomenon is visible or not.

Preferably, the printing device further includes a region dividing unit that divides the image data region into a plurality of image data region. Further, an image of each of the plurality of image data region is set as an image of the predetermined region, and the characteristic information extracting unit extracts the characteristic information for each image of the predetermined region.

According to this structure, the image data region is previously divided into the plurality of image data regions, and the image of each image data region is set to the image of the predetermined region. Therefore, it is possible to perform each determination process at a high speed without setting a predetermined region for each of the selected pixel data.

Preferably, the characteristic information includes density information of the image of the predetermined region.

According to this structure, since the number of the physically formed dots is small in a region where the density (the luminance is high) is thin, it is difficult for the deviation of the deviation of one nozzle to be seen (since the distance between the forming location of the physically formed dot and the forming location of another dot increases, the deviation amount relatively decreases). Further, in this region, the area density difference (luminance difference) with the medium used for the printing (for example, the printing medium) becomes smaller, and even though deviation occurs in the dot forming location, it is not seen. Accordingly, the control is performed on the basis of the luminance information such that the printing process or the information forming process for reducing the deterioration of the printed image quality due to the banding phenomenon is not performed in a portion where the banding is not seen, so that the above-mentioned processes can be performed at only the suitable portion, and it is possible to obtain the printed result in which the process for reducing the deterioration of the printed image quality is suitably performed.

In this case, the density information refers to the information about the density of the image represented with the density value or the luminance value. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

Preferably, the characteristic information extracting unit extracts density information for each color of ink corresponding to the printing head.

According to this structure, the printing process or the information creating process for reducing the deterioration of the printed image quality due to the banding phenomenon can controlled on the basis of the density information extracted for ink of each color, and the control can be properly performed for ink of each color. It is possible to obtain the printed result in which the process is properly performed for reducing the deterioration of the printed image quality.

Preferably, the printing data creating unit performs a process of creating information concerning the dot forming contents including the information for reducing the deterioration of the printed image quality caused by the banding phenomenon with respect to only a part or all of the image of the predetermined region which is determined in the deterioration determining unit that the deterioration of the printed image quality is visible and of which a density value indicating the density information is equal to or greater than a predetermined density value.

According to this structure, the control is performed such that for example, the creating process of information about the dot forming contents including the information for reducing the deterioration of the printed image quality caused by the banding phenomenon is performed with respect to the pixel data within the density range of the halftone and the density range of the high density, and such that the creating process of the information for reducing the deterioration of the printed image quality is not performed with respect to the low density region where the deterioration of the printed image quality due to the banding phenomenon is seldom seen. Accordingly, it is possible to obtain the printed result in which the process for reducing the deterioration of the printed image quality is properly performed.

In this case, preferably, the density value, which is equal to or greater than the predetermined density value, becomes the density within the halftone and the high density, as described above. Therefore, for example, in the case of CMYK, if the number of the maximally printed dots becoming the maximum density of each color (different for each kind of the printing device) is set to 100%, the black (Bk) becomes, for example, the density value of the density range which is equal to or greater than 25% of the number of the maximally printed dots, the cyan (Cy) and the magenta (Mg) become, for example, the density value of the density range which is equal to or greater than 30% of the number of the maximally printed dots, and the yellow (Ye) becomes, for example, the density value of the density range which is equal to or greater than 60% of the number of the maximally printed dots. Hereinafter, this is applicable to various types of ‘a program for controlling a printing device’, various types of ‘a method of controlling a printing device’, various types of ‘a printing data creating device’, various types of ‘a program for creating printing data’, various types of ‘a method of creating printing data’, various types of ‘a recording medium where the program is recorded’, and preferred embodiments, which will be described in detail below.

Preferably, the printing data creating unit performs a process of creating information concerning the dot forming contents including the information for reducing the deterioration of the printed image quality caused by the banding phenomenon with respect to only a part or all of the image of the predetermined region which is determined in the deterioration determining unit that the deterioration of the printed image quality is visible and of which a density value indicating the density information is within a density range of a halftone.

According to this structure, the control is performed such that for example, the creating process of information about the dot forming contents including the information for reducing the deterioration of the printed image quality caused by the banding phenomenon is performed with respect to the pixel data within the density range of the halftone (in other words, “middle tone”), and such that the creating process of the information for reducing the deterioration of the printed image quality is not performed with respect to the low density region and the high density region other than the halftone range where the deterioration of the printed image quality due to the banding phenomenon is seldom seen. Accordingly, it is possible to obtain the printed result in which the process for reducing the deterioration of the printed image quality is properly performed.

In this case, the halftone density range is different for each ink color. For example, in the case of CMYK, if the number of the maximally printed dots becoming the maximum density of each color (different for each kind of the printing device) is set to 100%, the density range which becomes 25 to 90% of the number of the maximally printed dots becomes the halftone density range in the black (Bk), the density range which becomes 30 to 90% of the number of the maximally printed dots becomes the halftone density range in the cyan (Cy) and the magenta (Mg), and the density range which becomes 60 to 90% of the number of the maximally printed dots becomes the halftone density range in the yellow (Ye). However, the halftone density range needs to be set in accordance with a dot production rate, the function of the printing device, a binarization method, or the like, in addition to the ink color. Hereinafter, this is applicable to various types of ‘a program for controlling a printing device’, various types of ‘a method of controlling a printing device’, various types of ‘a printing data creating device’, various types of ‘a program for creating printing data’, various types of ‘a method of creating printing data’, various types of ‘a recording medium where the program is recorded’, and preferred embodiments, which will be described in detail below.

Preferably, the characteristic information includes frequency information of the image of the predetermined region.

According to this structure, for example, in a portion where the frequency of the image of the predetermined region is low, it is difficult to visually recognize the banding caused by the deviation of the nozzle characteristic. In addition, in a region where the frequency is high, that is, a region where the image content (luminance or density) frequently changes, it is not almost possible to visually recognize the banding caused by the image change. In the region where it is difficult to perform the visual recognition, the control is performed such that the information creating process or the printing process for reducing the deterioration of the printed image quality due to the banding phenomenon is not performed. Therefore, the above-mentioned processes can be performed in only the proper portions, so that it is possible to obtain the printed result in which the process for reducing the deterioration of the printed image quality is more properly performed.

In this case, the frequency information refers to the information which is capable of determining whether the frequency of the image of the predetermined region is high or low, like the information of the output value after performing the filtering using an HPF (bypass filter) or the information obtained by converting the image signal into the frequency region through Fourier transform (FT, FFT, or the like), discrete cosine transform (DCT), Hadamard transform, or the like. Hereinafter, this is applicable to various types of ‘a program for controlling a printing device’, various types of ‘a method of controlling a printing device’, various types of ‘a printing data creating device’, various types of ‘a program for creating printing data’, various types of ‘a method of creating printing data', various types of 'a recording medium where the program is recorded', and preferred embodiments, which will be described in detail below.

Preferably, the frequency information includes edge information of the image of the predetermined region.

According to this structure, it is possible to easily extract the edge information of each predetermined region serving as the frequency information by an edge extracting filter or the like, and it is possible to apprehend the image change of each region (level of the frequency) from the edge information. The control can be performed on the basis of the above-mentioned information such that the printing process or the information creating process for reducing the deterioration of the printed image quality due to the banding phenomenon is not formed in a portion where the banding is not seen. Therefore, it is possible to perform the above-mentioned process at only the proper portion, and it is possible to obtain the printing result in which the process for reducing the deterioration of the printed image quality is properly performed.

Preferably, the characteristic information extracting unit extracts the frequency information for each color of ink corresponding to the printing head.

According to this structure, the printing process or the information creating process for reducing the deterioration of the printed image quality due to the banding phenomenon is controlled on the basis of the frequency information of each color, so that the proper control can be performed for each color. Accordingly, it is possible to obtain the printed result in which the process for reducing the printed image quality is properly performed.

Preferably, the printing data creating unit performs a creating process of information including the information for reducing the deterioration of the printed image quality caused by the banding phenomenon as information about the dot forming contents with respect to only a part or all of the image of the predetermined region which is determined in the deterioration determining unit that the deterioration of the printed image quality is visible and of which a frequency indicating the frequency information is not more than a predetermined frequency.

According to this structure, for example, in a portion where the frequency of the image of the predetermined region is low, it is difficult to visually recognize the banding caused by the deviation of the nozzle characteristic. In addition, in a region where the frequency is high, that is, a region where the image content (luminance or density) frequently changes, it is not almost possible to recognize visually the banding caused by the image change. In the region where it is difficult to perform the visual recognition, the control is performed such that the information creating process or the printing process for reducing the deterioration of the printed image quality due to the banding phenomenon is not performed. Therefore, the above-mentioned processes can be performed in only the proper portions, so that it is possible to obtain the printed result in which the process for reducing the deterioration of the printed image quality is more properly performed.

Preferably, the nozzle information includes information indicating whether an ink ejection failure of each nozzle exists or not.

According to this structure, it is possible to simply determine the nozzle having the ink ejection failure that causes the banding to occur. Thereby, the printing process or the information creating process for reducing the deterioration of the printed image quality due to the banding phenomenon can be performed with respect to only at least of the pixel data corresponding to the nozzle having the ink ejection failure that causes the banding to occur or the peripheral pixel data of the pixel data corresponding to the nozzle having the ink ejection failure. Therefore, it is possible to reduce the deterioration of the image quality occurring in the printed result due to the banding phenomenon without changing by the reduction process the image quality of the portion which is not related to the banding.

In this case, the ink ejection failure refers to a state in which the ideal ink ejection cannot be performed, like a case in which the ink cannot be ejected, a case in which the ink ejection amount is insufficient, a case in which the ink ejection amount is excessively much, a case in which the ink cannot be ejected onto the ideal location, or the like. In addition, since the CCD sensor provided in the printing device can detect whether the ink ejection failure exists or not in the corresponding nozzle, it is possible to create the information indicating whether the ink ejection failure exists or not on the basis of the detected result. Hereinafter, this is applicable to various types of 'a program for controlling a printing device', various types of 'a method of controlling a printing device', various types of 'a printing data creating device', various types of 'a program for creating printing data', various types of 'a method of creating printing data', various types of 'a recording medium where the program is recorded', and preferred embodiments, which will be described in detail below.

Preferably, the nozzle information includes information of a positionally deviated amount between an actual forming position of the dot and an ideal forming position of the dot in each nozzle.

According to this structure, it is possible to easily discriminate the nozzle which causes 'the so-called flying curve phenomenon' occurring by the phenomenon that the dot forming location deviates from the ideal dot forming location. Therefore, it is possible to reduce, with the proper control content, the deterioration of the printed image quality, such as 'the white stripes' or 'the thick stripes', which occurs by 'the banding phenomenon' caused by 'the flying curve phenomenon'.

Preferably, the nozzle information includes information about a deviated amount between a density value of the dot which each nozzle actually forms and an ideal density value of the corresponding dot.

According to this structure, it is possible to easily discriminate the nozzle which causes 'the so-called density deviation' occurring by the phenomenon that the density of the formed dot deviates from the ideal density. Therefore, it is possible to reduce, with the proper control content, the deterioration of the printed image quality, such as 'the white stripes' or 'the thick stripes', which occurs by 'the banding phenomenon' caused by 'the density deviation'.

Preferably, in the printing head, the nozzles are continuously arranged over a range larger than a region where the printing medium is mounted, and the printing head can perform printing through one scanning operation.

According to this structure, as described above, it is possible to create the printing data suitable for making not be seen the deterioration of the printed image quality, such as 'the white stripes' or 'the thick stripes' caused by the banding phenomenon, which easily occurs in particular when the using the line-head-type printing head in which the printing is completed with so-called one scanning (one pass).

In this case, 'the printing of one scanning' means to the printing method in which with respect to the one line of the paper transporting direction becoming the printing subject (head moving direction), the one line is printed with only the corresponding nozzles of the respective nozzles which correspond to the one line, and when the corresponding nozzles pass once, the printing of the one line is completed. Hereinafter, this is applicable to various types of ‘a program for controlling a printing device’, various types of ‘a method of controlling a printing device’, various types of ‘a printing data creating device’, various types of ‘a program for creating printing data’, various types of ‘a method of creating printing data’, various types of ‘a recording medium where the program is recorded’, and preferred embodiments, which will be described in detail below.

Preferably, the printing head performs printing while performing a reciprocal motion in a direction orthogonal to a paper transporting direction of the printing medium.

The above-mentioned banding phenomenon strikingly occurs in the line-head-type printing head, but it occurs in the multipass-type printing head. Accordingly, if the above-mentioned printing method according to the above-mentioned aspect is applied to the multipass-type printing head, ‘the white stripes’ or ‘the thick stripes’, which is caused by ‘the banding phenomenon’ occurring in the multipass-type printing head are not seen, so that it is possible to perform the proper printing process or printing data creating process.

In addition, in the case of the multipass-type printing head, the above-mentioned banding phenomenon can be avoided by performing the process which repeats the scanning of the printing head, but if the printing device according to the above-mentioned aspect is applied, since it is not necessary to repeatedly perform the scanning operation many times at the same locations by using the printing head, it is possible to achieve the high-speed printing.

According to a third aspect of the invention, there is provided a program for controlling a printing device which is used for controlling the printing device which prints an image on a printing medium by a printing head, the printing head having a plurality of nozzles for forming a dot on the printing medium, the program being used to allow a computer to execute: executing a printing process for reducing deterioration of a printed image quality caused by a banding phenomenon; and controlling a printing process for reducing the deterioration on the basis of nozzle information indicating a characteristic of each nozzle and characteristic information for every predetermined region of the image.

According to this structure, if the computer reads out the program and then executes the process in accordance with the read program, it is possible to achieve the same effects as the first aspect of the invention.

In addition, all of the printing devices, such as the inkjet printer or the like, which are on the market, includes a computer system having a central processing unit (CPU), storing units (RAM and ROM), and an input/output unit. In addition, since the respective units can be implemented through software by the computer system, it may be chiefly and easily achieved, as compared with the case in which the respective units are implemented by creating the exclusive hardware.

In addition, updated versions may be easily made by the function change or improvement through the change of the portion of the program. Hereinafter, this is applicable to ‘a program for controlling a printing device’ according to the aspect, and preferred embodiments, which will be described in detail below.

According to a fourth aspect of the invention, there is provided a program for controlling a printing device which is used for controlling the printing device which prints an image on a printing medium by a printing head, the printing head having a plurality of nozzles for forming a dot on the printing medium, the program being used to allow a computer to execute: acquiring image data having a plurality of pixel data corresponding to a pixel value of an M value ($M \geqq 2$) constituting the image; selecting predetermined pixel data from the image data; determining whether the selected pixel data is related to a banding phenomenon or not on the basis of the nozzle information; extracting characteristic information of an image of a predetermined region formed by including a pixel of the pixel data selected from the image data which is determined by the determining of the banding that the selected pixel data is related to the banding phenomenon; determining whether deterioration of a printed image quality caused by the banding phenomenon is visible or not on the basis of the characteristic information; creating printing data having information about dot forming contents of each pixel value of the image data; and printing the image on the recording medium by the printing head on the basis of the printing data. In addition, during the creating of the printing data, performed is a creating process of information about the dot forming contents including the information for reducing the deterioration of the printed image quality caused by the banding phenomenon with respect to only a part or all of the image of the predetermined region having been determined in the determining of the deterioration that the deterioration of the printed image quality is visible.

According to this structure, if the computer reads out the program and then executes the process in accordance with the read program, it is possible to achieve the same effects as the printing device according to the second aspect of the invention.

Preferably, during the determination of the deterioration degree, when a characteristic amount indicating the characteristic information is compared with a predetermined threshold value and the characteristic amount is equal to or greater than the predetermined threshold value, it is determined that the deterioration of the printed image quality caused by the banding phenomenon is visible.

According to this structure, if the computer reads out the program and then executes the process in accordance with the read program, it is possible to achieve the same effects as the printing device according to the second aspect of the invention.

Preferably, in the program for controlling a printing device, the process executed by the computer further includes: dividing the image data region into a plurality of image data region. Further, an image of each of the plurality of image data regions is set as an image of the predetermined region. Furthermore, during the extracting of the characteristic information, the characteristic information is extracted for each image of the predetermined region.

According to this structure, if the computer reads out the program and then executes the process in accordance with the read program, it is possible to achieve the same effects as the printing device according to the second aspect of the invention.

Preferably, the characteristic information includes density information of the image of the predetermined region.

According to this structure, if the computer reads out the program and then executes the process in accordance with the read program, it is possible to achieve the same effects as the printing device according to the second aspect of the invention.

Preferably, during the extracting of the characteristic information, density information is extracted for each color of ink corresponding to the printing head.

According to this structure, if the computer reads out the program and then executes the process in accordance with the read program, it is possible to achieve the same effects as the printing device according to the second aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is equal to or greater than a predetermined density value.

According to this structure, if the computer reads out the program and then executes the process in accordance with the read program, it is possible to achieve the same effects as the printing device according to the second aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is within a density range of a halftone.

According to this structure, if the computer reads out the program and then executes the process in accordance with the read program, it is possible to achieve the same effects as the printing device according to the second aspect of the invention.

Preferably, the characteristic information includes frequency information of the image of the predetermined region.

According to this structure, if the computer reads out the program and then executes the process in accordance with the read program, it is possible to achieve the same effects as the printing device according to the second aspect of the invention.

Preferably, the frequency information includes edge information of the image of the predetermined region.

According to this structure, if the computer reads out the program and then executes the process in accordance with the read program, it is possible to achieve the same effects as the printing device according to the second aspect of the invention.

Preferably, during the extracting of the characteristic information, the frequency information is extracted for each color of ink corresponding to the printing head.

According to this structure, if the computer reads out the program and then executes the process in accordance with the read program, it is possible to achieve the same effects as the printing device according to the second aspect of the invention.

Preferably, during the creating of the printing data, performed is a creating process of information including the information for reducing the deterioration of the printed image quality caused by the banding phenomenon as information about the dot forming contents with respect to only a part or all of the image of the predetermined region which is determined in the determination of the deterioration that the deterioration of the printed image quality is visible and of which a frequency indicating the frequency information is not more than a predetermined frequency.

According to this structure, if the computer reads out the program and then executes the process in accordance with the read program, it is possible to achieve the same effects as the printing device according to the second aspect of the invention.

Preferably, the nozzle information includes information indicating whether an ink ejection failure of each nozzle exists or not.

According to this structure, if the computer reads out the program and then executes the process in accordance with the read program, it is possible to achieve the same effects as the printing device according to the second aspect of the invention.

Preferably, the nozzle information includes information of a positionally deviated amount between an actual forming position of the dot and an ideal forming position of the dot in each nozzle.

According to this structure, if the computer reads out the program and then executes the process in accordance with the read program, it is possible to achieve the same effects as the printing device according to the second aspect of the invention.

Preferably, the nozzle information includes information about a deviated amount between a density value of the dot which each nozzle actually forms and an ideal density value of the corresponding dot.

According to this structure, if the computer reads out the program and then executes the process in accordance with the read program, it is possible to achieve the same effects as the printing device according to the second aspect of the invention.

According to a fifth aspect of the invention, there is provided a computer readable recording medium in which the above-mentioned printing device controlling program is recorded.

Thereby, it is possible to achieve the same effects as the above-mentioned printing device controlling program, and the printing program can be easily exchanged through a recording medium such as a CD-ROM or a DVD-ROM, an MO or the like.

According to a sixth aspect of the invention, there is provided a method of controlling a printing device which is used for controlling the printing device which prints an image on a printing medium by a printing head, the printing head having a plurality of nozzles for forming a dot on the printing medium. The method includes: executing a printing process for reducing deterioration of a printed image quality caused by a banding phenomenon; and controlling a printing process for reducing the deterioration on the basis of nozzle information indicating a characteristic of each nozzle and characteristic information for every predetermined region of the image.

Thereby, it is possible to achieve the same effects as the printing device according to the first aspect of the invention.

According to a seventh aspect of the invention, there is provided a method of controlling a printing device which is used for controlling a printing device which prints an image on a printing medium by a printing head, the printing head having a plurality of nozzles for forming a dot on the printing medium. The method includes: acquiring image data having a plurality of pixel data corresponding to a pixel value of an M value ($M \geqq 2$) constituting the image; selecting predetermined pixel data from the image data; determining whether the selected pixel data is related to a banding phenomenon or not on the basis of the nozzle information; extracting characteristic information of an image of a predetermined region formed by including a pixel of the pixel data selected from the image data which is determined by the determining of the banding that the selected pixel data is related to the banding phenomenon; determining whether deterioration of a printed image quality caused by the banding phenomenon is visible or not on the basis of the characteristic information; creating printing data having information about dot forming contents of each pixel value of the image data; and printing the image on the recording medium by the printing head on the basis of the printing data. Further, during the creating of the printing data, performed is a creating process of information about the dot forming contents including the information for reducing the deterioration of the printed image quality caused by the banding phenomenon with respect to only a part or all of the image of the predetermined region which is determined in the determining of the deterioration that the deterioration of the printed image quality is visible.

Thereby, it is possible to achieve the same effects as the printing device according to the second aspect of the invention.

Preferably, during the determination of the deterioration degree, when a characteristic amount indicating the characteristic information is compared with a predetermined threshold value and the characteristic amount is equal to or greater than the predetermined threshold value, it is determined that the deterioration of the printed image quality caused by the banding phenomenon is visible.

Thereby, it is possible to achieve the same effects as the printing device according to the second aspect of the invention.

Preferably, in the program for controlling a printing device, the process executed by the computer further includes: dividing the image data region into a plurality of image data region. Further, an image of each of the plurality of image data regions is set as an image of the predetermined region. Furthermore, during the extracting of the characteristic information, the characteristic information is extracted for each image of the predetermined region.

According to this structure, if the computer reads out the program and then executes the process in accordance with the read program, it is possible to achieve the same effects as the printing device according to the second aspect of the invention.

Thereby, it is possible to achieve the same effects as the printing device according to the second aspect of the invention.

Preferably, the characteristic information includes density information of the image of the predetermined region.

Thereby, it is possible to achieve the same effects as the printing device according to the second aspect of the invention.

Preferably, during the extracting of the characteristic information, density information is extracted for each color of ink corresponding to the printing head.

Thereby, it is possible to achieve the same effects as the printing device according to the second aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is equal to or greater than a predetermined density value.

Thereby, it is possible to achieve the same effects as the printing device according to the second aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is within a density range of a halftone.

Thereby, it is possible to achieve the same effects as the printing device according to the second aspect of the invention.

Preferably, the characteristic information includes frequency information of the image of the predetermined region.

Thereby, it is possible to achieve the same effects as the printing device according to the second aspect of the invention.

Preferably, the frequency information includes edge information of the image of the predetermined region.

Thereby, it is possible to achieve the same effects as the printing device according to the second aspect of the invention.

Preferably, during the extracting of the characteristic information, the frequency information is extracted for each color of ink corresponding to the printing head.

Thereby, it is possible to achieve the same effects as the printing device according to the second aspect of the invention.

Preferably, during the creating of the printing data, performed is a creating process of information including the information for reducing the deterioration of the printed image quality caused by the banding phenomenon as information about the dot forming contents with respect to only a part or all of the image of the predetermined region which is determined in the determination of the deterioration that the deterioration of the printed image quality is visible and of which a frequency indicating the frequency information is not more than a predetermined frequency.

Thereby, it is possible to achieve the same effects as the printing device according to the second aspect of the invention.

Preferably, the nozzle information includes information indicating whether an ink ejection failure of each nozzle exists or not.

Thereby, it is possible to achieve the same effects as the printing device according to the second aspect of the invention.

Preferably, the nozzle information includes information of a positionally deviated amount between an actual forming position of the dot and an ideal forming position of the dot in each nozzle.

Thereby, it is possible to achieve the same effects as the printing device according to the second aspect of the invention.

Preferably, the nozzle information includes information about a deviated amount between a density value of the dot which each nozzle actually forms and an ideal density value of the corresponding dot.

Thereby, it is possible to achieve the same effects as the printing device according to the second aspect of the invention.

According to an eighth aspect of the invention, there is provided a printing data creating device which creates printing data used in the printing device which prints an image on a printing medium by a printing head, the printing head having a plurality of nozzles for forming a dot on the printing medium. The printing data creating device includes: a nozzle information storing unit that stores nozzle information indicating characteristics of the respective nozzle; an image data acquiring unit that acquires image data having a plurality of pixel data corresponding to a pixel value of an M value (M≧2) constituting the image; a pixel data selecting unit that selects predetermined pixel data from the image data; a banding determining unit that determines whether the selected pixel data is related to a banding phenomenon or not on the basis of the nozzle information; a characteristic information extracting unit that extracts characteristic information of an image of a predetermined region formed by including a pixel of the selected pixel data having been determined that the selected pixel data is related to the banding phenomenon; a deterioration determining unit that determines whether deterioration of a printed image quality caused by the banding phenomenon is visible or not; and a printing data creating unit that creates printing data having information about dot forming contents of each pixel value of the image data. Further, the printing data creating unit performs a process of creating information concerning the dot forming contents including the information for reducing the deterioration of the printed image quality caused by the banding phenomenon with respect to only a part or all of the image of the predetermined region having been determined in the deterioration determining unit that the deterioration of the printed image quality is visible.

According to this aspect, the printing unit for actually performing the printing like the printing device is not provided, and the printing data is created on the basis of the image data of an original M value.

Therefore, it is possible to achieve the same effect as the first aspect of the invention. For example, the printing process can be executed in the printing device by only transmitting the created printing data to the printing device. Therefore, the existing inkjet type of printing device can be used as it is without preparing the exclusive printing device.

In addition, since a general-purpose information processing device such as the personal computer can be used, the existing printing system which includes a printing instruction device such as the personal computer or the like and the inkjet printer can be used as it is.

Preferably, when the deterioration determining unit compares a characteristic amount indicating the characteristic information with a predetermined threshold value and the characteristic amount is equal to or greater than the predetermined threshold value, the deterioration determining unit determines that the deterioration of the printed image quality caused by the banding phenomenon is visible.

Thereby, it is possible to achieve the same effect as the printing device according to the second aspect of the invention.

Preferably, the printing device further includes: a region dividing unit that divides the image data region into a plurality of image data regions. Further, an image of each of the plurality of image data regions is set as an image of the predetermined region, and the characteristic information extracting unit extracts the characteristic information for each image of the predetermined region.

Thereby, it is possible to achieve the same effect as the printing device according to the second aspect of the invention.

Preferably, the characteristic information includes density information of the image of the predetermined region.

Thereby, it is possible to achieve the same effect as the printing device according to the second aspect of the invention.

Preferably, the characteristic information extracting unit extracts density information for each color of ink corresponding to the printing head.

Thereby, it is possible to achieve the same effect as the printing device according to the second aspect of the invention.

Preferably, the printing data creating unit performs a process of creating information concerning the dot forming contents including the information for reducing the deterioration of the printed image quality caused by the banding phenomenon with respect to only a part or all of the image of the predetermined region which is determined in the deterioration determining unit that the deterioration of the printed image quality is visible and of which a density value indicating the density information is equal to or greater than a predetermined density value.

Thereby, it is possible to achieve the same effect as the printing device according to the second aspect of the invention.

Preferably, the printing data creating unit performs a process of creating information concerning the dot forming contents including the information for reducing the deterioration of the printed image quality caused by the banding phenomenon with respect to only a part or all of the image of the predetermined region which is determined in the deterioration determining unit that the deterioration of the printed image quality is visible and of which a density value indicating the density information is within a density range of a halftone.

Thereby, it is possible to achieve the same effect as the printing device according to the second aspect of the invention.

Preferably, the characteristic information includes frequency information of the image of the predetermined region.

Thereby, it is possible to achieve the same effect as the printing device according to the second aspect of the invention.

Preferably, the frequency information includes edge information of the image of the predetermined region.

Thereby, it is possible to achieve the same effect as the printing device according to the second aspect of the invention.

Preferably, the characteristic information extracting unit extracts the frequency information for each color of ink corresponding to the printing head.

Thereby, it is possible to achieve the same effect as the printing device according to the second aspect of the invention.

Preferably, the printing data creating unit performs a creating process of information including the information for reducing the deterioration of the printed image quality caused by the banding phenomenon as information about the dot forming contents with respect to only a part or all of the image of the predetermined region which is determined in the deterioration determining unit that the deterioration of the printed image quality is visible and of which a frequency indicating the frequency information is not more than a predetermined frequency.

Thereby, it is possible to achieve the same effect as the printing device according to the second aspect of the invention.

Preferably, the nozzle information includes information indicating whether an ink ejection failure of each nozzle exists or not.

Thereby, it is possible to achieve the same effect as the printing device according to the second aspect of the invention.

Preferably, the nozzle information includes information of a positionally deviated amount between an actual forming position of the dot and an ideal forming position of the dot in each nozzle.

Thereby, it is possible to achieve the same effect as the printing device according to the second aspect of the invention.

Preferably, the nozzle information includes information about a deviated amount between a density value of the dot which each nozzle actually forms and an ideal density value of the corresponding dot.

Thereby, it is possible to achieve the same effect as the printing device according to the second aspect of the invention.

According to a ninth aspect of the invention, there is provided a program for creating printing data which is used for creating the printing data which is used in a printing device which prints an image on a printing medium by a printing head, the printing head having a plurality of nozzles for forming a dot on the printing medium, the program being used to allow a computer to execute: acquiring image data having a plurality of pixel data corresponding to a pixel value of an M value (M≧2) constituting the image; selecting predetermined pixel data from the image data; determining whether the selected pixel data is related to a banding phenomenon or not on the basis of the nozzle information; extracting characteristic information of an image of a predetermined region formed by including a pixel of the pixel data selected from the image data which is determined by the determining of the banding that the selected pixel data is related to the banding phenomenon; determining whether deterioration of a printed image quality caused by the banding phenomenon is visible or not on the basis of the characteristic information; and creating printing data having information about dot forming contents of each pixel value of the image data. Further, during the creating of the printing data, performed is a creating process of information about the dot forming contents including the information for reducing the deterioration of the printed image quality caused by the banding phenomenon with respect to only a part or all of the image of the predetermined region having been determined in the determining of the deterioration that the deterioration of the printed image quality is visible.

According to this structure, if the computer reads out the program and then executes the process in accordance with the read program, it is possible to achieve the same effects as the printing data creating device according to the eighth aspect of the invention.

Preferably, during the determination of the deterioration degree, when a characteristic amount indicating the characteristic information is compared with a predetermined threshold value and the characteristic amount is equal to or greater than the predetermined threshold value, it is determined that the deterioration of the printed image quality caused by the banding phenomenon is visible.

According to this structure, if the computer reads out the program and then executes the process in accordance with the read program, it is possible to achieve the same effects as the printing data creating device according to the eighth aspect of the invention.

Preferably, in the program for controlling a printing device, the process executed by the computer further includes: dividing the image data region into a plurality of image data region. Further, an image of each of the plurality of image data regions is set as an image of the predetermined region. Furthermore, during the extracting of the characteristic information, the characteristic information is extracted for each image of the predetermined region.

According to this structure, if the computer reads out the program and then executes the process in accordance with the read program, it is possible to achieve the same effects as the printing data creating device according to the eighth aspect of the invention.

Preferably, the characteristic information includes density information of the image of the predetermined region.

According to this structure, if the computer reads out the program and then executes the process in accordance with the read program, it is possible to achieve the same effects as the printing device according to the second aspect of the invention.

Preferably, during the extracting of the characteristic information, density information is extracted for each color of ink corresponding to the printing head.

According to this structure, if the computer reads out the program and then executes the process in accordance with the read program, it is possible to achieve the same effects as the printing data creating device according to the eighth aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is equal to or greater than a predetermined density value.

According to this structure, if the computer reads out the program and then executes the process in accordance with the read program, it is possible to achieve the same effects as the printing data creating device according to the eighth aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is within a density range of a halftone.

According to this structure, if the computer reads out the program and then executes the process in accordance with the read program, it is possible to achieve the same effects as the printing data creating device according to the eighth aspect of the invention.

Preferably, the characteristic information includes frequency information of the image of the predetermined region.

According to this structure, if the computer reads out the program and then executes the process in accordance with the read program, it is possible to achieve the same effects as the printing data creating device according to the eighth aspect of the invention.

Preferably, the frequency information includes edge information of the image of the predetermined region.

According to this structure, if the computer reads out the program and then executes the process in accordance with the read program, it is possible to achieve the same effects as the printing data creating device according to the eighth aspect of the invention.

Preferably, during the extracting of the characteristic information, the frequency information is extracted for each color of ink corresponding to the printing head.

According to this structure, if the computer reads out the program and then executes the process in accordance with the read program, it is possible to achieve the same effects as the printing data creating device according to the eighth aspect of the invention.

Preferably, during the creating of the printing data, performed is a creating process of information including the information for reducing the deterioration of the printed image quality caused by the banding phenomenon as information about the dot forming contents with respect to only a part or all of the image of the predetermined region which is determined in the determination of the deterioration that the deterioration of the printed image quality is visible and of which a frequency indicating the frequency information is not more than a predetermined frequency.

According to this structure, if the computer reads out the program and then executes the process in accordance with the read program, it is possible to achieve the same effects as the printing data creating device according to the eighth aspect of the invention.

Preferably, the nozzle information includes information indicating whether an ink ejection failure of each nozzle exists or not.

According to this structure, if the computer reads out the program and then executes the process in accordance with the read program, it is possible to achieve the same effects as the printing data creating device according to the eighth aspect of the invention.

Preferably, the nozzle information includes information of a positionally deviated amount between an actual forming position of the dot and an ideal forming position of the dot in each nozzle.

According to this structure, if the computer reads out the program and then executes the process in accordance with the read program, it is possible to achieve the same effects as the printing data creating device according to the eighth aspect of the invention.

Preferably, the nozzle information includes information about a deviated amount between a density value of the dot which each nozzle actually forms and an ideal density value of the corresponding dot.

According to this structure, if the computer reads out the program and then executes the process in accordance with the read program, it is possible to achieve the same effects as the printing device according to the second aspect of the invention.

According to a tenth aspect of the invention, there is provided a computer readable recording medium in which the above-mentioned printing data creating program is recorded.

Thereby, it is possible to achieve the same effects as the above-mentioned printing data creating program, and the printing program can be easily exchanged through a recording medium such as a CD-ROM or a DVD-ROM, an FD (flexible disk) or the like.

According to an eleventh aspect of the invention, a method of controlling a printing device which is used for creating printing data which is used in the printing device which prints an image on a printing medium by a printing head, the printing head having a plurality of nozzles for forming a dot on the printing medium, the method includes: acquiring image data having a plurality of pixel data corresponding to a pixel value of an M value ($M \geqq 2$) constituting the image; selecting predetermined pixel data from the image data; determining whether the selected pixel data is related to a banding phenomenon or not on the basis of the nozzle information; extracting characteristic information of an image of a predetermined region formed by including a pixel of the pixel data selected from the image data which is determined by the determining of the banding that the selected pixel data is related to the banding phenomenon; determining whether deterioration of a printed image quality caused by the banding phenomenon is visible or not on the basis of the characteristic information; creating printing data having information about dot forming contents of each pixel value of the image data; and printing the image on the recording medium by the printing head on the basis of the printing data. During the creating of the printing data, performed is a creating process of information about the dot forming contents including the information for reducing the deterioration of the printed image quality caused by the banding phenomenon with respect to only a part or all of the image of the predetermined region having been determined in the determining of the deterioration that the deterioration of the printed image quality is visible.

Thereby, it is possible to achieve the same effects as the printing data creating device according to the eighth aspect of the invention.

Preferably, during the determination of the deterioration degree, when a characteristic amount indicating the characteristic information is compared with a predetermined threshold value and the characteristic amount is equal to or greater than the predetermined threshold value, it is determined that the deterioration of the printed image quality caused by the banding phenomenon is visible.

Thereby, it is possible to achieve the same effects as the printing data creating device according to the eighth aspect of the invention.

Preferably, in the program for controlling a printing device, the process executed by the computer further includes: dividing the image data region into a plurality of image data region. Further, an image of each of the plurality of image data regions is set as an image of the predetermined region. Furthermore, during the extracting of the characteristic information, the characteristic information is extracted for each image of the predetermined region.

Thereby, it is possible to achieve the same effects as the printing data creating device according to the eighth aspect of the invention.

Preferably, the characteristic information includes density information of the image of the predetermined region.

Thereby, it is possible to achieve the same effects as the printing data creating device according to the eighth aspect of the invention.

Preferably, during the extracting of the characteristic information, density information is extracted for each color of ink corresponding to the printing head.

Thereby, it is possible to achieve the same effects as the printing data creating device according to the eighth aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is equal to or greater than a predetermined density value.

Thereby, it is possible to achieve the same effects as the printing data creating device according to the eighth aspect of the invention.

Preferably, during the creating of the printing data, performed is a creating process of information about the dot forming contents including the information for reducing the deterioration of the printed image quality caused by the banding phenomenon with respect to only a part or all of the image of the predetermined region which is determined in the determination of the deterioration that the deterioration of the printed image quality is visible and of which a density value indicating the density information is within a density range of a halftone.

Thereby, it is possible to achieve the same effects as the printing data creating device according to the eighth aspect of the invention.

Preferably, the characteristic information includes frequency information of the image of the predetermined region.

Thereby, it is possible to achieve the same effects as the printing data creating device according to the eighth aspect of the invention.

Preferably, the frequency information includes edge information of the image of the predetermined region.

Thereby, it is possible to achieve the same effects as the printing data creating device according to the eighth aspect of the invention.

Preferably, during the extracting of the characteristic information, the frequency information is extracted for each color of ink corresponding to the printing head.

Thereby, it is possible to achieve the same effects as the printing data creating device according to the eighth aspect of the invention.

Preferably, during the creating of the printing data, performed is a creating process of information including the information for reducing the deterioration of the printed image quality caused by the banding phenomenon as information about the dot forming contents with respect to only a part or all of the image of the predetermined region which is determined in the determination of the deterioration that the deterioration of the printed image quality is visible and of which a frequency indicating the frequency information is not more than a predetermined frequency.

Thereby, it is possible to achieve the same effects as the printing data creating device according to the eighth aspect of the invention.

Preferably, the nozzle information includes information indicating whether an ink ejection failure of each nozzle exists or not.

Thereby, it is possible to achieve the same effects as the printing data creating device according to the eighth aspect of the invention.

Preferably, the nozzle information includes information of a positionally deviated amount between an actual forming position of the dot and an ideal forming position of the dot in each nozzle.

Thereby, it is possible to achieve the same effects as the printing data creating device according to the eighth aspect of the invention.

Preferably, the nozzle information includes information about a deviated amount between a density value of the dot which each nozzle actually forms and an ideal density value of the corresponding dot.

Thereby, it is possible to achieve the same effects as the printing data creating device according to the eighth aspect of the invention.

BRIEF DESCRIPTION OF THE DRAWINGS

The invention will be described with reference to the accompanying drawings, wherein like numbers reference like elements.

FIG. 22 is a diagram illustrating a relationship between a total sum of an absolute value of an edge amount of a predetermined region image and an execution ratio of a banding avoiding process.

FIG. 23A is a diagram illustrating a relationship between an edge amount of selected pixel data and an execution ratio of a banding avoiding process.

FIG. 23B is a diagram illustrating a relationship among a total sum of an absolute value of an edge amount in a predetermined region on the basis of selected pixel data, a density value, and control range of a banding avoiding process.

DESCRIPTION OF EXEMPLARY EMBODIMENTS

First Embodiment

Hereinafter, a first embodiment of the invention will be described with reference to the accompanying drawings. FIGS. 1 to 16 are a printing device, a program for controlling a printing device, a method of controlling a printing device, a printing data creating device, a program for creating printing data, and a method of creating printing data according to the first embodiment of the invention.

Figure 1:
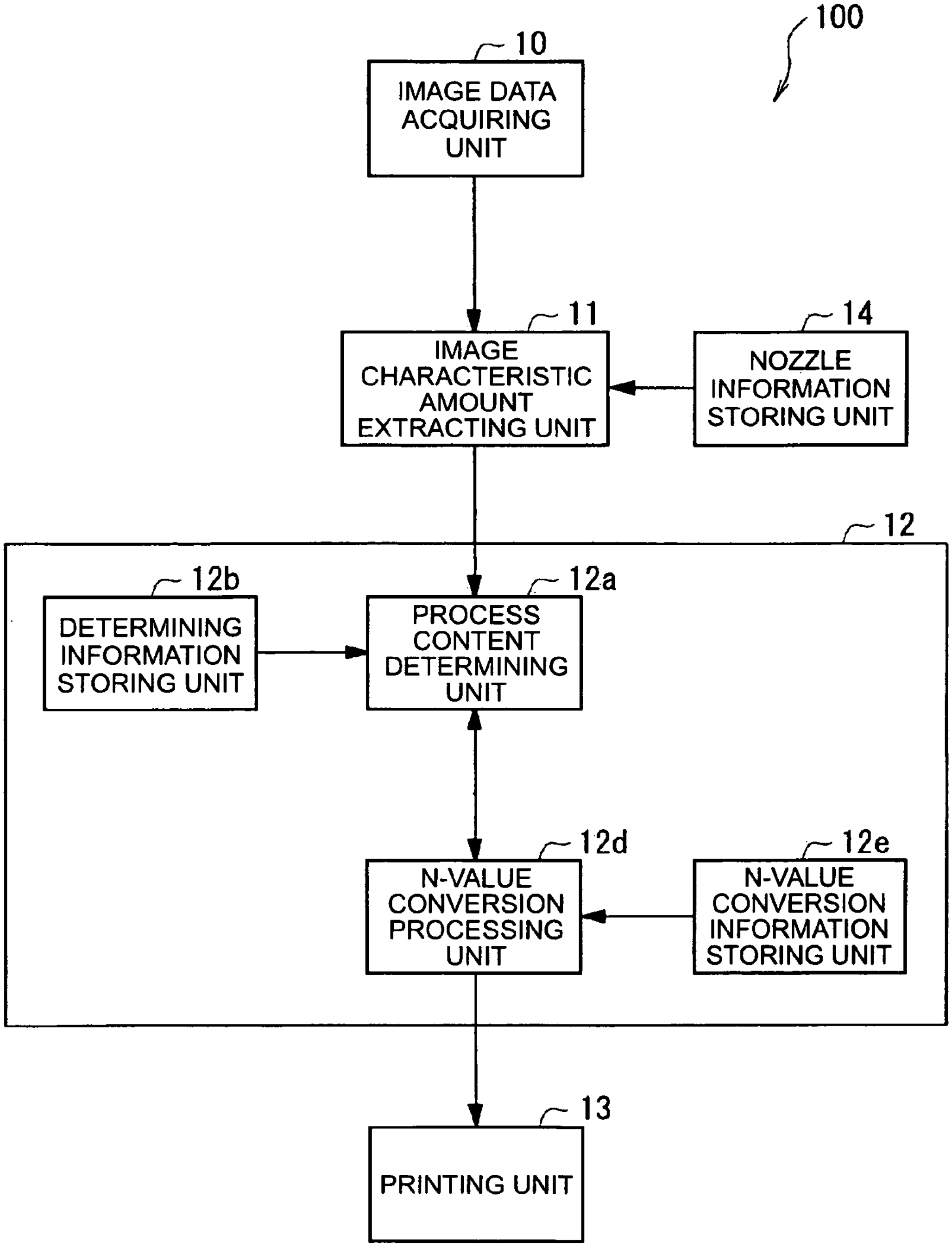
FIG. 1 is a block diagram illustrating a structure of a printing device 100 according to a first embodiment of the invention.

First, a structure of a printing device 100 according to the first embodiment of the invention will be described with reference to FIG. 1. FIG. 1 is a block diagram illustrating the structure of the printing device 100 according to the first embodiment of the invention.

The printing device 100 is a line-head-type printing device. As shown in FIG. 1, the printing device 100 includes an image data acquiring unit 10 that acquires image data of an M value (M≧2) for forming a predetermined image from an external device or a storage device, an image characteristic amount extracting unit 11 that extracts an image characteristic amount from the image data acquired by the image data acquiring unit 10, a printing data creating unit 12 that determines whether an N-value conversion process according to a banding avoiding process is performed or not for a nozzle related to banding on the basis of nozzle information indicating respective nozzle characteristics of a printing head 200 (which will be described in detail below) and the extracted image characteristic amount, subjects the image data to an N-value conversion process on the basis of the determined value and N-value conversion information, and creates printing data for printing an image of image data on a recording medium S (in this case, printing paper) in a printing unit 13 (which will be described in detail below), a printing unit 13 that prints an image of the image data on the printing medium by using an inkjet method on the basis of the printing data, and a nozzle information storing unit 14 that stores the nozzle information.

The image data acquiring unit 10 has a function for acquiring image data of multiple values in which a gray-scale level (luminance value) for every color (R, G, and B) of each pixel is represented with eight bits (0 to 255). The image data acquiring unit 10 can acquire the image data from an external device through a network such as a LAN and WAN in accordance with printing instructions from input devices provided in the external device and the image data acquiring unit 10 or can acquire the image data from a recording medium such as a CD-ROM, a DVD-ROM or the like through a driving device such a CD drive, a DVD drive or the like (not shown) provided in the image data acquiring unit 10 or can acquire the image data from a storage device 70 (which will be described in detail below) provided in the image data acquiring unit 10. In the present embodiment, the image data acquiring unit 10 also has a function for subjecting RGB data of multiple values to a color changing process to covert them into CMYK data (a case of four colors) of multiple values corresponding to the respective inks of the printing head 200.

The image characteristic amount extracting unit 11 has a function that extracts from CMYK image data acquired by the image data acquiring unit 10 an image characteristic amount which indicates a characteristic of an image formed by the CMYK image data. In the present embodiment, when the selected pixel data is related to the banding phenomenon, it is constructed such that a characteristic amount for a density value (or luminance value) of a block image is extracted for ever color of pixels which forms an image of a predetermined region on the basis of the selected pixel data (hereinafter, referred to as block image). In addition, the extracted image characteristic amount is stored in the storage device 70, and the CMYK image data corresponding to the extracted image characteristic amount is transmitted to the printing data creating unit 12.

The printing data creating unit 12 includes a process content determining unit 12*a*, a determining information storing unit 12*b*, an N-value conversion processing unit 12*d*, and an N-value conversion information storing unit 12*e*.

The process content determining unit 12*a* has a function that determines whether an N-value conversion process according to a banding avoiding process is performed or not with respect to each block image on the basis of an image characteristic amount of each block extracted by the image characteristic amount extracting unit 11 and determining information stored in the determining information storing unit 12*b*. When it is determined that the N-value conversion process according to the banding avoiding process is performed, the process content determining unit 12*a* has a function that determines the process content of the corresponding N-value conversion process (an execution ratio of a banding avoiding process with respect to a selected block or the like) on the basis the nozzle information and the image characteristic amount.

The determining information storing unit 12*b* is constructed such that it stores the determining information including information of various threshold values or the like for determining whether an image characteristic amount of each block image extracted by the image characteristic amount extracting unit 11 is the subject for performing the N-value conversion process according to the banding avoiding process.

The N-value conversion processing unit 12*d* has a function for selecting predetermined pixel data from the image data transmitted from the image characteristic amount extracting unit 11, and subjecting the selected predetermined pixel data (hereinafter, referred to as selected pixel data) to an N-value conversion process by using an error spread method on the basis of an N-value conversion processing threshold value corresponding to the dot forming size of the nozzle included in the N-value conversion information read out from the N-value conversion information storing unit 12*e*, a dot number corresponding to each dot forming size, and an pixel value after performing an N-value conversion process corresponding to each dot number (for example, density value). That is, the selected pixel data is subjected to an N-value conversion process, the difference between a pixel value of the pixel data before performing the N-value conversion process and a pixel value of the pixel data after performing the N-value conversion process is calculated, and the N-value conversion process around the pixel corresponding to the selected pixel data spreads the non-processed pixel data.

Further, when the N-value conversion process according to the banding process is performed, a forming ratio of a large dot in the pixel column corresponding to the abnormal nozzle, such as a nozzle causing a flying curve or a nozzle from which ink is not ejected, is determined on the basis of the determined result of the process content determining unit 12*a*, a lotting process for increasing the dot size is performed for every pixel in the pixel column according to the abnormal nozzle, a lotting process for increasing the dot size is performed for every pixel in the pixel column corresponding to the abnormal nozzle, and the N-value conversion process considering the forming ratio of the large dot is performed with respect to the pixel drawn in a lottery.

As described above, the N-value conversion process and the error spread process is performed with respect to all of the pixel data, so that they are converted into data consisting of pixel values corresponding to the dot forming sizes of N kinds in which the respective nozzles of the printing head 200 can be formed (density value and luminance value) and a nozzle number. Hereinafter, second image data obtained after the N-value conversion process and the error spread process is referred to as N-value conversion image data.

In this case, the N-value conversion process is a process that converts image data of an M value ($M \geqq 20$) (having pixel values (pixel data) of M kinds) into data of an N value ($M \geqq N \geqq 2$) (having numerical values of N kinds). For example, when a binarization process is performed, an original pixel value before converted is converted into any one of numerical values of predetermined two kinds in such a manner that the original pixel value before converted and the threshold value are compared with each other, and then when the original pixel value is not less than the threshold value, it is converted into a numerical value '1', and when the original pixel value is not more than the threshold value, it is converted into a numerical value '0'. Therefore, when the N-value conversion process is performed, a pixel value of an M value and threshold values of N kinds are compared with each other, and it is converted into any one of predetermined N kinds of numerical values in accordance with the comparison result.

In addition, the error spread method spreads the same principle as the known error spread method, the pixel data of the N value. For example, in a case of a binarization process in which using a threshold value '128', if the pixel value of the image data of the N value is smaller than '128', it is converted into '0', and if the pixel value of the image data of the N value is not more than '128', it is converted into '255', when the pixel value of the selected pixel is '101', '101' is converted into '0', and '101' which is the difference between '0' after the conversion and '101' before the conversion is set to the error. Then, the spread is made with respect to a plurality of non-processed pixels around the selected pixel in accordance with a predetermined spread method. For example, if only the general binarization process is performed, since the pixel adjacent to the selected pixel at the right side (for example, pixel value '101') does not satisfies the same threshold value, it may be converted into '0', but the adjacent pixel receives the error of the selected pixel, that is, '27', the pixel value thereof becomes '128' so as to exceed the threshold value '128'. As a result, it is converted into '1'.

As described above, the N-value conversion information storing unit 12*e* stores N-value conversion information which includes an N-value conversion processing threshold value corresponding to the dot forming size of the nozzle, a dot number corresponding to each dot forming size, and a pixel value after the N-value conversion process corresponding to each dot number (for example, luminance value).

Figure 3:
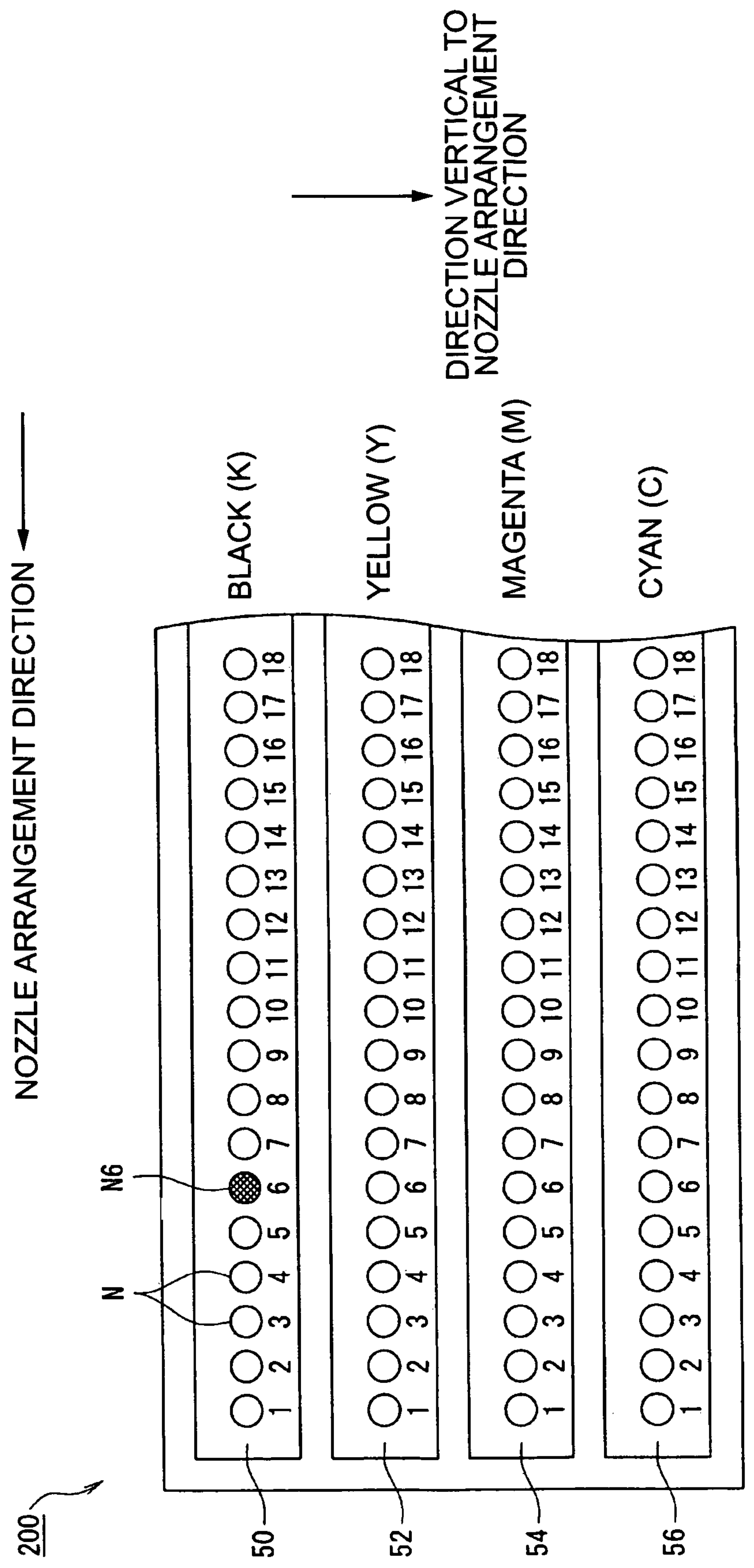
FIG. 3 is a partial enlarged bottom view illustrating a structure of a printing head 200 according to the first embodiment of the invention.
Figure 4:
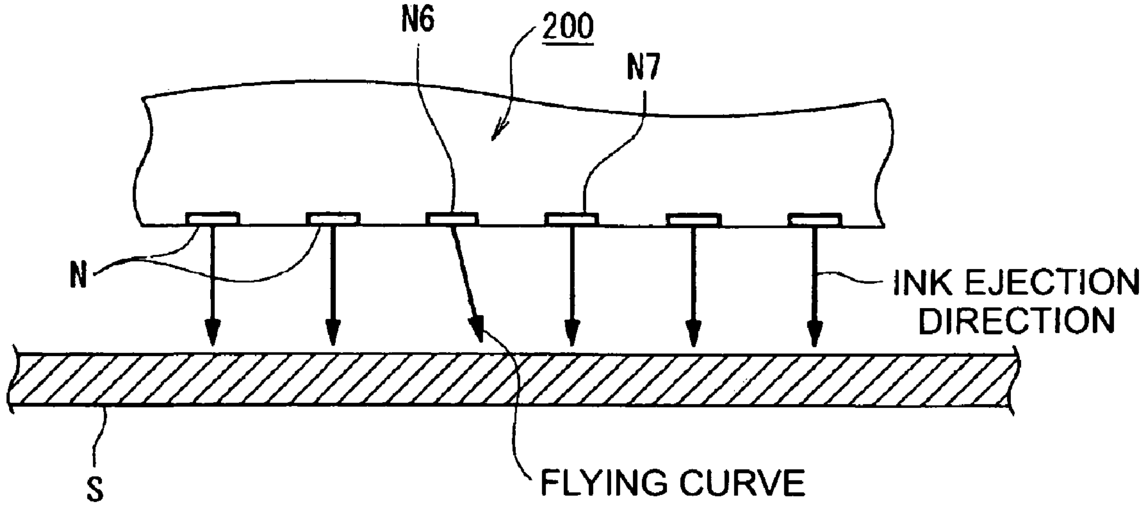
FIG. 4 is a partial enlarged side view of the printing head 200 according to the first embodiment of the invention.

In this case, FIG. 3 is a partially enlarged bottom view illustrating a structure of the printing head 200 of the invention, and FIG. 4 is a partially enlarged side view illustrating a structure of the printing head 200 of the invention.

As shown in FIG. 3, the printing head 200 has a structure in which it has four nozzle modules including a black nozzle module 50, a yellow nozzle module 52, a magenta nozzle module 54, and a cyan nozzle module 56. In the black nozzle module 50, a plurality of nozzles N (in FIG. 3, eighteen) each of which exclusively ejects black (K) ink are linearly arranged in a nozzle arrangement direction. In the yellow nozzle module 52, a plurality of nozzles N each of which exclusively ejects yellow (Y) ink are linearly arranged in a nozzle arrangement direction. In the magenta nozzle module 54, a plurality of nozzles N each of which exclusively ejects magenta (M) ink are linearly arranged in a nozzle arrangement direction. In the cyan nozzle module 56, a plurality of nozzles N each of which exclusively ejects cyan (M) ink are linearly arranged in a nozzle arrangement direction. In addition, the four nozzle modules 50, 52, 54, and 56 are integrally arranged such that nozzles N each having the same number in the four nozzle modules 50, 52, 54, and 56 are linearly arranged in a printing direction (a direction vertical to a nozzle arrangement direction), as shown in FIG. 3. Accordingly, the plurality of nozzles N constituting each of the nozzle modules are linearly arranged in a nozzle arrangement direction, and the nozzles N each having the same number in the four nozzle modules 50, 52, 54, and 56 are linearly arranged in a printing direction.

In addition, the printing head 200 having the above-mentioned structure ejects ink supplied to an ink chamber (not shown) provided for each of the nozzles N1, N2, N3, . . . from each of the nozzles N1, N2, N3, . . . by a piezoelectric element such as a piezoelectric element (piezo actuator) (not shown) or the like provided for each ink chamber and prints a circular dot on white printing paper. Further, the printing head 200 can control a voltage applied to the piezoelectric element in a multistage so as to control an ink ejection amount from each ink chamber, and can print a dot having a different size for each of the nozzles N1, N2, N3, . . . , and N18. In addition, there is a case in which a voltage is applied in time series to nozzles in two stages for a short time and one dot is formed on printing paper by combining two ejections. In this case, by using a phenomenon that an ejection speed is different by a dot size and ejecting dots in the order from a small dot to a large dot, ink lands at the almost same location of the paper, so that one larger dot can be formed. FIG. 4 is a diagram illustrating a state in which the sixth nozzle N6 from the left side in the black nozzle module 50 among the four nozzle modules 50, 52, 54, and 56 causes a flying curve phenomenon to occur, and the ink is ejected onto a printing medium S from the sixth nozzle N6 in a slant direction, so that a dot formed on the printing medium S is formed in the vicinity of a dot which is ejected from a normal nozzle S7 adjacent to the nozzle N6 and formed on the printing medium S.

Referring to FIGS. 1 and 3 again, the printing unit 13 is an inkjet-type printer constructed such that ink is ejected from the nozzle modules 50, 52, 54, and 56 formed in the printing head 200 in a dot shape while moving one side or both sides of the printing medium and the printing head 200 and a predetermined image composed of a plurality of dots is formed on the recording medium S. In addition to the above-mentioned printing head 200, the printing head 200 may include a printing head transporting mechanism (a multipass type) (not shown) that makes the printing medium (paper) S reciprocate in a widthwise direction, a paper transporting mechanism (not shown) that makes the printing medium (paper) S move, and a printing control mechanism (not shown) that control the ink ejection of the printing head 200 on the basis of the N-value conversion data.

The nozzle information storing unit 14 stores nozzle information which includes information indicating the characteristic of the nozzle N, such as information indicating a correspondence between each nozzle N of the printing head 200 included in the printing unit 13 and each pixel data in the image data, information indicating whether the ink ejection failure exists or not with respect to each nozzle N, and information indicating a flying curve amount of each nozzle N. In addition, most of characteristics of the printing head 200 (each nozzle N) are fixed in the manufacturing step, so that if excluding the ejection failure due to the ink clogging, the characteristics of the printing head 200 is little changed. Therefore, if the test is performed at the time of shipping and nozzle information is previously stored in the nozzle information storing unit 14, the resetting does not need be performed.

Figure 2:
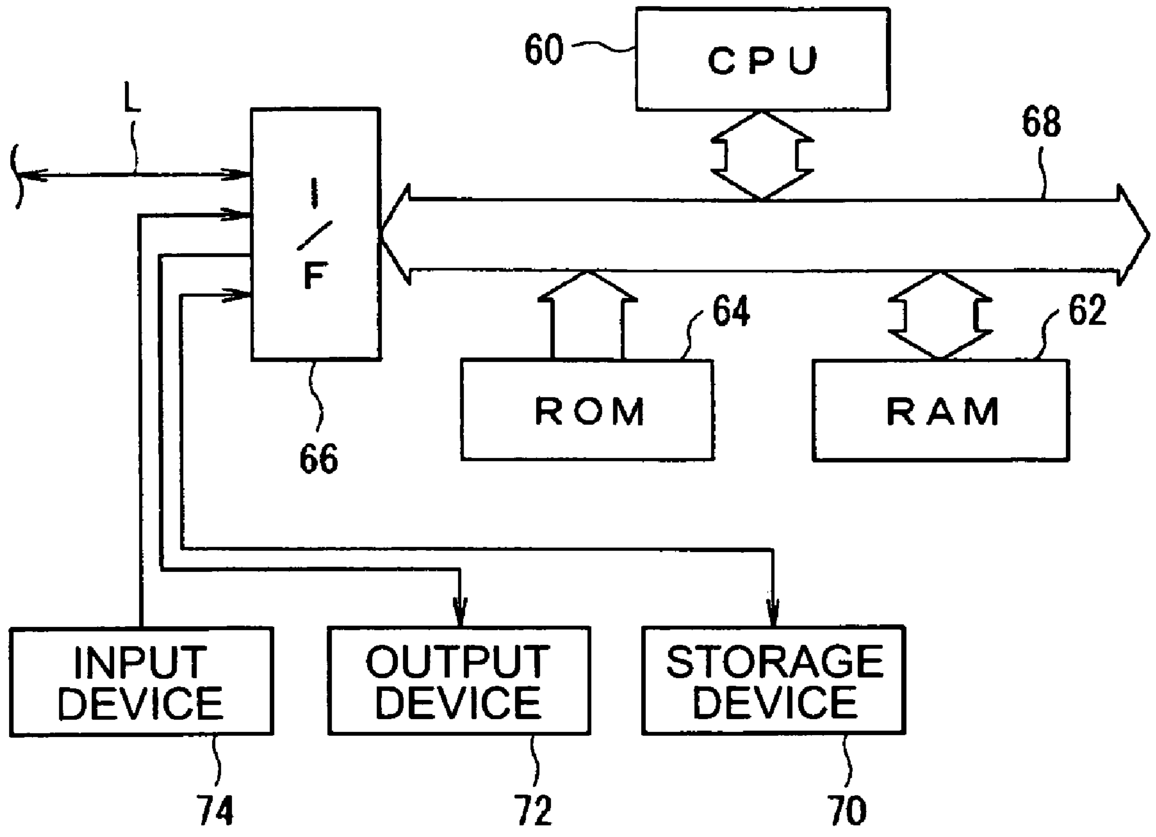
FIG. 2 is a diagram illustrating a hardware structure of a computer system.

Further, the printing device 100 includes a computer system that implements the respective functions of the image data acquiring unit 10, the second image data creating unit 11, the printing data creating unit 12, the printing unit 13 or the like on software and implements software for controlling hardware necessary for implementing the above-mentioned functions. As shown in FIG. 2, the computer system has a hardware structure in which a CPU 60 (central processing unit) serving as a central operation processing unit for performing various control or operation processes, an RAM 62 (random access memory) constituting a main storage device (main storage), and an ROM 64 (read only memory) serving as an exclusive reading storage device are connected to one another through an inner bus 68 composed of a PCI (peripheral component interconnect) bus or an ISA (industrial standard architecture) bus, and an external storage device 70 (secondary storage device) such as an HDD or the like, an output device 72 such as a printing unit 13, a CRT monitor, an LCD monitor or the like, an input device 74 such as an operation panel, a mouse, a keyboard, a scanner or the like, and a network cable L which communicates with a printing instruction device (not shown) or the like are connected to the bus 68 through an input/output interface (I/F) 66.

In addition, if a power is supplied, a system program such as a BIOS or the like stored in the ROM 64 or the like loads various exclusive computer programs stored in the ROM 64 in advance or various exclusive computer programs installed in the storage device 70 through a storage medium such as a CD-ROM, a DVD-ROM, and a flexible disk (FD) or a communication network such as the Internet or the like on the RAM 62 in the same manner, and the CPU 60 performs predetermined control and operation processes by driving various resources in accordance with commands described in the programs loaded on the RAM 62 and makes the above-mentioned respective functions implemented on the software.

Figure 5:
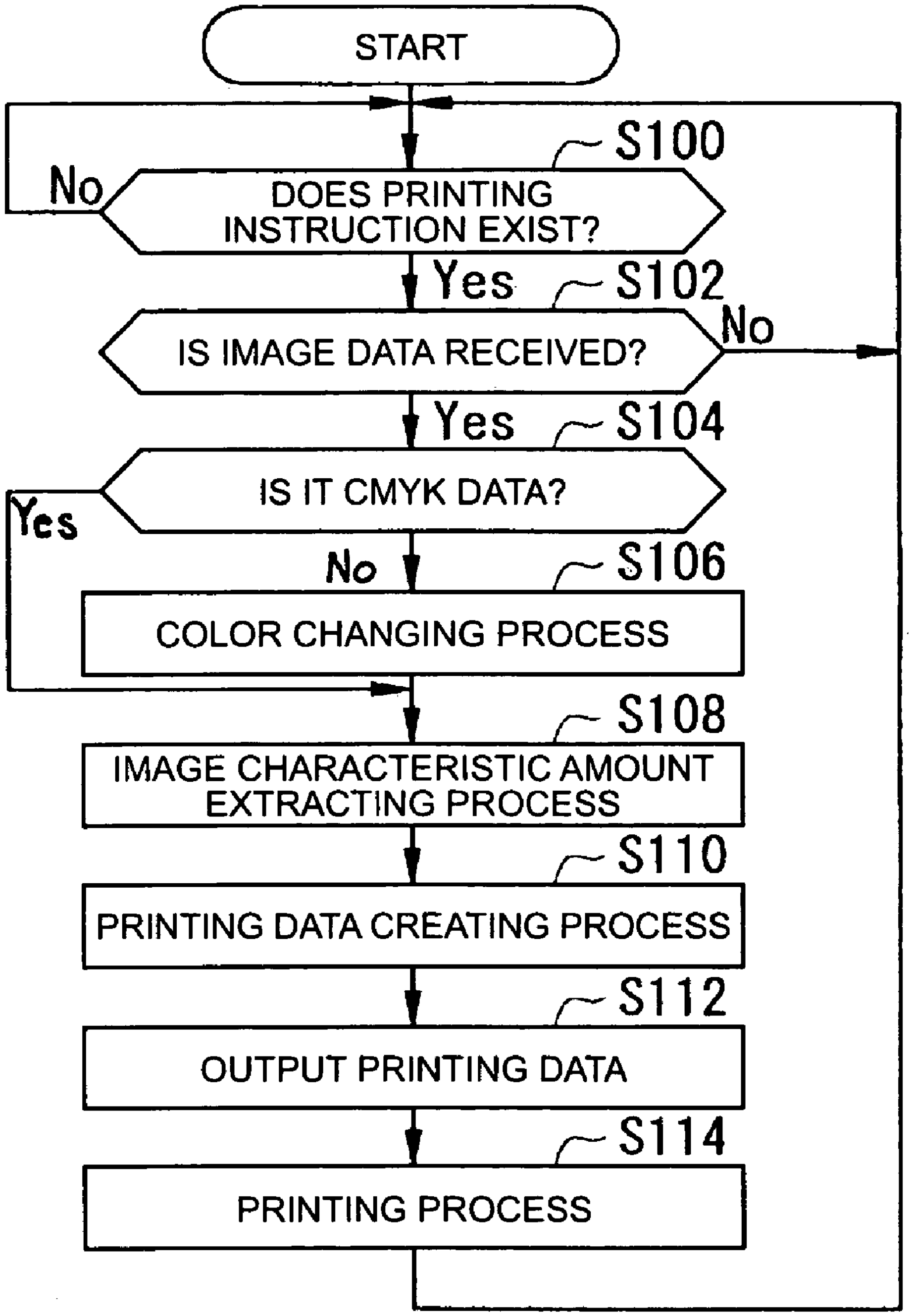
FIG. 5 is a flowchart illustrating a printing process of the printing device 100.

Further, the printing device 100 drives a predetermined program stored in a predetermined region of the ROM 64 by the CPU 60, and executes a printing process illustrated in a flowchart of FIG. 5 in accordance with the corresponding program. In addition, as described above, generally, the printing head 200 for forming dots forms dots of a plurality of kinds of colors (four colors and six colors) of dots at the almost same time. In the present embodiment, the printing head 200 has nozzle modules corresponding to the ink of the four colors of CMYK.

FIG. 5 is a flowchart illustrating a printing process in the printing device 100.

If the CPU 60 executes the printing process, first, the process proceeds to step S100, as shown in FIG. 5.

In step S100, in the image data acquiring unit 10, printing instruction information is transmitted from an external device connected through the network cable L or printing instruction information is input through the input device 74, so that it is determined whether printing has been instructed or not. In this case, if it is determined that the printing has been instructed (Yes), the process proceeds to step S102, and if it is determined that the printing has not been instructed (No), a determination process is repeated until the printing is instructed.

When the process proceeds to step S102, the image data acquiring unit 10 performs a process for acquiring image data of an M value corresponding to the printing instruction from a recording medium such as an external device, a CD-ROM, a DVD-ROM or the like and a storage device 70 such as an HDD or the like, as described above. Thereby, it is determined whether the first image data has been acquired or not. In this case, if it is determined that the first image data has been acquired (Yes), the acquired first image data is transmitted to the second image data creating unit 11, and a process proceeds to step S104. In contrast, if it is determined that the first image data has not been acquired (No), a message indicating that the printing cannot be performed is transmitted to a printing instruction source, then the printing process with respect to the printing instruction is discarded and then the process proceeds to step S100.

When the process proceeds to step S104, the image data acquiring unit 10 determines whether the image data of the M value acquired in step S102 is image data having color information of CMYK, and if it is determined that the image data of the M value acquired in step S102 is not image data having color information of CMYK (No), the process proceeds to step S106. In contrast, if the image data of the M value acquired in step S102 is image data having color information of CMYK (Yes), the image data acquired in step S102 is transmitted to the image characteristic amount extracting unit 11 as it is, and the process proceeds to step S108.

When the process proceeds to step S106, since the image data acquired in the step S102 is image data having the color information other than CMYK, the image data acquiring unit 10 converts the image data into the CMYK image data having the color information of CMYK, and transmits the CMYK image data to the image characteristic amount extracting unit 11. Then, the process proceeds to step S108.

In step S108, the image characteristic amount extracting unit 11 executes the image characteristic mount extracting process with respect to the CMYK image data transmitted from the image data acquiring unit 10 so as to extract the image characteristic amount, and transmits the extracted image characteristic amount to the printing data creating unit 12. Then, the process proceeds to step S110.

In step S110, the printing data creating unit 12 executes the printing data creating process to create the printing data on the basis of the image characteristic amount transmitted from the image characteristic amount extracting unit 11. Then, the process proceeds to step S112.

In step S112, the printing data creating unit 12 outputs the printing data created in step S110 to the printing unit 13, and the process proceeds to step S114.

In step S114, the printing unit 13 executes the printing process on the basis of the printing data from the printing data creating unit 12, and the process proceeds to step S100.

Next, the image characteristic amount extracting unit of step S108 will be described in detail with reference to FIG. 6.

Figure 6:
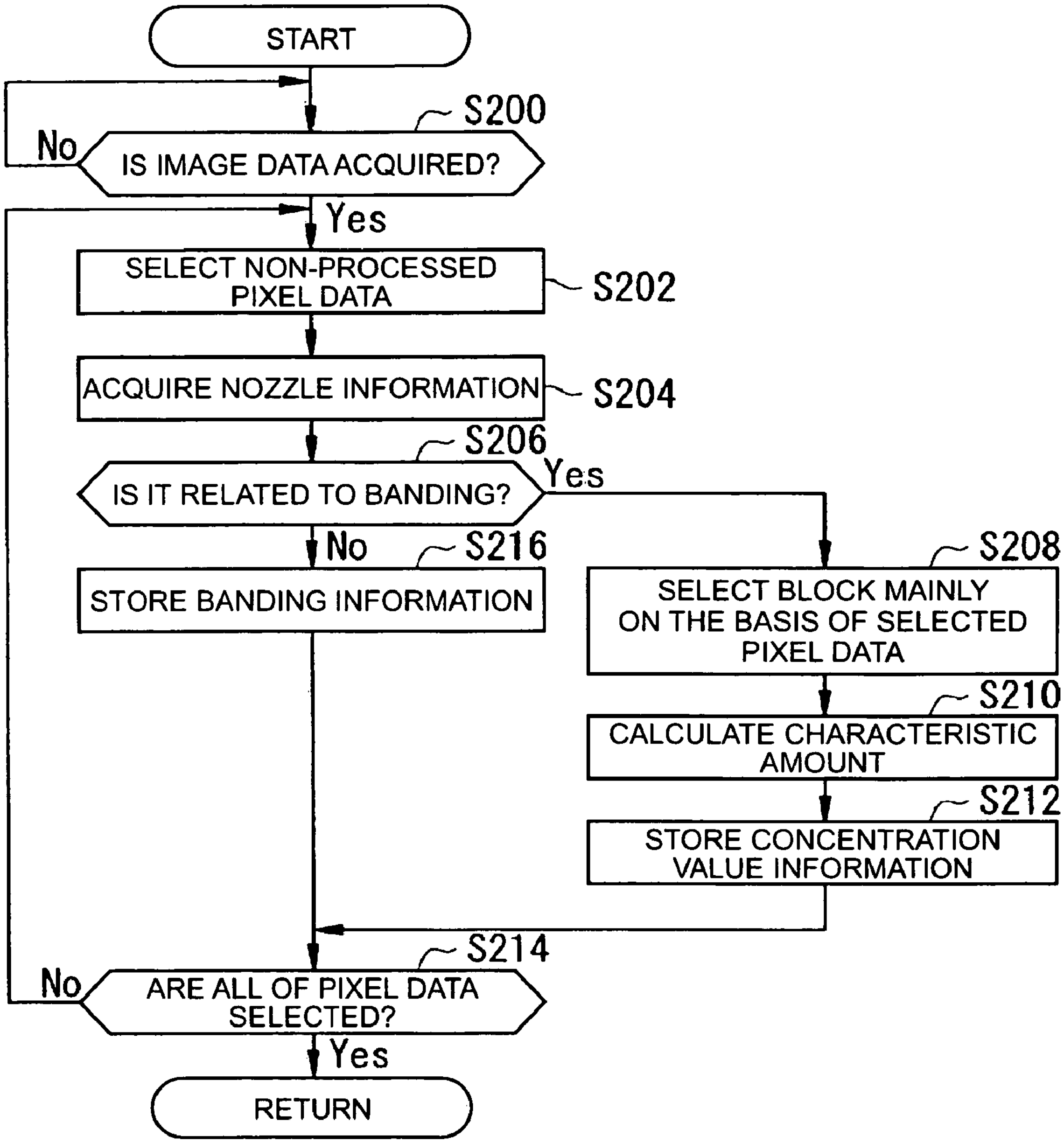
FIG. 6 is a flowchart illustrating an image characteristic amount extracting process in an image data creating unit 11 of the printing device 100 according to the first embodiment of the invention.

FIG. 6 is a flowchart illustrating the image characteristic amount extracting unit 11 of the printing device 100 according to the first embodiment of the invention.

The image characteristic amount extracting process determines whether the selected pixel data is related to the banding phenomenon or not, detects a maximum value and a minimum value of the pixel value of each block image for each pixel data as image characteristics on the pixel value of a block image composed of peripheral pixel data including the selected pixel data on the selected pixel data related to the banding phenomenon, and calculates an average value of the pixel value of the block image. In step S108, if the image characteristic mount extracting process is performed, first, the process proceeds to step S200, as shown in FIG. 6.

In step S200, the image characteristic amount extracting unit 11 determines whether the image data acquiring unit 10 acquires the CMYK image data, and when it is determined that the image data acquiring unit 10 acquires the CMYK image data (Yes), the process proceeds to step S202. In contrast, when it is determined that the image data acquiring unit 10 does not acquire the CMYK image data (No), the determining process is repeated until it is determined that the image data acquiring unit 10 acquires the CMYK image data (Yes).

When the process proceeds to S202, the image characteristic amount extracting unit 11 selects the pixel data where the image characteristic amount extracting process is not performed from the CMYK image data, and the process proceeds to step S204.

In step S204, the image characteristic amount extracting unit 11 acquires the nozzle information of the nozzle corresponding to the selected pixel data from the nozzle information storing unit 14, and the process proceeds to step S206.

In step S206, the image characteristic amount extracting unit 11 whether the nozzle corresponding to the selected pixel data is related to the banding or not. In this case, when it is determined that the nozzle corresponding to the selected pixel data is related to the banding (Yes), the process proceeds to step S208, and when it is determined that the nozzle corresponding to the selected pixel data is not related to the banding (No), the process proceeds to step S216.

In step S208, the image characteristic amount extracting unit 11 selects the block image composed of a plurality of pixel data around the selected pixel data including the selected pixel data, and the process proceeds to step S210.

In step S210, the image characteristic amount extracting unit 11 calculates the density characteristic amount on the basis of the pixel value (density value) of the pixel data constituting the block image selected in step S208, and the process proceeds to step S212.

In step S212, the image characteristic amount extracting unit 11 associates the density characteristic amount of the image calculated in step S210 (density value information) with each pixel data so as to be stored in a predetermined region of the storage device 70, and the process proceeds to step S214.

In step S214, the image characteristic amount extracting unit 11 determines whether all of the pixel data is selected or not. When it is determined that all of the pixel data is selected (Yes), a series of processes are completed, and the process returns to the original process. In contrast, when it is determined that all of the pixel data is not selected (No), the process proceeds to step S202.

In the meantime, when the it is determined that the nozzle corresponding to the selected pixel data is not related to the banding in step S206 and the process proceeds to step S216, the image characteristic amount extracting unit 11 associates information indicating a message that the nozzle corresponding to the selected pixel data is not related to the banding (density value information) with the selected pixel data so as to be stored in the predetermined region of the storage device 70, and the process proceeds to step S214.

Next, the printing data creating process of step S110 will be described with reference to FIG. 7.

Figure 7:
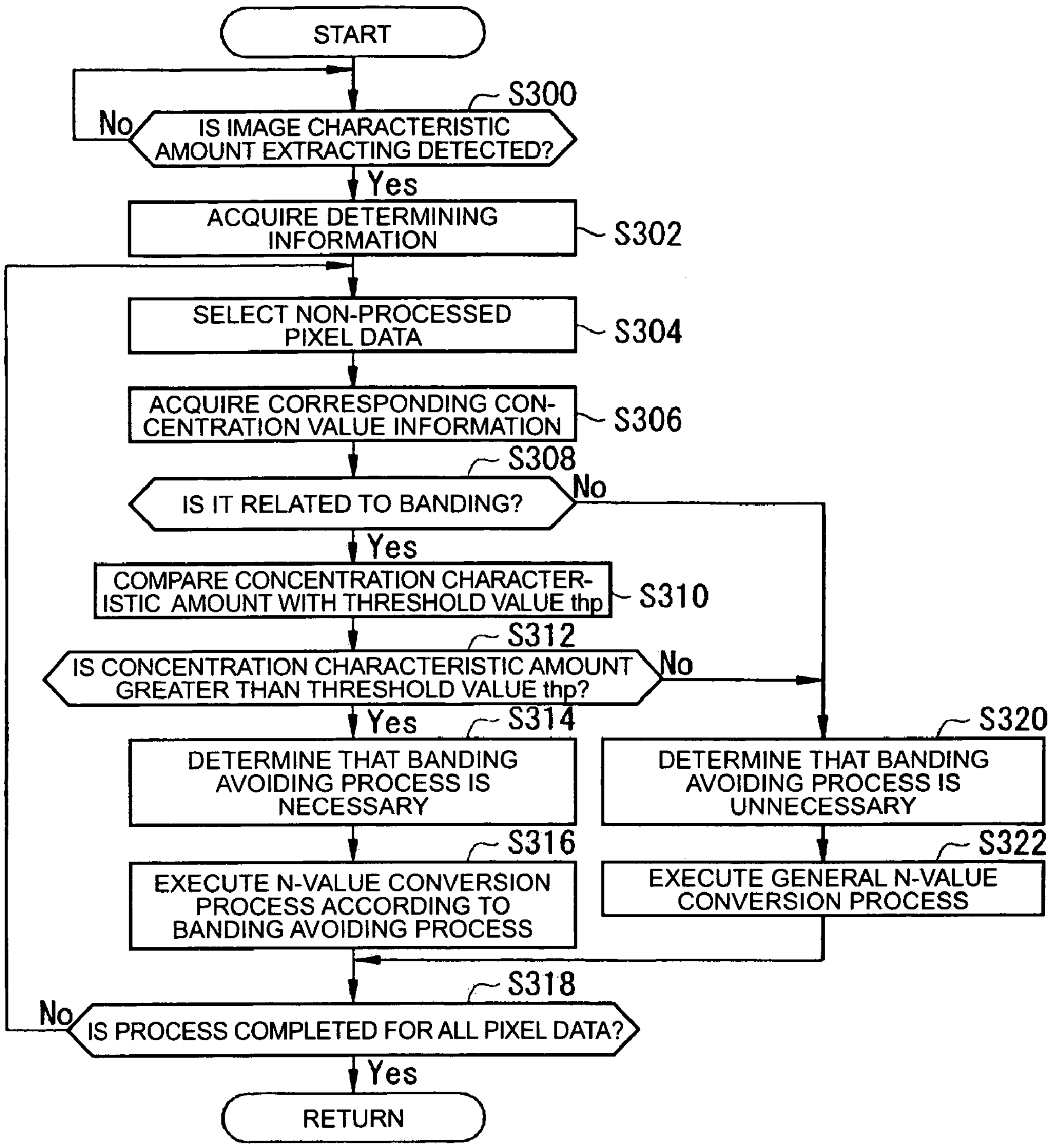
FIG. 7 is a flowchart illustrating a printing data creating process in a printing data creating unit 12 of the printing device 100 according to the first embodiment of the invention.

FIG. 7 is a flowchart illustrating a printing data creating process in the printing data creating unit 12 of the printing device 100 according to the first embodiment of the invention.

The printing data creating process creates printing data by determining whether the N-value conversion process according to the banding avoiding process with the each pixel data on the basis of the image characteristic amount (density value information) for each block corresponding to the each pixel data extracted by the image characteristic amount extracting unit 11 and the determining information stored in the determining information storing unit 12*b*, performing the N-value conversion process according to the banding avoiding process with respect to the pixel data (and peripheral pixel data) determined that the N-value conversion process according to the banding avoiding process is performed, and performing a general N-value converting process with the pixel data determined that the N-value conversion process according to the banding avoiding process is not determined. If the printing data creating process is executed in step S110, first, the process proceeds to step S300, as shown in FIG. 7.

In step S300, the process content determining unit 12*a* determines whether the CMYK image data after extracting the image characteristic amount by the image characteristic amount extracting unit 11 is acquired or not, and determines whether the image characteristic amount extracting process is completed or not. When it is determined that the image characteristic amount extracting process is completed (Yes), the process proceeds to step S302, and when it is determined that the image characteristic amount extracting process is not completed (No), the determining process is repeated until it is determined that the image characteristic amount extracting process is completed.

When the process proceeds to step S302, the determining information is read out from the determining information storing unit 12*b*, the read determining information is stored in the predetermined region of the RAM 62, and the determining information is acquired. Then, the process proceeds to step S304.

In step S304, the process content determining unit 12*a* selects from the CMYK image data the pixel data where the determining process is not performed, and the process proceeds to step S306. In addition, the determining process is performed for each pixel data and each color of the CMYK image data.

In step S306, the process content determining unit 12*a* acquires from the storage device 70 the density value information corresponding to the selected pixel data, and the process proceeds to step S308.

In step S308, the process content determining unit 12*a* determines whether the selected pixel data is related to the banding or not on the basis of the density value information. When it is determined that the selected pixel data is related to the banding (Yes), the process proceeds to step S310, and when it is determined that the selected pixel data is not related to the banding (No), the process proceeds to step S320.

In step S310, the process content determining unit 12*a* compares a density characteristic amount of the image which is image characteristic amount information corresponding to the selected pixel data with the threshold value thp, and the process proceeds to step S312.

In step S312, the process content determining unit 12*a* determines whether the density characteristic amount of the selected pixel data with respect to the block image is greater than the threshold value thp on the basis of the comparison result in step S310 (whether the deterioration of the image quality due to the banding phenomenon is visible or not). In this case, when it is determined that the density characteristic amount of the selected pixel data with respect to the block image is greater than the threshold value thp (the deterioration of the image quality due to the banding phenomenon is visible) (Yes), the process proceeds to step S314, and when it is determined that the density characteristic amount of the selected pixel data with respect to the block image is not greater than the threshold value thp (No), the process proceeds to step S320.

When the process proceeds to step S314, the process content determining unit 12*a* determines that the banding avoiding process is necessary for the selected pixel data, and the process proceeds to step S316. In the present embodiment, when the banding avoiding process is necessary, the execution ratio of the banding avoiding process is also determined in accordance with the image characteristic amount (in this case, density characteristic amount).

In step S316, the N-value conversion processing unit 12*d* executes the N-value conversion process according to the banding avoiding process with respect to the selected pixel data, and the process proceeds to step S318.

In step S318, the process content determining unit 12*a* determines whether the determining process and the N-value conversion process are completed or not with respect to all the pixel data in the CMYK image data. When it is determined that the determining process and the N-value conversion process are completed with respect to all the pixel data in the CMYK image data (Yes), a series of processes are completed, and the process returns to the original process. In contrast, when it is determined that the determining process and the N-value conversion process are not completed with respect to all the pixel data in the CMYK image data (No), the process proceeds to step S304.

In the meantime, when it is determined in step S312 that the density characteristic value is not more than the threshold value thp or it is determined in step S308 that the selected pixel data is not related to the banding and the process proceeds to step S320, the process content determining unit 12*a* determines that the banding avoiding process is necessary for the selected pixel data, and the process proceeds to step S322.

In step S322, the N-value conversion processing unit 12*d* acquires the N-value conversion information from the N-value conversion information storing unit 12*e*, and executes the general N-value conversion process with respect to the selected pixel data. Then, the process proceeds to step S318.

Next, the N-value conversion process according to the banding avoiding process of step S316 in the present embodiment will be described in detail with reference to FIG. 8.

Figure 8:
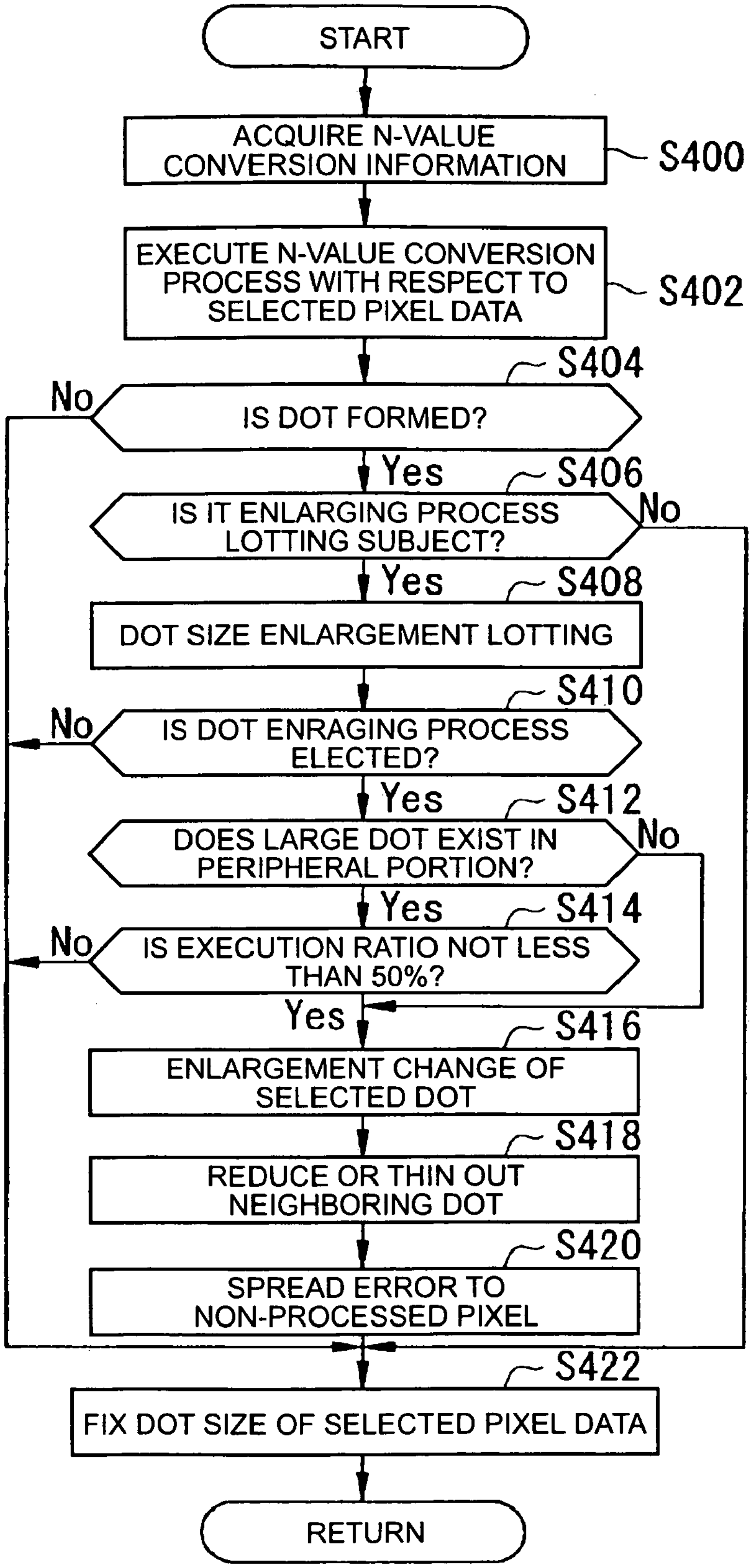
FIG. 8 is a flowchart illustrating an n-value conversion process according to a banding avoiding process in a printing data creating unit 12 of a printing device 100 according to the first embodiment of the invention.

FIG. 8 is a flowchart illustrating an N-value conversion process according to the banding avoiding process in the printing data creating unit 12 of the printing device 100 according to the first embodiment of the invention.

The N-value conversion process according to the banding avoiding process executes the N-value conversion process according to the banding avoiding process with respect to the pixel data determined by the process content determining unit 12*a* that the banding avoiding process is necessary. If the N-value conversion process is executed in step S316, first, the process proceeds to step S400, as shown in FIG. 8.

In step S400, the N-value conversion processing unit 12*d* reads out the N-value conversion information from the N-value conversion information storing unit 12*e*, and the process proceeds to step S402.

In step S402, the N-value conversion processing unit 12*d* executes the N-value conversion process with respect to the selected pixel data on the basis of the read N-value conversion information in step S400, and the process proceeds to step S404.

In step S404, the N-value conversion processing unit 12*d* determines whether the dot of the selected pixel data is formed or not on the basis of the result of the N-value conversion process in step S402. In this case, when it is determined that the dot of the selected pixel data is formed (Yes), the process proceeds to step S406. In contrast, when it is determined that the dot of the selected pixel data is not formed (No), the process proceeds to step S422.

When the process proceeds to step S406, the N-value conversion processing unit 12*d* determines whether the selected pixel data is the lotting subject of the dot enlarging process. When it is determined that the selected pixel data is the lotting subject of the dot enlarging process (Yes), the process proceeds to step S408. In contrast, when it is determined that the selected pixel data is not the lotting subject of the dot enlarging process (No), the process proceeds to step S422. In the present embodiment, the pixels of the lotting subject, that is, the pixels corresponding to the abnormal nozzle becoming the banding occurrence factor and the nozzle adjacent to the abnormal nozzle are set to the execution lotting subject of the dot enlarging process.

When the process proceeds to step S408, using the execution ratio set by the process content determining unit 12*a*, the N-value conversion processing unit 12*d* performs a lotting process determining whether the dot enlarging process is executed or not, and the process proceeds to step S410. In the present embodiment, the lotting process using a predetermined random number according to the execution ratio is performed.

When the process proceeds to step S410, the N-value conversion processing unit 12*d* determines whether the selected pixel data is elected as the dot enlarging process subject in the lotting process of step S408. When it is determined that the selected pixel data is elected as the dot enlarging process subject (Yes), the process proceeds to step S412, and when it is determined that the selected pixel data is not elected as the dot enlarging process subject (No), the process proceeds to step S422.

When the process proceeds to step S412, the N-value conversion processing unit 12*d* determines whether the previously process 'large' dot exists or not around the selected pixel. In this case, when it is determined that the previously process 'large' dot exists around the selected pixel (Yes), the process proceeds to step S414. In contrast, when it is determined that the previously process 'large' dot does not exist around the selected pixel (No), the process proceeds to step S416.

When the process proceeds to step S414, the N-value conversion processing unit 12*d* determines whether the execution ratio is equal to or greater than 50%. In this case, when it is determined that the execution ratio is equal to or greater than 50% (Yes), the process proceeds to step S416. In contrast, when it is determined that the execution ratio is less than not 50% (No), the process proceeds to step S422.

When the process proceeds to step S416, the N-value conversion processing unit 12*d* executes the dot enlarging process with respect to the dot of the selected pixel data, and the process proceeds to step S418.

In step S418, the N-value conversion processing unit 12*d* executes the reducing process or thinning process with respect to the dot of the previously process pixel located in the vicinity of the pixel of the selected pixel data, and the process proceeds to step S420. The dot reducing process and the thinning process changes the size of the dot of the previously process pixel located in the vicinity of the pixel of the selected pixel data to a small size by one stage. When the neighboring dot has the smallest size, the corresponding dot is subjected to the thinning process.

In step S420, the error by the dot size change of each dot generated by the enlargement change of the selected pixel and the reducing process or thinning process of the peripheral pixel spreads to the non-process pixel, and the process proceeds to step S422.

In step S422, the dot side with respect to the selected pixel data is fixed, and a series of process is completed. Then, the process returns to the original process.

Next, the operation according to the embodiment of the invention will be described with reference to FIGS. 9 to 16.

Figure 9A:
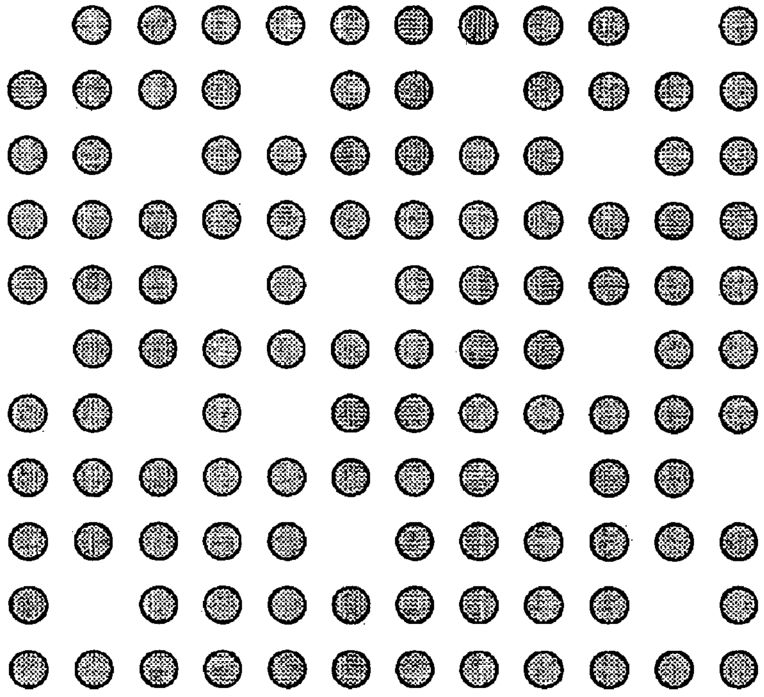
FIG. 9A is a diagram illustrating an example of a dot pattern formed by a cyan nozzle module 50 where an abnormal nozzle, which causes a so-called flying curve to occur, does not exist.
Figure 9B:
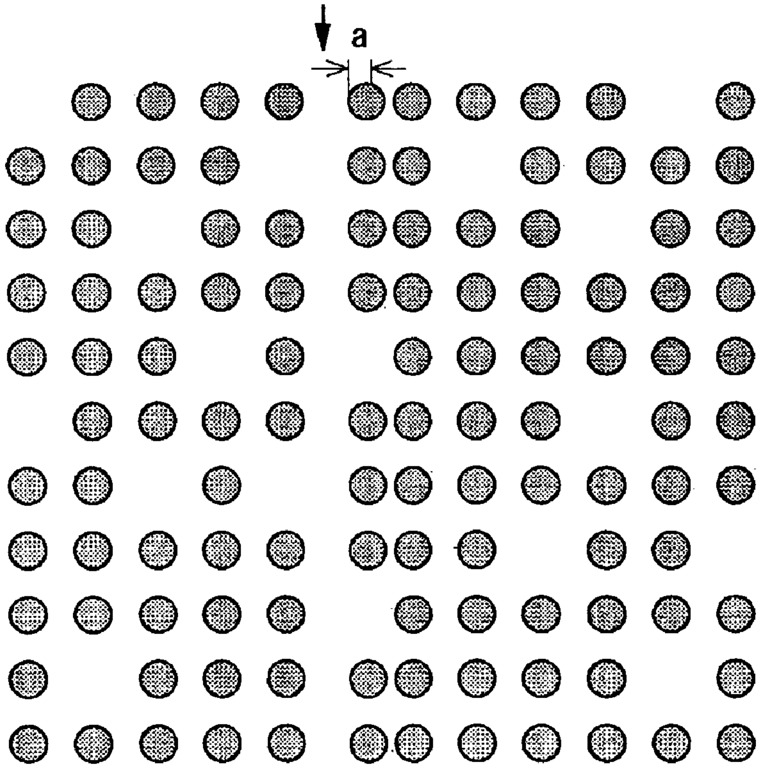
FIG. 9B is a diagram illustrating an example of a dot pattern formed when a nozzle N6 of the cyan nozzle module 50 causes a flying curve to occur.
Figure 10:
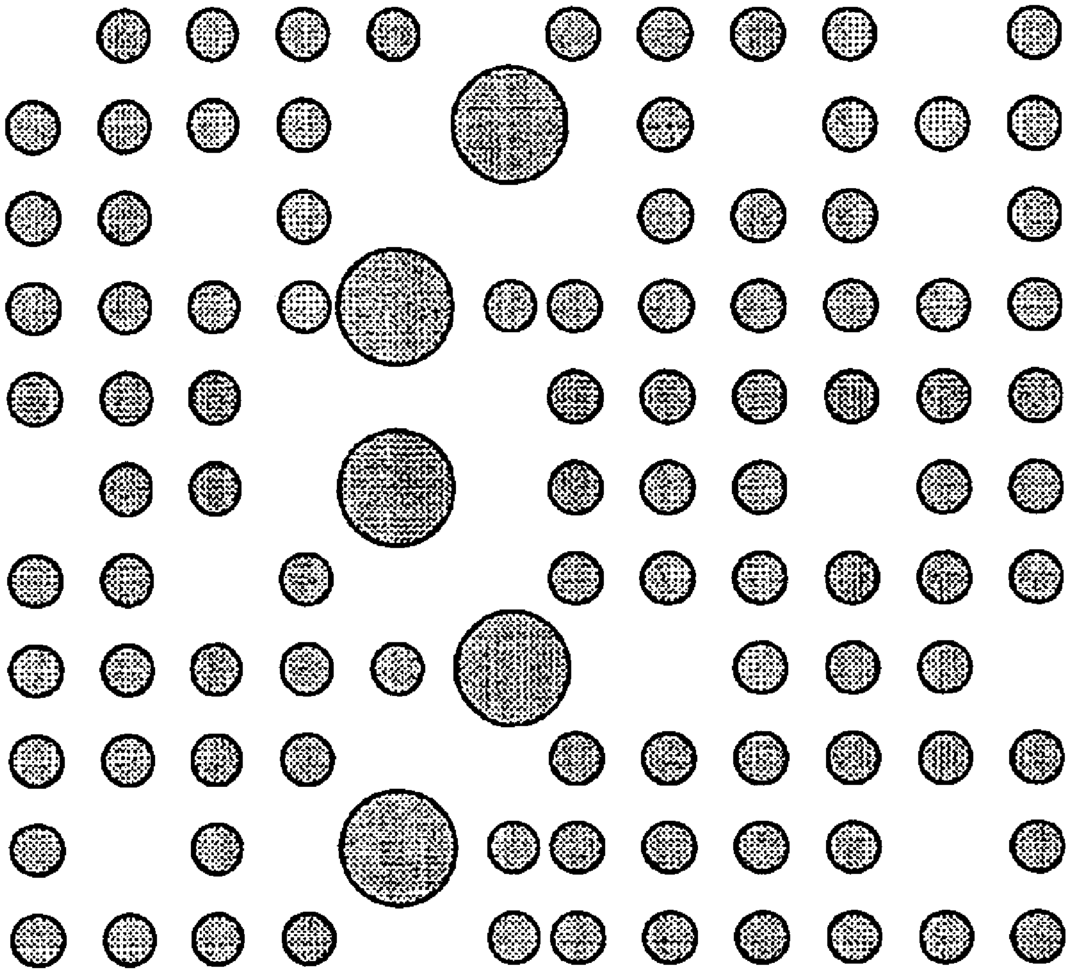
FIG. 10 is a diagram illustrating an example of a dot pattern which is subjected to a banding avoiding process.
Figure 11A:
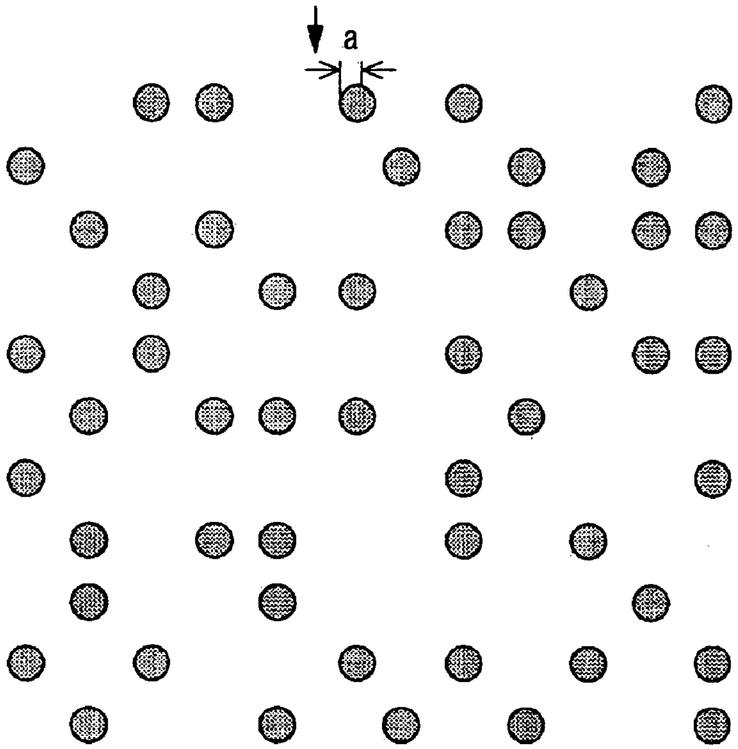
FIG. 11A is a diagram illustrating an example of a dot pattern which has a low printing density and is formed when a nozzle N6 causes a flying curve phenomenon.
Figure 11B:
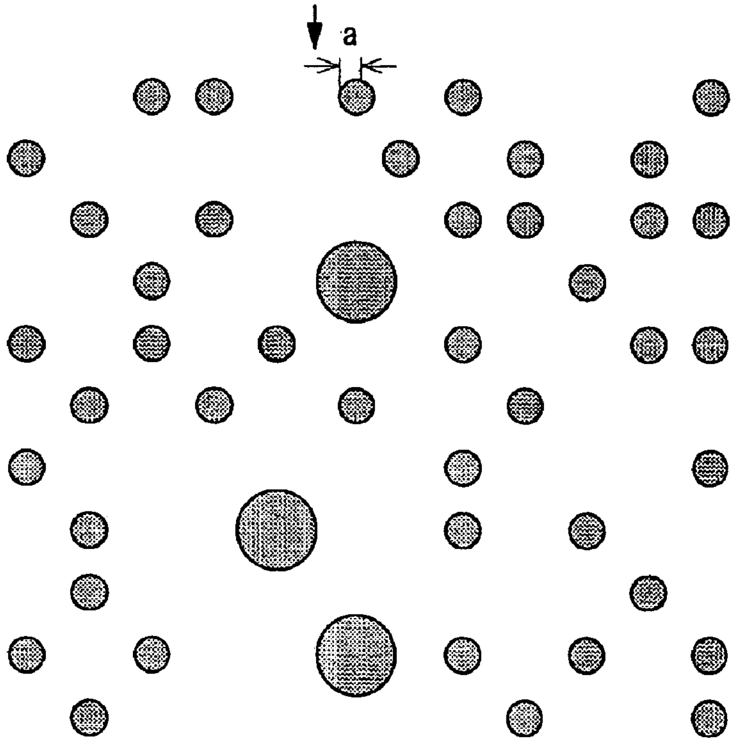
FIG. 11B is a diagram illustrating an example of a case in which a banding avoiding process is performed for the dot pattern of FIG. 11A.
Figures 12, 13:
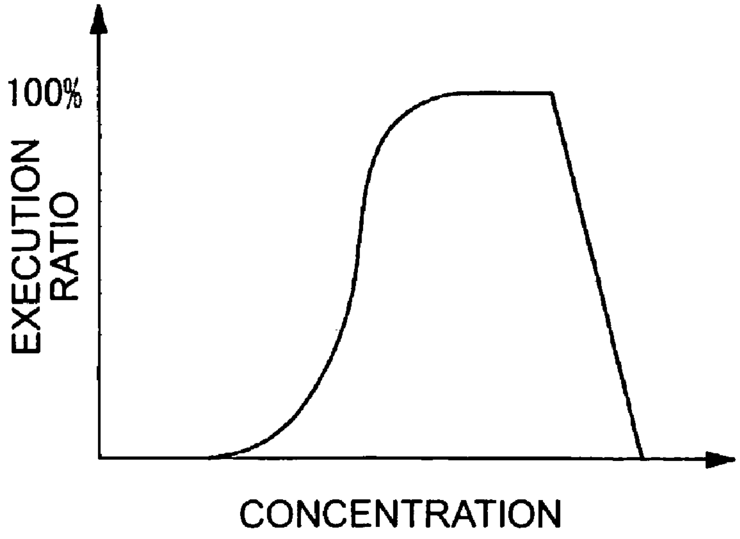
FIG. 12 is a diagram illustrating an example of a threshold value thp which is set for every ink color of CMYK.
FIG. 13 is a diagram illustrating a relationship between a representative density value of a block image and an execution ratio of a banding avoiding process.
Figures 14, 15:
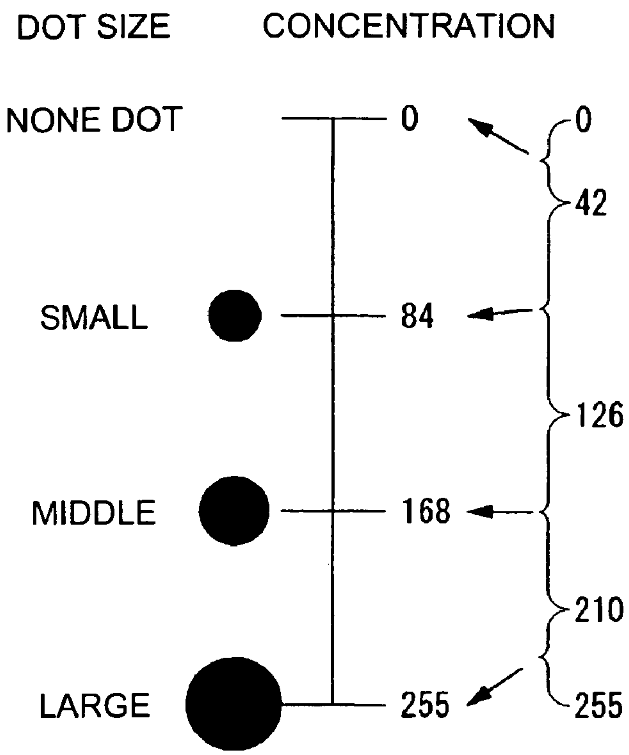
FIG. 14 is a diagram illustrating an example of information of an N value with respect to a dot size and an example of information of a threshold value with respect to each N value.
FIG. 15 is a diagram illustrating an example of an error spread matrix used for an N-value conversion process.

FIG. 9A is a diagram illustrating an example of a dot pattern formed by only a black nozzle module 50 in which there is no abnormal nozzle that causes a so-called flying curve phenomenon to occur, and FIG. 9B is a diagram illustrating an example of a dot pattern formed when a nozzle N6 of the black nozzle module 50 causes a flying curve phenomenon to occur. FIG. 10 is a diagram illustrating an example of a dot pattern which is subjected to a banding avoiding process. FIG. 11A is a diagram illustrating an example of a dot pattern which has a low printing density and which is formed when a nozzle N6 causes a flying curve phenomenon. FIG. 11B is a diagram illustrating an example of a case in which a banding avoiding process is performed for the dot pattern of FIG. 11A. FIG. 12 is a diagram illustrating an example of a threshold value thp which is set for every ink color of CMYK. FIG. 13 is a diagram illustrating a relationship between a representative density value of a block image and an execution ratio of a banding avoiding process. FIG. 14 is a diagram illustrating an example of information of an N value with respect to a dot size and an example of information of a threshold value with respect to each N value. FIG. 15 is a diagram illustrating an example of an error spread matrix used for an N-value conversion process. FIG. 16 is a conceptual diagram illustrating a dot changing course in an N-value conversion process according to a banding avoiding process.

As shown in FIG. 9A, in the dot pattern formed by the black nozzle module 50 in which there is no abnormal nozzle causing the flying curve phenomenon to occur, as described above, banding, such as 'white stripes' or 'thick stripes', which is caused by the variation between the nozzle intervals, does not occur.

In the meantime, as shown in FIG. 9B, according to the printing result by the black nozzle module 50 including the abnormal nozzle causing the flying curve to occur, the dots formed by the abnormal nozzle N6 are shifted to the dots formed by a normal nozzle N7 adjacent to the nozzle N6 in a right direction by a distance a. As a result, there occur 'white stripes' between the dots formed by the nozzle N6 and the dots formed by the nozzle N5 adjacent to the nozzle N6 in a left direction.

The above-mentioned 'white stripe' is a so-called printing material 'coated over an entire surface'. When densities extremely different from each other are combined like a case in which the printing paper is white and ink is black, the white stripes may be strikingly seen, which results in deteriorating a quality of the printing material extremely.

In the meantime, when using not only the black nozzle module 50 but also the nozzle modules 52, 54, and 56 corresponding to other colors, as described above, the nozzle N6 is shifted by the distance d because of the flying curve, so that the distance between the nozzle N6 and the nozzle N7 adjacent to the nozzle N6 in the right direction becomes smaller by the distance a. As a result, the density of the dots formed by the nozzles N6 and N7 increases (the dots may overlap each other), and the corresponding portion becomes 'thick stripes' so as to be seen by people. Due to this, the quality of the printing material may be extremely deteriorated.

For this reason, the N-value conversion process (data conversion) is performed such that the sizes of the dots formed by the nozzle related to the flying curve phenomenon, that is, the abnormal nozzle N6, and the nozzles located near the abnormal nozzle N6 (in the drawing, nozzles N5 and N7) are changed from the original sizes or reduced (thinning out), so that as shown in FIG. 10, the large dots are formed at the portions of 'the white stripes', and the 'the white stripes' are eliminated or little seen. In addition, the banding avoiding process is preferably performed in which the area gradation of the modified portion is made to be equal to the area gradation of the other normal portion so as to surely prevent the modified portion from being seen.

However, as shown in FIG. 11A, since the dots are formed at intervals at locations where the printing density (density) is low, if the banding avoiding process shown in FIG. 10 is performed with respect to these locations, large dots are formed at intervals, as shown in FIG. 11B. In addition, since the process for reducing or thinning out the dots near the large dots is performed, granularity may be deteriorated, which results in deteriorating an image quality.

Accordingly, in the printing device 100 according to the present embodiment, it is determined on the basis of the nozzle information corresponding to the selected pixel data whether the selected pixel data is related to the banding or not, a predetermined image region including the pixel of the selected pixel data related to the banding is selected from the image of the image data on the basis of the determining result, and it is determined whether the banding avoiding process is necessary on the basis of the density information extracted from the predetermined image region. In addition, if necessary, the execution ratio of the banding avoiding process is determined on the density information, the banding avoiding process is not performed when the banding avoiding process does not need to be performed, and the banding avoiding process is performed by the ratio required for avoiding the banding when the banding avoiding process needs to be performed. In this manner, the printing data is can be created.

First, if the image data acquiring unit 10 of the printing device 100 acquires the image data, which corresponds to the printing instruction information and has color information of RGB, from an external device that is a transmitting source of printing instruction information (step S102), the image data acquiring unit 10 creates the CMYK image data obtained by color-converting the color information (RGB) of the acquired image data into CMYK (step S104), and transmits the created CMYK image data to the image characteristic amount extracting unit 11 (step S106).

In the meantime, if the image characteristic amount extracting unit 11 acquires the CMYK image data from the image data acquiring unit 10 (step S200), first, it selects from the acquired CMYK image data the pixel data where the image characteristic amount extracting process is not performed for each ink color (step S200). Next, the image characteristic amount extracting unit 11 acquires from the nozzle information storing unit 14 the nozzle information of the nozzle corresponding to the selected pixel data (step S202), and determines whether the flying curve occurs in the nozzle corresponding to the selected pixel data or not and the corresponding nozzle enters an ink ejection failure state, on the basis of the acquired nozzle information (step S204). From this determination, when the flying curve does not occur and the corresponding nozzle does not enter an ink ejection failure state (it is determined that it is not related to the banding phenomenon), the image characteristic extracting unit 11 associates the information indicating that it is not related to the banding (density value information) with the selected pixel data and stores them in a predetermined region of the storage device 70 (step S216).

In the meantime, the nozzle corresponding to the selected pixel data causes the flying curve phenomenon to occur or enters an ink ejection failure state. Therefore, when it is determined that the selected pixel data is related to the banding phenomenon (branch of [Yes] of step S204), the image characteristic amount extracting unit 11 selects the block image composed of a rectangular region of 3 pixels×3 pixels including the selected pixel data (step S206). Further, in the present embodiment, the maximum density value and the minimum density value are detected from the pixel value (density value) on the basis of he the pixel value of the pixel data corresponding to the block image, and the density average value, which is an average value of each pixel data constituting the selected block image, is calculated (step S208).

That is, since one block is composed of nine pixels of 3 pixels×3 pixels, the maximum density value and the minimum density value are detected from the density values of the nine pixels, and the average value of the density values of the nine pixels is calculated. In addition, using the maximum density value, the minimum density value, and the density average value as the density value information, this density value information is associated with the selected pixel data so as to be stored in the storing device 70 (step S210).

In the present embodiment, the density characteristic value information becomes the image characteristic amount, the extracting process of the image characteristic amount is performed with respect to all the pixel data of the CMYK image data, and the image characteristic amount calculating process is completed. The image characteristic amount extracting unit 11 transmits to the printing data creating unit 12 the CMYK image data where the image characteristic amount extracting process is completed.

Further, if the printing data creating unit 12 acquires the CMYK image data from the image characteristic amount extracting unit 11 (step S300), the process content determining unit 12*a* acquires the determining information from the determining information storing unit 12*b* (step S302), and selects from the CMYK image data the pixel data where the determining process is not process for each ink color (step S304). In the present embodiment, the determining information includes the information of a determining method using the density value information and the information necessary for the determining process, such as the threshold value thp, which is used for the determining process.

Accordingly, if the non-processed pixel data is selected, the density value information corresponding to the selected pixel data is acquired from the storage device 70, and it is determined on the basis of the density value information whether the selected pixel data is related to the banding phenomenon or not (step S308). In addition, this determining process is performed by determining whether the information indicating a message that the selected pixel data is not related to the banding exists.

When the selected pixel data is related to the banding, each density characteristic amount included in the acquired density value information is compared with the threshold value thp on the basis of the acquired determining information (step S310), and it is determined on the basis of the comparison result whether the banding avoiding process is necessary for selected pixel data (step S312).

In the present embodiment, when the change such as gradation or the like is generated in the block image including the selected image data (all of the difference dma2 and the difference dmi2 are greater than a predetermined threshold value), since the density of the subject image including the selected pixel data cannot be accurately determined in the density average value, the density average value is not used in the following determining processes.

Specifically, the absolute value of the difference between the average density value and the maximum density value included in the density value information (hereinafter, referred to as maximum density value difference), and the absolute value of the difference between the minimum density value and the average density value (hereinafter, referred to as minimum density value difference) are calculated, the maximum density value difference dma1 and the threshold value thp are compared with each other, and the minimum density value difference dmi1 and the threshold value thp are compared with each other.

Further, the difference dma2 between the maximum density value difference dma1 and the threshold value thp and the difference dmi2 between the minimum density value difference dmi1 and the threshold value thp are calculated, it is determined whether all of the calculate differences dma2 and dmi2 are greater than the predetermined threshold value, and it is determined whether the maximum density value and the minimum density value are values which are very different from the average density value.

In addition, from the determining result, it is determined whether the density average value can be used in the following determining processes. Specifically, when the difference dma2 and the difference dmi2 are greater than the predetermined value, that is, when the maximum density value and the minimum density value are values which are very different from the average density value, it is determined that the maximum density value and the minimum density value are values which does not consider the average density value, and in the following determining processes, the determining is made in which the density average value is not used.

In the meantime, when the change of the gradation or the like is not generated in the selected block image (all of the differences dma2 and dmi2 are less than the predetermined value), the determining is made in which the average density value can be used in the following determining processes.

Accordingly, when the change of the gradation or the like is not generated in the selected block image and the average density value can be used in the determining process, the average density value is compared with the threshold value thp. In contrast, when the change of the gradation or the like is generated in the selected block image and the average density value cannot be used in the determining process, the maximum density value is compared with the threshold value thp in the present embodiment.

In this case, as shown in FIG. 12, the threshold value thp is set for each ink color of the CMYK. Specifically, the threshold value thp is '25 ' for the black ink (Bk), '30 ' for the cyan ink (Cy) and the magenta ink (Mg), and '60 ' for the yellow (Ye). That is, when the saturation of the ink is high, it is difficult for the banding to be seen. Therefore, it is possible to set the threshold value thp so as to a large value.

In addition, when the average saturation value or the maximum density value is greater than threshold value thp (branch of [Yes] of step S312), it is determined that the banding process is necessary (step S314).

That is, the density characteristic of the block image based on the selected pixel data can be determined by using the selected pixel data and the pixel data around the selected pixel data, so that it is determined whether the banding avoiding process is necessary for the selected pixel data.

Further, in the present embodiment, when the banding avoiding process is necessary, the execution ratio of the banding avoiding process is determined on the basis of the average density value or the maximum density value corresponding to the selected pixel data. In this case, as shown in FIG. 13, the execution ratio of the banding avoiding process is determined such that the execution ratio becomes '0%' when the average density value or the maximum density value is small, gradually increases when the average density value or the maximum density value increases, becomes '100%' in the specific density interval, and rapidly decreases to becomes '0%' when the density value is greater than that of the specific density interval. That is, in the density interval where banding is easily seen, it is determined that the execution ratio of the banding avoiding process becomes '100%'. In this manner, if the execution ratio of the banding avoiding process is determined, the N-value conversion processing unit 12*d* executes the N-value conversion process according to the banding avoiding process with respect to the selected pixel data on the basis of the determined execution ratio (step S316).

In the meantime, when it is determined that the nozzle corresponding to the selected pixel data is not related to the banding (branch of [Yes] of step S308), or when it is determined that the average density value or the maximum density value is less than the threshold value thp (branch of [No] of step S312), even though the banding avoiding process is unnecessary and not performed, the banding is not seen. Therefore, it is determined that the banding avoiding process is unnecessary (step S320).

Further, if the N-value conversion process according to the banding avoiding process is executed, first, the N-value conversion processing unit 12*d* reads out the N-value conversion information from the N-value conversion information storing unit 12*e* (step S400). Next, the N-value conversion process is executed with respect to the selected pixel data on the basis of the read N-value conversion information (step S402).

In the present embodiment, the N-value conversion process is as follows. In a case in which the original pixel value of the selected pixel data (density value or luminance value) is a 8-bit [256] gray-scale level, for example, if the pixel value is the density value, as shown in FIG. 14, when the original pixel value is less than a value within a range of [0] to [42], the corresponding pixel value is set to [0], the corresponding N value is set to [0] (the dot is not formed), when the original pixel value is less than a value within a range of [42] to [126], the corresponding pixel value is set to [84], the corresponding N value is set to [1] (the dot is formed) with respect to a small-sized dot, when the original pixel value is less than a value within a range of [126] to [210], the corresponding pixel value is set to [168], the corresponding N value is set to [1] (the dot is formed) with respect to a middle-sized dot, and when the original pixel value is less than a value within a range of [210] to [255] (it may be 255 or more), the corresponding pixel value is set to [255], the corresponding N value is set to [1] with respect to a large-sized dot.

In addition, the above-mentioned example corresponds to a case using the density as the pixel value. Alternatively, when using the luminance as the pixel value, a value opposite to the density is taken with respect to the dot of each size.

In the present embodiment, by the N-value conversion process, the data of the gray-scale direction of the image is converted into a gray-scale direction and an area gray-scale level for every color of CMYK according to the performance of the ink ejection mechanism. As shown in FIG. 14, as an example of the performance of the ink ejection mechanism, if the printing can be performed by the three kinds of dot forming sizes, four gray-scale display can be made with respect to each ink, including a state in which the dots are not formed. That is, the four gray scale levels and area gray-scale levels are mixed with each other so as to reproduce a full gray-scale level. When the dot size is restricted to only one kind, two gray-scale levels indicating whether the dots are formed or not and the area gray-scale levels are mixed so as to reproduce a full gray-scale level.

In addition, as a technical method of controlling the dot size, in a case of a type in which a piezoelectric element (piezo actuator) is used in a printing head, the ink ejection amount is controlled by changing a voltage applied to the piezoelectric element, so that the dot size can be easily controlled.

If the N-value conversion process is performed with respect to the selected pixel data, the error between the density value of the selected pixel data before the N-value conversion process and the density value corresponding to each dot size after the N-value conversion process is calculated, and an error spread process, which spreads the calculated error to the pixel where the N-value conversion process at the periphery of the pixel of the selected pixel data is not performed on the basis of the error spread matrix illustrated in FIG. 15, is performed.

In this case, the error spread process is the same as the error spread process according to the related art. For example, if the binarization process is exemplified as the N-value conversion process, in a case in which the target pixel becoming the process subject can be represented with eight bits (256 gray-scale levels) and the gray-scale level of the target pixel is [101], since the gray-scale level thereof does not satisfy [128] being the threshold value (middle value) in the general binarization process, the process is performed as [0], that is, the pixel where the dot is not formed, and [101] is discarded as it is. In the meantime, in a case of the error spread process, since the [101] is spread to the peripheral non-process pixel in accordance to the predetermined error spread matrix, for example, since the value of the pixel adjacent to the selected pixel in the right side does not satisfy the same threshold value as the selected pixel by only the general binarization process, the process that [the dot is not formed] may be performed. However, the density value exceeds the threshold value by receiving the error of the selected pixel, so that the process that the dot is formed may be performed. Therefore, it is possible to obtain the binarization data similar to the original image data.

That is, since the density value for each dot forming size is used in the error spread process, the difference between the density value of the original pixel data and the density value of the corresponding dot forming size after performing the N-value conversion process is spread to the peripheral non-process pixel data as the error.

In addition, the above-mentioned N-value conversion process and the error spread process become the general N-value conversion process with respect to the selected pixel data.

Further, if the N-value conversion process and the error spread process are completed with respect to the selected pixel data, the banding avoiding process is executed with respect to the pixel data. In the present embodiment, first, when the dot is formed with respect to the selected pixel data (branch of [Yes] of step S404) or when the pixel data is the lotting process subject (branch of [Yes] of step S406), the banding avoiding process executes performs the lotting process using a random number (step S410). In this case, the selected pixel data is set to the pixel data corresponding to the nozzle N6 and the average density value of the block image included in the nozzle N6 is set to be greater than the execution ratio 50%, and the lotting process is executed.

By using the lotting process, if the selected pixel data is elected as the execution subject of the dot enlarging process being the banding avoiding process in the present embodiment (branch of [Yes] of step S410), when the dot of 'the large size' does not exist in the dot of the peripheral pixel data where the process is completed (in this case, only the dot above the selected pixel data) (branch of [No] of step S412), the dot enlarging process is executed with respect to the selected pixel data (step S416). In contrast, when the pixel data of 'the large size' exists in the vicinity of the dot of the selected pixel data, it is determined whether the execution ratio is greater than 50% (step S414). In the present embodiment, since the execution ratio is greater than 50%, the dot enlarging process is executed with respect to the selected pixel data (step S416). That is, by the determining process, when the execution ratio is high (in this case, 50% or more), the dot enlarging process is actively performed. In addition, if the dot of the selected pixel data is enlarged by the dot enlarging process, the process is executed for reducing or thinning out the size of the dot of the pixel data which is in the vicinity of the dot of the selected pixel data and in which the process is completed (step S418). In addition, when the selected pixel data is not elected in the lot of the enlarging process or the peripheral dot is a large dot and the execution ratio is less than 50%, the dot size of the selected pixel data is fixed at the current dot size (step S422).

Figure 16A:
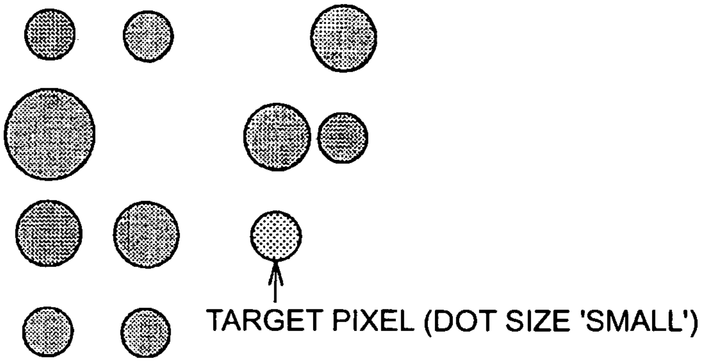
FIG. 16 is a conceptual diagram illustrating a dot changing course in an N-value conversion process according to a banding avoiding process.
Figure 16B:
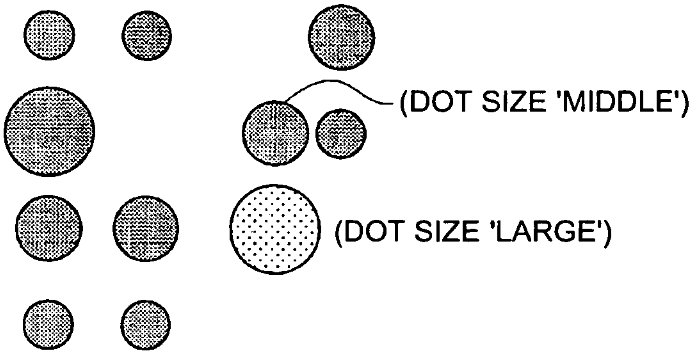

The description will now be made with respect to the case in which the description the dot of the selected pixel data becomes 'the small dot' and the corresponding pixel data is elected as the execution subject of the dot enlarging process by the lotting process, as shown in FIG. 16A. As shown in FIG. 16A, since the dot right above the dot of the selected pixel data is 'the middle dot', the dot enlarging process is executed, and the dot size of the selected pixel data is changed from 'the small dot' to 'the large dot', as shown in FIG. 16B. Thereby, since the large dot is formed at the white stripe caused by the flying curve phenomenon, the white stripe can be eliminated or can be made such that it is not seen.

Figure 16C:
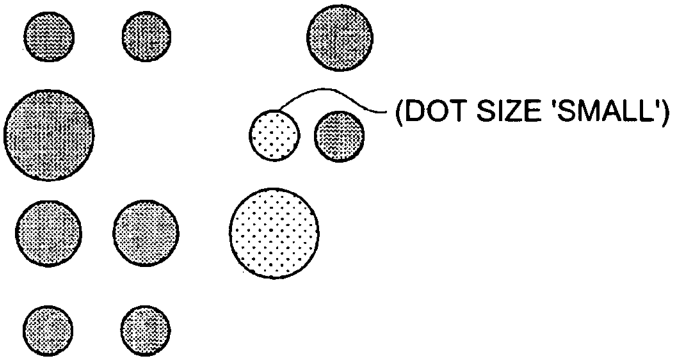

Further, since the dot right above the dot subjected to the enlarging process is 'the middle dot', the size of the corresponding dot is changed to 'the small dot' smaller than 'the middle dot' by one stage, as shown in FIG. 16(C). Thereby, since the previously changed area gray-scale level of the selected pixel portion is substantially the same as the original area gray-scale level or the other area gray-scale level of the normal portion, it is possible to effectively resolve the problem that the corrected location may be seen more than the other portions.

If the N-value conversion process according to the banding avoiding process is completed with respect to the selected pixel data, the pixel data where the determining process is not performed is selected again, and the process determining whether the banding avoiding process is necessary and the determining process of the execution ratio are performed. That is, when the average density value or the maximum density value of each block image corresponding to the selected pixel data is greater than the threshold value thp and the nozzle corresponding to the selected pixel data is related to the banding, with respect to the selected pixel data (and the peripheral pixel data (for example, pixels of two to five)), the N-value conversion process according to the banding avoiding process executed with the ratio according to the average density value or the maximum density value, and with respect to the other pixel data other than the selected pixel data, if the corresponding pixel data corresponds to the nozzle related to the banding, the banding avoiding process is not executed.

In addition, if the determining process determining whether the banding avoiding process is necessary or not, the determining process of the execution ratio and the N-value conversion process are executed with respect to all the pixel data of the CMYK image data, the CMYK image data obtained after performing the N-value conversion process for the execution result is output to the printing unit 13 as the printing data (step S112).

In addition, in the printing unit 13, the dot according to the CMYK image data obtained after performing the N-value conversion process is formed (printed) on the printing medium by using the printing head 200 on the basis of the printing data output from the printing data creating unit 12 (step S114).

As such, the execution ratio of the dot enlarging process (banding avoiding process) for eliminating the banding is controlled on the basis of the density value information of the block image corresponding to each selected pixel data, and when the dot enlarging process is executed, the execution ratio of the dot enlarging process with respect to the selected block is controlled on the basis of the density value information. Therefore, it is possible to suppress the original quality of the printed image from being deteriorated due to the dot enlarging process at the minimum, and it is possible to improve the image quality, as compared with the printing result of a case in which the banding avoiding process is executed without considering the density value information of the process subject image.

In the first embodiment, the image data acquiring unit 10 corresponds to the image data acquiring unit of the form 2 or 49, the process determining whether the selected pixel data in the image characteristic amount extracting unit 11 is related to the banding phenomenon corresponds to the banding determining unit of the form 2 or 49, the extracting process which extracts the characteristic amount from the predetermined image region on the basis of the selected pixel data related to the banding the image characteristic amount detecting unit 11 corresponds to the characteristic amount detecting unit of any one of the above-mentioned aspects, the determining process determining whether the N-value conversion process according to the banding avoiding process in the printing data creating unit 12 is performed or not corresponds to the deterioration determining unit of any one of the above-mentioned aspects, the N-value conversion process and the printing data creating process in the printing data creating unit 12 correspond to the printing control unit of the form 1 or the printing data creating unit of any one of the above-mentioned aspects, and the printing unit 20 corresponds to the printing unit of any one of the above-mentioned aspects.

Further, in the present embodiment, steps S102 to 106 correspond to the image data acquiring step of any one of the above-mentioned aspects, step S108 corresponds to the banding determining step of any one of the above-mentioned aspects, and the characteristic amount information extracting step of any one of the above-mentioned aspects, step S110 corresponds to the deterioration degree determining step of any one of the above-mentioned aspects, and the printing data creating step of any one of the above-mentioned aspects, and step S114 corresponds to the printing step of any one of the above-mentioned aspects.

Further, in the first embodiment, steps S200 to 206, and 216 corresponds to the banding determining step of any one of the above-mentioned aspects, step S208 to 212 correspond to the characteristic information extracting step of any one of the above-mentioned aspects, steps S300 to 316, and 320 correspond to the deterioration degree determining step of any one of the above-mentioned aspects, and steps S316 and 322 correspond to the printing data creating step of any one of the above-mentioned aspects.

Second Embodiment

Next, a second embodiment of the invention will be described with reference to the accompanying drawings. FIGS. 17 to 22 are a printing device, a program for controlling a printing device, a method of controlling a printing device, a printing data creating device, a program for creating printing data, and a method of creating printing data according to the second embodiment of the invention.

The printing device and the computer system are the same as those shown in FIGS. 1 and 2. Further, in the second embodiment, the image characteristic amount extracting process according the first embodiment shown in FIG. 5 is changed to that shown in FIG. 17, and the printing data creating process according to the first embodiment is changed to that shown in FIGS. 18 and 19.

In addition, the second embodiment is different from the first embodiment in that the high-frequency characteristic (edge information) of the image is extracted as the image characteristic amount, and the determining process determining whether banding avoiding process is necessary or not, the determining process of the execution ratio, and the N-value conversion process are performed on the basis of the extracted edge information. Hereinafter, with respect to the second embodiment, only the different characteristics from those of the second embodiment will be described. In addition, the same members as the first embodiment are denoted by the same reference numerals, and the description thereof will be omitted.

The image characteristic amount extracting unit 11 has a function that extracts the image characteristic amount indicating the characteristic of the image constructed by the CMYK image data from the CMYK image data acquired by the image data acquiring unit 10. In the present embodiment, the filtering process using the known edge extracting filter is executed with respect to the CMYK image data, the edge amount of the selected pixel data after performing the filtering process or the absolute value of the corresponding edge amount is extracted as the edge information (characteristic amount about the frequency of the image), and the total sum of the absolute value of the edge amount in the predetermined region on the basis of the selected pixel data related to the banding phenomenon and the total sum of the edge amount are extracted as the edge information. In addition, the extracted edge information (image characteristic amount) is associated with each pixel data so as to be stored in the storing device 70, and the CMYK image data corresponding to the extracted image characteristic amount is transmitted to the printing data creating unit 12.

The process content determining unit 12*a* has a function for determining the total value of the absolute value of the edge amount of the peripheral pixel data including the selected pixel data on the basis of the image characteristic amount (edge information) extracted by the image characteristic amount extracting unit 11, the determining information stored in the determining information storing unit 12*b*, and the nozzle information stored in the nozzle information storing unit 14 and for determining whether the N-value conversion process according to the banding avoiding process is performed or not with respect to the selected pixel data on the basis of the edge information corresponding to the pixel data of the predetermined region on the basis of the selected pixel data, and for determining the process content of the N-value conversion process (the execution ratio of the banding avoiding process with respect to the selected region or the like) on the basis of the image characteristic amount, when it is determined that the N-value conversion process according to the banding avoiding process is performed.

Next, the image characteristic amount extracting process of step S108 in the second embodiment will be described in detail with reference to FIG. 17.

Figure 17:
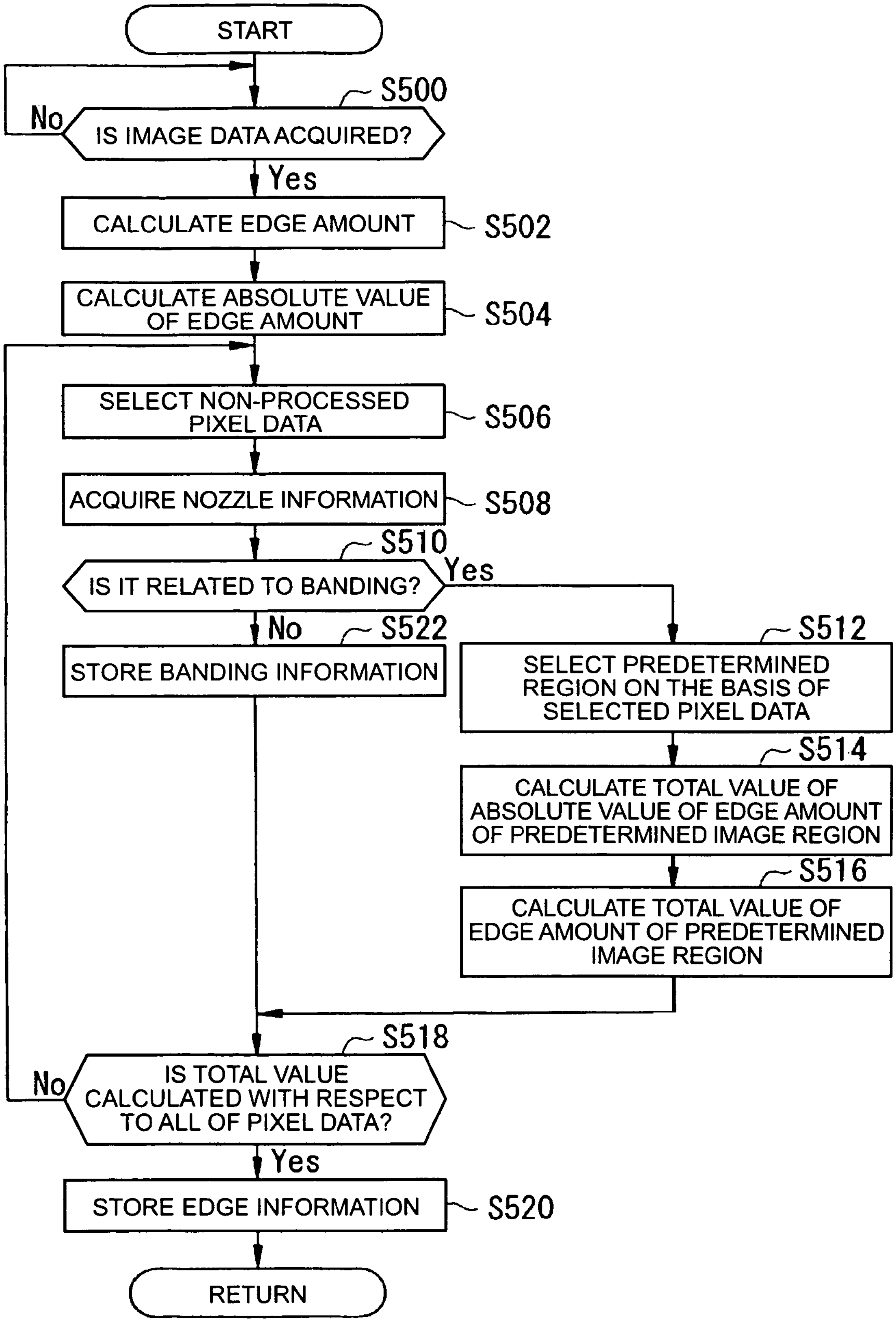
FIG. 17 is a flowchart illustrating an image characteristic amount extracting process in an image characteristic amount extracting unit 11 of a printing device 100 according to a second embodiment of the invention.

FIG. 17 is a flowchart illustrating the image characteristic amount extracting process in the image characteristic amount extracting unit 11 of the printing device 100 according to the second embodiment of the invention.

The image characteristic amount extracting process is a process that extracts the edge information of the image (that is, image characteristic amount) by using the edge extracting filter. If the image characteristic amount extracting process is executed in step S108, first, the process proceeds to step S500, as shown in FIG. 17.

In step S500, the image characteristic amount extracting unit 11 determines whether the image data acquiring unit 10 acquires the CMYK image data, and when it is determined that the image data acquiring unit 10 acquires the CMYK image data (Yes), the process proceeds to step S502. In contrast, when it is determined that the image data acquiring unit 10 does not acquire the CMYK image data (No), the determining process is repeated until it is determined that the image data acquiring unit 10 acquires the CMYK image data (Yes).

When the process proceeds to S502, the image characteristic amount extracting unit 11 calculates the edge amount of each pixel data on the basis of the CMYK image data, and the process proceeds to step S504.

In step S504, the image characteristic amount extracting unit 11 calculates the absolute value of the edge amount on the basis of the edge amount calculated in step S502, and the process proceeds to step S506.

In step S506, the image characteristic amount extracting unit 11 selects the pixel data where the total value calculating process of the edge amount is not performed, and the process proceeds to step 508.

In step S508, the image characteristic amount extracting unit 11 acquires the nozzle information of the nozzle corresponding to the selected pixel data from the nozzle information storing unit 14, and the process proceeds to step S510.

In step S510, the image characteristic amount extracting unit 11 determines whether the nozzle corresponding to the selected pixel data is related to banding, and when it is determined that the nozzle corresponding to the selected pixel data is related to banding (Yes), the process proceeds to step S512. In contrast, when it is determined that the nozzle corresponding to the selected pixel data is not related to banding (No), the process proceeds to step S522.

In step S512, the image characteristic amount extracting unit 11 selects the pixel data of the predetermined region including the corresponding pixel data on the basis of the selected pixel data, and the process proceeds to step S514.

In the step 514, the image characteristic amount extracting unit 11 calculates the total sum of the absolute value of the edge amount corresponding to each pixel data constituting the selected region, and the process proceeds to step S516.

In step 516, the image characteristic amount extracting unit 11 calculates the total sum of the edge amount corresponding to each pixel data constituting the selected region, and the process proceeds to step S518.

In step 518, the image characteristic amount extracting unit 11 determines whether the calculation process of the total value is completed with respect to all the pixel data, and when it is determined that the calculation process of the total value is completed with respect to all the pixel data (Yes), the process proceeds to step S520. In contrast, when it is determined that the calculation process of the total value is not completed with respect to all the pixel data (No), the process proceeds to step S506.

In step S520, the edge amount of each pixel data of the CMYK image data calculated in step S502 (it serves as the edge information), the absolute value of the edge amount of each pixel data of the CMYK image data calculated in step S504, the total value of the absolute value of the edge amount of each selected region calculated in step S514, and the total value of the edge amount of each selected region calculated in step S516 are associated with each pixel data so as to be stored in a predetermined region of the storage device 70. Then, a series of processes are completed, and the process returns to the original process.

In the meantime, when the it is determined that the nozzle corresponding to the selected pixel data is not related to the banding in step S510 and the process proceeds to step S522, the image characteristic amount extracting unit 11 associates information indicating a message that the nozzle corresponding to the selected pixel data is not related to the banding (edge information) with the selected pixel data so as to be stored in the predetermined region of the storage device 70, and the process proceeds to step S518.

Next, the printing data creating process of step S110 in the present embodiment will be described in detail with reference to FIG. 18.

Figure 18:
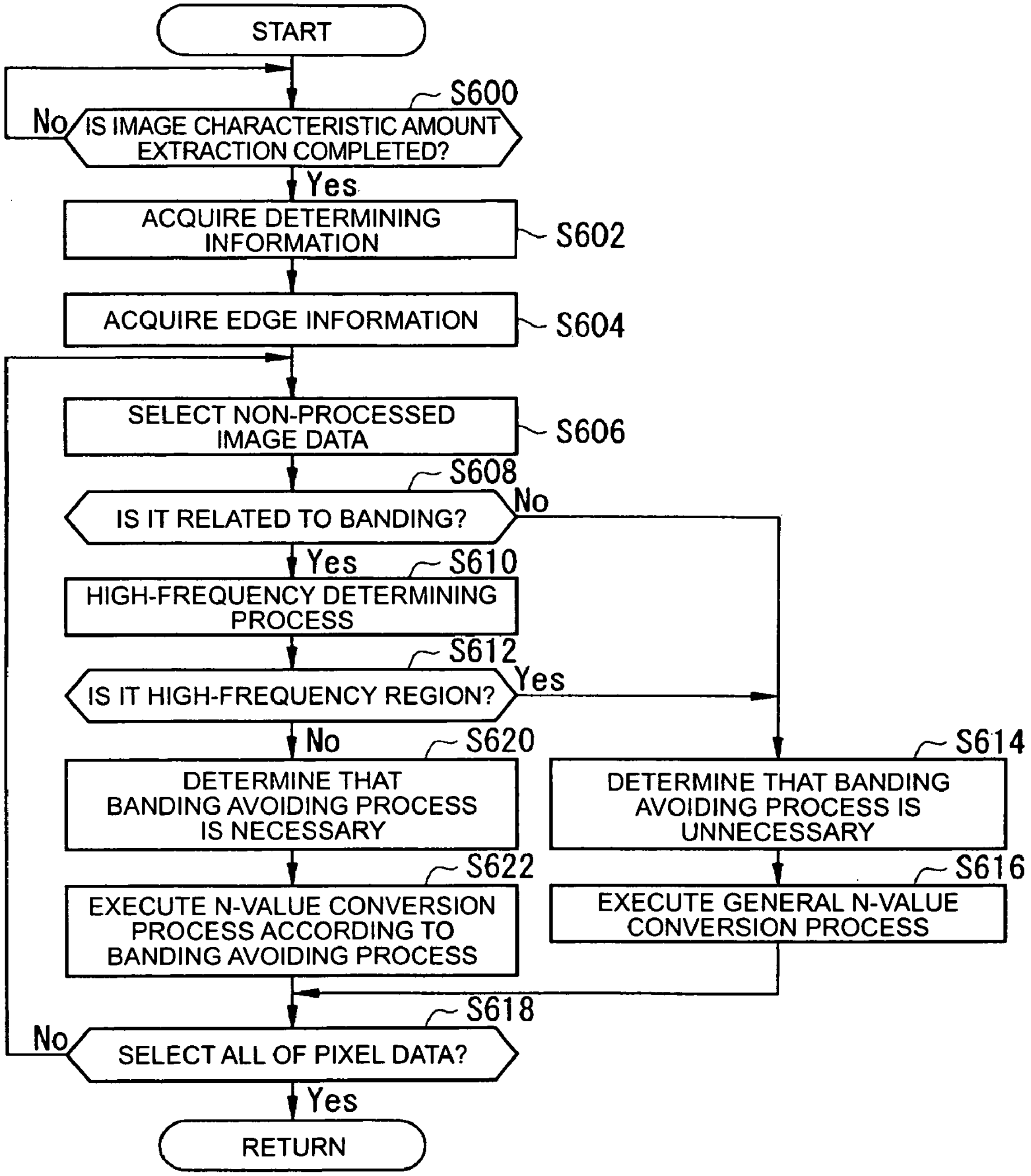
FIG. 18 is a flowchart illustrating a printing data creating process in a printing data creating unit 12 of a printing device according to the second embodiment of the invention.

FIG. 18 is a flowchart illustrating a printing data creating process in the printing data creating unit 12 of the printing device 100 according to the second embodiment of the invention.

The printing data creating process creates printing data by determining whether the N-value conversion process according to the banding avoiding process is performed or not with respect to the image of the predetermined region including the edge portion on the basis of the image characteristic amount (edge information) extracted by the image characteristic amount extracting unit 11 and the determining information stored in the determining information storing unit 12*b*, performing the N-value conversion process according to the banding avoiding process with respect to the region having been determined that the N-value conversion process according to the banding avoiding process is performed, and performing the general N-value conversion process with respect to the block determined that the N-value conversion process according to the banding avoiding process is not performed. If the printing data creating process is executed in step S110, first, the process proceeds to step S600, as shown in FIG. 18.

In step S600, the process content determining process 12*a* determines whether the CMYK image data is acquired or not from the image characteristic amount extracting unit 11, and thus determines whether the image characteristic amount extracting process is completed or not. In this case, when it is determined that the image characteristic amount extracting process is completed (Yes), the process proceeds to step S602, and when it is determined that the image characteristic amount extracting process is not completed (No), the determining process is repeated until when it is determined that the image characteristic amount extracting process is completed.

When the process proceeds to step S602, the determining information is read out from the determining information storing unit 12*b*, the read determining information is stored in the predetermined region of the RAM 62, and the determining information is acquired. Then, the process proceeds to step S604.

In step S604, the process content determining unit 12*a* reads out the edge information corresponding to the CMYK image data of the process subject from the storage device 70, stores the read edge information in a predetermined region of the RAM 62, and acquires the edge information. Then the process proceeds to step S606.

In step S606, the process content determining unit 12*a* selects from the CMYK image data the pixel data where the determining process is not performed, and the process proceeds to step S608. In addition, the determining process is executed for each predetermined region and each color of the CMYK image data.

In step S608, the process content determining unit 12*a* determines whether the selected pixel data is related to the banding on the basis of the edge information. When it is determined that the selected pixel data is related to the banding (Yes), the process proceeds to step S610, and when it is determined that the selected pixel data is not related to the banding (No), the process proceeds to step S614.

In step S610, the process content determining unit 12*a* executes the high-frequency region determining process with respect to the selected pixel data, and the process proceeds to step S612.

In step S612, the process content determining unit 12*a* determines whether the selected pixel data is included in the high-frequency region on the basis of the determined result of step S610, and when it is determined that the selected pixel data is included in the high-frequency region (Yes), the process proceeds to step S614. In contrast, when it is determined that the selected pixel data is not included in the high-frequency region (No), the process proceeds to step S620.

When the process proceeds to step S614, the process content determining unit 12*a* determines whether the banding avoiding process is unnecessary or necessary, and the process proceeds to step S616.

When the process proceeds to step S616, the N-value conversion process unit 12*d* executes the general N-value conversion process with respect to the selected pixel data, and the process proceeds to step S618.

In step S618, the process content determining unit 12*a* determines whether the determining process and the N-value conversion process are completed with respect to all the pixel data in the CMYK image data. When it is determined that the determining process and the N-value conversion process are completed with respect to all the pixel data in the CMYK image data (Yes), a series of processes are completed, and the process returns to the original process. In contrast, when it is determined that the determining process and the N-value conversion process are not completed with respect to all the pixel data in the CMYK image data (No), the process proceeds to step S606.

In the meantime, when the selected pixel data is not included in the high-frequency region in step S612 and the process proceeds to step S620, the process content determining unit 12*a* determines that the banding avoiding process is necessary with respect to the selected region, and the process proceeds to step S622. In the present embodiment, when the banding avoiding process is necessary, the execution ratio of the banding avoiding process is also determined in accordance with the image characteristic amount.

In step S622, the N-value conversion processing unit 12*d* executes the N-value conversion process according to the banding avoiding process with respect to the selected region, and the process proceeds to step S618.

Next, the high-frequency region determining process of step S610 will be described in detail with reference to FIG. 19.

Figures 19, 20:
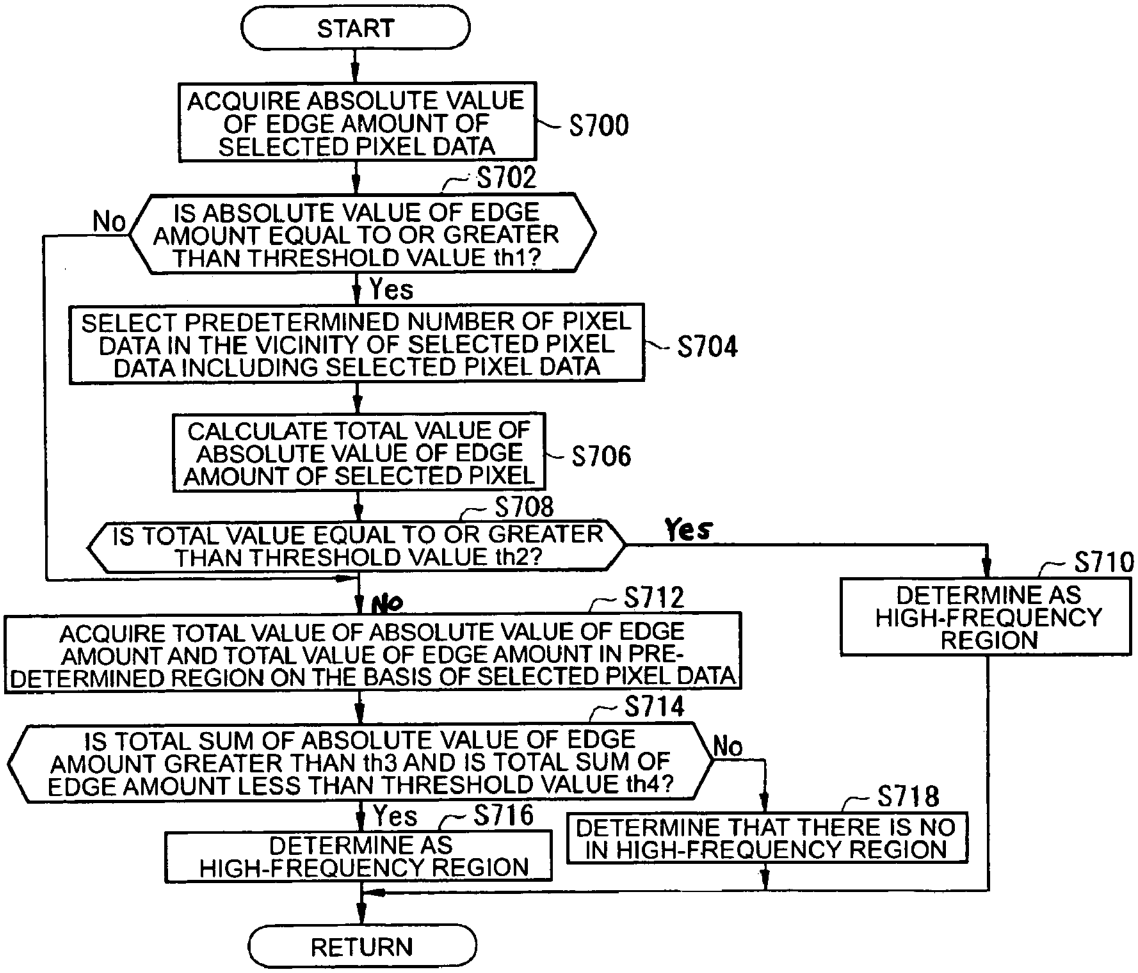
FIG. 19 is a flowchart illustrating a high-frequency region determining process in a process content determining unit 12*a* according to the second embodiment of the invention.
FIG. 20 is a diagram illustrating an example of an edge extracting filter.

FIG. 19 is a flowchart illustrating a high-frequency region determining process in the process content determining unit 12*a* according to the second embodiment of the invention.

The high-frequency region determining process determines whether the selected pixel data is the edge portion on the basis of the image characteristic amount (edge information) extracted by the image characteristic amount extracting unit 11 and the determining information stored in the determining information storing unit 12*b* and determines whether the image of the predetermined region is the high-frequency region on the basis of the selected pixel data when it is determined that the selected pixel data is not the edge portion. If the high-frequency region determining process is executed in step S610, first, the process proceeds to step S700, as shown in FIG. 19.

In step S700, the absolute value of the edge amount corresponding to the selected pixel data is acquired from the edge information stored in the RAM 62, and the process proceeds to step S702.

When the process proceeds to step S702, the image characteristic amount extracting unit 11 determines whether the absolute value of the edge amount acquired in step S700 is greater than the threshold value th1. In this case, when it is determined that the absolute value of the edge amount acquired in step S700 is greater than the threshold value th1 (Yes), the process proceeds to step S704, and when it is determined that the absolute value of the edge amount acquired in step S700 is not greater than the threshold value th1 (No), the process proceeds to step S712.

When the process proceeds to step S704, the image characteristic amount extracting unit 11 selects the predetermined number of peripheral pixel data including the selected pixel data on the selected pixel data, and the process proceeds to step S706.

In step S706, the image characteristic amount extracting unit 11 calculates the total value of the absolute value of the edge amount of the pixel data selected in step S704, and the process proceeds to step 708.

In step S708, the image characteristic amount extracting unit 11 determines whether the total value calculated in step S706 is greater than the threshold value th2. In this case, when it is determined that the total value calculated in step S706 is greater than the threshold value th2 (Yes), the process proceeds to step S710, and when it is determined that the total value calculated in step S706 is not greater than the threshold value th2 (No), the process proceeds to step S712. In this case, the relationship between the threshold value th1 and the threshold value th2 satisfies the condition 'th2≦(th1×3)'.

When the process proceeds to step S710, the image characteristic amount extracting unit 11 determines that the peripheral pixel including the selected pixel data is a high-frequency region, a series of processes are completed, and the process proceeds to the original process.

In the meantime, when the total value with respect to the selected pixel data in step S702 is not greater than the threshold value th1 or the total value in step S708 is not greater than the threshold value th2 and the process proceeds to step S712, the image characteristic amount extracting unit 11 acquires from the edge information stored in the RAM 62 the total value of the absolute value of the edge amount and the total value of the edge amount in the predetermined region on the basis of the selected pixel data, and the process proceeds to step S714.

In step S714, it is determined whether the total value of the absolute value of the edge amount acquired in step S712 is greater than the threshold value th3 and whether the total value of the edge amount is not less than the threshold value th4. When it is determined that the total value of the absolute value of the edge amount acquired in step S712 is greater than the threshold value th3 and the total value of the edge amount is less than the threshold value th4 (Yes), the process proceeds to step S716. In contrast, it is determined that the total value of the absolute value of the edge amount acquired in step S712 is not greater than the threshold value th3 and the total value of the edge amount is less than the threshold value th4 (No), the process proceeds to step S718. In this case, the relationship between the threshold values th3 and th4 satisfies the condition 'th3>th4 or th3>(α×th4)'. In this case, a symbol α indicates a value changed by the density, and satisfies the condition α>2.

When the process proceeds to step S716, it is determined that the predetermined region including the selected pixel data is the high-frequency region, a series of processes are completed, and the process returns to the original process.

In the meantime, when the process proceeds to step S718, it is determined that the predetermined region including selected pixel data is not the high-frequency region, a series of processes are completed, and the process returns to the original process.

Next, the operation of the present embodiment will be described with reference to FIGS. 20 to 22.

Figure 21A:
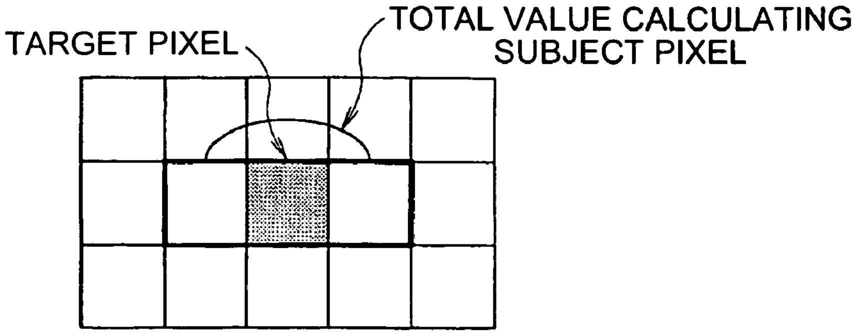
FIG. 21A is a diagram illustrating an example of a pixel whose total value is to be calculated.
Figure 21B:
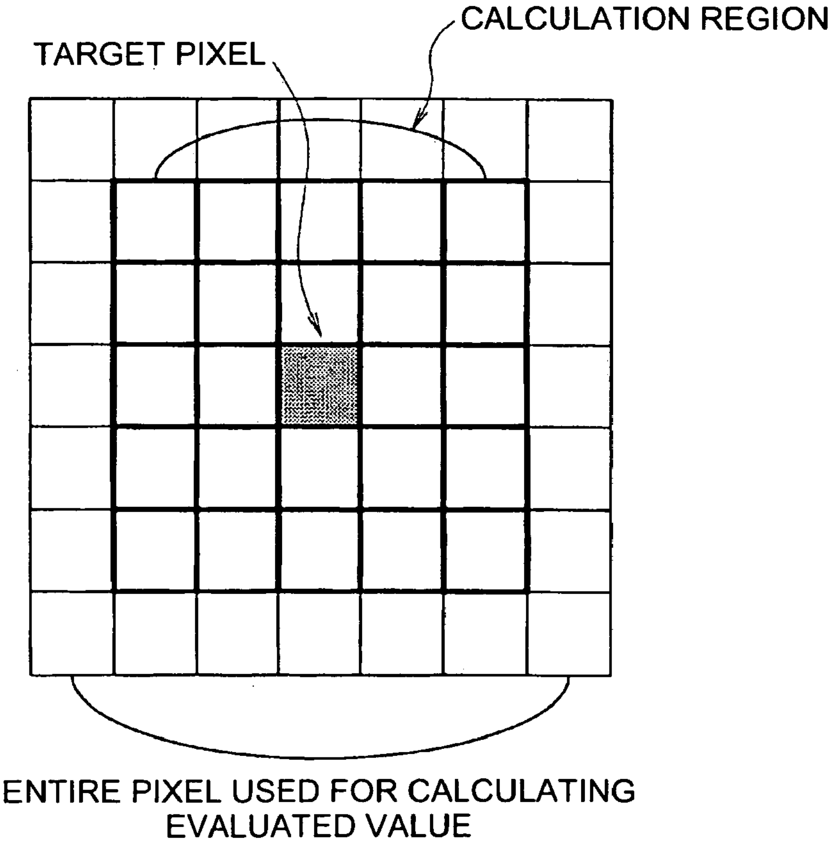
FIG. 21B is a diagram illustrating an example of a predetermined region which performs a process of calculating a total value for determining a high-frequency region.

FIG. 20 is a diagram illustrating an example of an edge extracting filter. FIG. 21A is a diagram illustrating an example of a pixel whose total value is to be calculated, and FIG. 21B is a diagram illustrating an example of a predetermined region which performs a process of calculating a total value for determining a high-frequency region. FIG. 22 is a diagram illustrating a relationship between a total sum of an absolute value of an edge amount of a predetermined region image and an execution ratio of a banding avoiding process. According to the image characteristic amount extracting process of the present embodiment, first, the image characteristic amount extracting unit 11 calculates from the acquired CMYK image data the edge amount of each pixel data for each ink color (step S502).

In the present embodiment, the pixel data where the edge extracting process is not performed is selected from each of the image data corresponding to each ink of the CMYK image data, and the filtering process is executed by using the edge extracting filter shown in FIG. 20. For example, if the pixel value of the selected pixel data is represented with P (i, j), and pixel values of eight peripheral pixels (form a rectangular shape) of the corresponding pixel are respectively represented with P(i−1, j−1), P(i, j−1), P(i+1, j−1), P(i−1, j), P(i+1, j), P(i−1, j+1), P(i, j+1), and P(i+1, j+1), the edge amount G of the center pixel data (i, j) can be represented with following Equation 1 using the filter of FIG. 20.

$$G(i,j)=1\times P(i-1,j-1)+(-2)\times P(i,j-1)+1\times P(i+1,j-1)+(-2)\times P(i-1,j)+3\times P(i,j)+(-2)\times P(i+1,j)+1\times P(i-1,j+1)+(-2)\times P(i,j+1)+1\times P(i+1,j+1) \quad (1)$$

The density value of each pixel data of the region of three pixels×three pixels is substituted for Equation 1, so that the selected pixel data is filtered and the edge amount of the selected pixel data is calculated. In addition, such a filtering process is performed with respect to all the pixel data of the CMYK image data, so that the edge amount for each pixel data is calculated (step S502). Then, the absolute value of the edge amount of each pixel data is calculated on the basis of the edge amount with respect to the selected pixel data (step S504).

If the calculation process of the absolute value of the edge amount is completed, the pixel data where the calculation process of the total value of the edge amount is not process is selected from the CMYK image data (step S506), and the nozzle information of the nozzle corresponding to the selected pixel data is acquired from the nozzle information storing unit 14 (step S508). In addition, it is determined on the basis of the acquired nozzle information whether the flying curve phenomenon occurs in the nozzle corresponding to the selected pixel data and whether the corresponding nozzle enters an ink ejection failure state (step S510). In this case, when it is determined by the determining process that the flying curve phenomenon does not occur and the corresponding nozzle does not enter an ink ejection failure state (when it is determined that the corresponding nozzle is not related to the banding phenomenon (branch of [No] of step S510)), the information indicating a message that the corresponding nozzle is not related to the banding (that is, the edge information) is associated with the selected pixel data so as to be stored in a predetermined region of the storage device 70 (step S522).

In contrast, when it is determined by the determining process that the nozzle corresponding to the selected pixel data causes the flying curve phenomenon or enters an ink ejection failure state and the nozzle corresponding to the selected pixel data is related to the banding phenomenon (branch of [No] of step S510), the pixel data of a rectangular region of five pixels×five pixels on the basis of the selected pixel data (target pixel) is selected, as shown in FIG. 21B (step S512).

If the pixel data of the rectangular region is selected, the total value of the absolute value of each edge amount of the pixel data included in the selected region is calculated (step S514), and the total value of the edge amount of the pixel data included in the selected region is calculated (step S516). That is, the total sum of each of the absolute values of the edge amounts and the edge amounts, which correspond to the pixel data of the twenty five pixels included in the rectangular region, is calculated.

In addition, if it is determined that the corresponding nozzle is related to the banding with respect to all the pixel data of the CMYK image data and that the total sum of the absolute value of the edge amount with respect to the rectangular region consisting of five pixels×five pixels on the basis of the selected pixel data related to the above-mentioned banding phenomenon and the total sum of the edge amount are calculated (branch of [Yes] of step S518), the edge amounts of the selected pixel data related to the banding phenomenon and the respective pixel data related to the selected pixel data, the absolute values of the edge amounts with respect to the respective pixel data, the total value of the absolute values of the edge amounts with respect to the respective pixel data, and the total value of the edge amounts with respect to the respective pixel data (all of which serve as the edge information) are associated with the respective pixel data so as to be stored in a predetermined region of the storage device 70 (step S520). Thereby, the image characteristic amount extracting process is completed, and then the image characteristic amount extracting unit 11 transmits to the printing data creating unit 12 the CMYK image data where the image characteristic amount extracting process is completed.

In the meantime, if the printing data creating unit 12 acquires the CMYK image data from the image characteristic amount extracting unit 11 and determines that the image characteristic amount extracting process has been completed (branch of [Yes] of step S600), first, the process content determining process 12*a* acquires the determining information from the determining information storing unit 12*b* (step S602), and then acquires the edge information corresponding to the CMYK image data acquired from the storage device 70 (step S604). In the present embodiment, the determining information includes information which is necessary for the determining process using the information of the method of processing the determination and the image frequency information (including the edge information) such as the high-frequency region determining threshold values th1 to th4 or the like.

Further, if the process content determining unit 12*a* acquires the determining information and the edge information, it selects the pixel data, where the determining process is not performed for each ink color, from the CMYK image data, on the basis of the edge information (step S606). Then, if the process content determining unit 12*a* selects the pixel data, it determines whether the selected pixel data is related to the banding phenomenon on the basis of the edge information corresponding to the selected pixel data (step S608). When it is determined by the determining process that the selected pixel data is related to the banding (branch of [Yes] of step S608), the high-frequency region determining process is executed with respect to the predetermined image region including selected pixel data (step S610).

If the high-frequency region determining process starts, first, the absolute value of the edge amount corresponding to the selected pixel data is acquired from the edge information corresponding to the selected pixel data (step S700). When the absolute value of the acquired edge amount is not more than the threshold value th1 (branch of [No] of step S702), there is a high possibility that the selected pixel data is not the edge portion. Accordingly, it is determined that there is a high possibility that selected pixel data is not included in the high-frequency region (branch of [No] of step S702).

In contrast, when the absolute value of the edge amount of the selected pixel data is greater than the threshold value th1 (branch of [Yes] of step S702), in the present embodiment, as shown in FIG. 21A, the absolute values of the edge amounts of the three pixels, which are constructed from the pixel data adjacent to the selected pixel data on both sides of the selected pixel data, are acquired from the edge information stored in the RAM 62, and the total value of these absolute values is calculated (step S706). Then, if the total value is greater than the threshold value th2 (branch of [Yes] of step S708), it is determined that the region of three pixels including the selected pixel is the high-frequency region (edge portion) (step S710).

In addition, when the calculated total value is smaller than the threshold value th2 (branch of [No] of step S708), the total value of the absolute values of the edge amounts, which correspond to the predetermined image region on the basis of the selected pixel data (in this case, five pixels×five pixels shown in FIG. 21B), acquired from the edge information stored in the RAM 62, the total value of the absolute values of the edge amounts is compared with the threshold value th3, and the total value of the edge amounts and the threshold value th4 are compared with each other (step S714).

In this case, generally, when the total value of the absolute values of the edge amounts of the predetermined image region is greater than the threshold value th3, it is determined that the corresponding region is a high-frequency region. Since the pixel value is minutely changed in the high-frequency region, it is difficult for the banding to be seen. However, even in the high-frequency region, in the region where the pixel value smoothly changes in one direction like the gradation, the banding may be seen.

Accordingly, in the present embodiment, not only the total value of the absolute values of the edge amounts but also the total value of the edge amounts are compared with threshold value th4, it is determined whether the selected region is the gradation image, and when it is determined that the selected image is the gradation image, it is determined that there is no high-frequency region.

That is, that the total value of the absolute values of the edge amounts is greater than the threshold value th3, that is, the total value of the absolute values of the edge amounts becomes the large value means that the plurality of pixels each of which has the edge amount of the same direction (the same sign) are included, which results in a sufficient ground indicating the truth that the pixel value of the corresponding region is changing in one direction. In addition, this change is a specific change in the gradation image.

In contrast, if the total value of the edge amounts is less than the threshold value th4, that is, the absolute value of the total value of the edge amounts becomes closer to 0, since the plurality of pixels are included each of which has the edge amount having a different direction, the pixel value minutely changes. It can be determined that the region where the pixel value minutely changes is the high-frequency region, and it can be determined that the selected is not the gradation region.

Accordingly, when the total value of the absolute values of the edge amounts is greater than the threshold value th3 and the total value of the edge amounts is less than the threshold value th4 (branch of [Yes] of step S706) by the comparison, it can be determined that the predetermined image region on the basis of the selected pixel data is the high frequency region and not gradation image (step S716).

In contrast, when the total value of the absolute values of the edge amounts is not greater than the threshold value th3 and the total value of the edge amounts is not less than the threshold value th4 (branch of [No] of step S706) by the comparison, it can be determined that the predetermined image region on the basis of the selected pixel data is not the high frequency region or the high frequency region, but gradation image (step S710).

That is, when it is determined by the process content determining unit 12*a* that the predetermined image region on the basis of the selected pixel data is the high-frequency region (branch of [Yes] of step S612), as described above, the pixel value minutely changes, so that it is difficult for the banding to be seen at these locations. Therefore, it is determined that the banding avoiding process is unnecessary (step S614), and the N-value conversion processing unit 12*d* executes the general N-value conversion process (step S616).

In the meantime, when it is determined that the predetermined image region is not the high frequency region (branch of [No] of step S612), as described above, since it is difficult for the banding to be seen at these locations, it is determined that the banding avoiding process is necessary with respect to the selected pixel data (step S620), and the N-value conversion process unit 12*d* executes the N-value conversion process according to the banding avoiding process (step S622).

In the present embodiment, when it is determined that the banding avoiding process is necessary, as shown in FIG. 22, in accordance with the relationship between the total value of the absolute values of the edge amounts of the predetermined region on the basis of the selected pixel data and the execution ratio of the banding avoiding process, the execution ratio of the banding avoiding process with respect to the corresponding predetermined image region is determined in accordance with the total sum of the absolute values of the edge amounts of the corresponding predetermined image region. Accordingly, similar to the first embodiment, the N-value conversion processing unit 12*d* executes the banding avoiding process in accordance with the execution ratio.

In the meantime, when it is determined that the nozzle corresponding to the selected pixel data is not related to the banding (branch of [No] of step S608), since it is unnecessary to perform the banding avoiding process, it is determined that the banding avoiding process is unnecessary (step S614).

In this case, since the general N-value conversion process and the N-value conversion process according to the banding avoiding process are the same as those of the first embodiment, the description thereof will be omitted.

In addition, if executing the determining process whether the banding avoiding process is necessary or not with respect to all the pixel data of the CMYK image data, the determining process of the execution ratio, and the N-value conversion process, the CMYK image data, which is obtained after performing the N-value conversion process for the execution result, is output to the printing unit 13 as the printing data (step S112).

In addition, in the printing unit 13, the dot according to the CMYK image data obtained after performing the N-value conversion process is formed (printed) on the printing medium by using the printing head 200 on the basis of the printing data output from the printing data creating unit 12 (step S114).

As such, the execution ratio of the dot enlarging process (banding avoiding process) for eliminating the banding is controlled on the basis of the edge information of the image (frequency information), and when the dot enlarging process is executed, the execution ratio of the dot enlarging process with respect to the selected block is controlled on the basis of the total value of the absolute values of the edge amounts in the predetermined region on the basis of the selected pixel data. Therefore, it is possible to suppress the original quality of the printed image from being deteriorated due to the dot enlarging process at the minimum, and it is possible to improve the image quality of the printed result, even though the banding avoiding process is executed without considering the frequency information of the process subject image.

In the second embodiment, the image data acquiring unit 10 corresponds to the image data acquiring unit of any one of the above-mentioned aspects, the determining process which determines whether the selected pixel data in the image characteristic amount extracting unit 11 is related to the banding phenomenon corresponds to the banding determining unit of any one of the above-mentioned aspects, the extracting process which extracts the characteristic amount from the predetermined image region on the basis of the selected pixel data related to the banding in the image characteristic amount detecting unit 11 corresponds to the characteristic amount detecting unit of any one of the above-mentioned aspects, the determining process which determines whether the N-value conversion process according to the banding avoiding process in the printing data creating unit 12 is performed or not corresponds to the deterioration determining unit of any one of the above-mentioned aspects, the N-value conversion process and the printing data creating process in the printing data creating unit 12 correspond to the printing control unit according to the first aspect or the printing data creating unit of any one of the above-mentioned aspects, and the printing unit 20 corresponds to the printing unit according to the first aspect or second aspect.

Further, in the second embodiment, steps S102 to 106 correspond to the image data acquiring step of any one of the above-mentioned aspects, step S108 corresponds to the banding determining step of any one of the above-mentioned aspects, and the characteristic amount information extracting step of any one of the above-mentioned aspects, step S110 corresponds to the deterioration degree determining step of any one of the above-mentioned aspects, and the printing data creating step of any one of the above-mentioned aspects, and step S114 corresponds to the printing step of any one of the above-mentioned aspects.

Further, in the second embodiment, steps S506 to 510, and 522 corresponds to the banding determining step of any one of the above-mentioned aspects, steps S500 to 502 and the steps 512 to 520 correspond to the characteristic information extracting step of any one of the above-mentioned aspects, steps S600 to 614, and 620 correspond to the deterioration degree determining step of any one of the above-mentioned aspects, and steps S616 and 622 correspond to the printing data creating step of any one of the above-mentioned aspects.

In addition, in the second embodiment, the execution ratio of the banding avoiding process is determined in accordance with the total value of the absolute values of the edge amounts with respect to the selected region, but the invention is not limited. Specifically, as shown in FIG. 23A, the execution ratio of the banding avoiding process may be determined in accordance with the edge amount of the selected pixel data. FIG. 23A is a diagram illustrating the relationship between the edge amount of the selected pixel data and the execution ratio of the banding avoiding process.

In addition, in the first embodiment, the execution subject of the banding avoiding process is determined in accordance with the density value information, and in the second embodiment, the execution ratio of the banding avoiding process is determined on the basis of the total value of the absolute values of the edge amounts of the predetermined region on the basis of the selected pixel data. However, the embodiments of the invention are not limited thereto. Specifically, on the basis of the density information in the first embodiment and the total value of the absolute values of the edge amounts in the second embodiment, as shown in FIG. 23B, the execution subject of the banding avoiding process may be determined from the density value of the selected region (average density value or the maximum density value) and the total value of the absolute values of the edge amounts of the selected region. FIG. 23B is a diagram illustrating the relationship between the total value of the absolute values of the edge amounts in the predetermined region on the basis of the selected pixel data, the density value, and the control range of the banding avoiding process.

According to the characteristics of the printing devices according to the first and second embodiments, since the printing data can be created from the image data according to the characteristics of the printing head of an existing printing device while using the existing printing device as it is, the exclusive printing head 13 does not need to be prepared, and the existing inkjet-type printer can be used as it is. In addition, if the printing unit 13 is separated from the printing device 100 according to the first and second embodiments, the performance thereof can be achieved by only the general-purpose printing instruction terminal such as a personal computer or the like (printing data creating device).

In addition, the invention can be also applied not only to the flying curve phenomenon but also to a case in which although the ink ejection direction is vertical (normal), the ink ejection position of the nozzle for forming the contents deviates from a normal position, and thus the formed dot becomes the same result as the flying curve phenomenon.

In addition, in the first and second embodiments, the dot enlarging process has been exemplified as the banding avoiding process, but the invention is not limited thereto. That is, another banding avoiding process may be used as the banding avoiding process.

In addition, in the first and second embodiments, an example has been described in which the characteristic amount of the image of the predetermined region is extracted on the basis of the selected pixel, but the invention is not limited thereto. That is, the entire region of the image may be divided into the plurality of image blocks, so that the characteristic amounts may be extracted from the image blocks including the selected pixel data. Alternatively, the image region near the locations where the deterioration of the image quality due to the banding phenomenon is visible is divided into the plurality of image blocks, and the characteristic amount may be extracted from the corresponding image blocks.

In the first and second embodiment, when the entire region of the pixel is divided into the plurality of blocks and the characteristic amount is detected, the image dividing process in the image characteristic amount extracting unit 11 corresponds to the region dividing unit of any one of the above-mentioned aspects, and the process which extracts the characteristic amount from each region image after the region division in the image characteristic amount extracting unit 11 corresponds to the characteristic amount extracting unit of any one of the above-mentioned aspects.

In addition, in the second embodiment, an example has been described in which the edge amount of the predetermined image region is calculated and it is determined whether the predetermined image region is the high-frequency region on the basis of the corresponding edge amount, but the invention is not limited thereto. That is, other determining method may be used which includes a method of performing the determination using the bypass filter or the like and a method in which the image signal (image space) is divided into the frequency region (frequency space) by using FT, FFT, DCT, a Hadamard transform, or the like and the determination is made from the information of the frequency region, or the like.

Hereinafter, a method will be described which determines whether a predetermined image region is a high-frequency region on the basis of the information of the frequency region obtained by converting the image signal into the frequency region using a DCT (Discrete cosine transform).

First, frequency decomposition is performed so as to convert the image signal of the predetermined image region into a frequency component of cosine. For example, discrete cosines transform (DCT) which is used for compression of the image process such as JPEG or the like divides an image into a unit block of 8×8 (predetermined image region), each block is subjected to the frequency component transform of cosine. In compressing the image, the reproduction precision of the frequency component is lowered by using the image data having many low-frequency components and the high frequency component region having the low visual sensitivity of the human, so that the data compression is performed. In addition, the DCT is a commonly used frequency transform method.

For example, if the block of 8×8 on the basis of the target pixel is set to the predetermined image region and the respective pixel values of the predetermined image region are marked with P (0, 0) to P (7, 7), the DCT transform is represented with Equation 2.

$$D(u, v) = \frac{1}{4}C(u)C(v)\sum_{i=0}^{7}\sum_{j=0}^{7}P(i, j)\cos\left\{\frac{(2i+1)u\pi}{16}\right\}\cos\left\{\frac{(2j=1)v\pi}{16}\right\} \quad (2)$$

in which the C(u)(v) satisfies the following condition.

$$C(u)(v) = \begin{cases} 1/\sqrt{2} & (u = v = 0) \\ 1 & (\text{other}) \end{cases}$$

In this case, D (u, v) of Equation 2 becomes a frequency-converted transform coefficient. Further, P (0, 0) to P (7, 7) indicates the respective pixel values. In addition, D (0, 0) to D (7, 7), which are obtained by subjecting P (0, 0) to P (7, 7) to the DCT transform, mean to the transform coefficient which is converted into the frequency component. Furthermore, in the DCT, by performing the DCT inversion transform, the transformed coefficient can return to the pixel value before the transform.

The transform coefficient D (0, 0) which is transformed into the frequency component means to the direct-current component, and D (7, 7) means to the frequency component where the highest change is generated in all the horizontal and vertical directions. In addition, D (7, 7) and D (0, 7) mean to that the change is not generated in the horizontal direction or the vertical direction and the highest frequency component exists in the vertical direction or the horizontal direction. In this case, when it is determined whether the predetermined image region (image space) is the high frequency region or not by using the transform coefficient after performing the DCT, it is determined whether the high coefficient value meaning to the high frequency component exists or not. For example, in a region where the high frequency component exists in the vertical direction and the horizontal direction, in order that it is difficult for the banding to be seen, the comparison coefficient DA represented with Equation (3) is calculated, the DA value is compared with the previously set threshold value, and it is set whether the control is performed or not.

$$DA=D(6,7)+D(7,6)+D(7,7) \quad (3)$$

In this case, if the threshold value is set to thD, when the threshold value satisfies the condition DA<thD, the predetermined image region is within a range of the subject for performing the banding avoiding process. However, when the threshold value satisfies the condition DA≧thD, it is determined that the banding avoiding process does not need to be performed.

In addition, similar to the case of the filter output in the second embodiment, the plurality of threshold values are set, so that the number of pixels becoming the banding avoiding process subject may be changed.

Further, if the calculation equation of the calculating comparison coefficient DA according to the resolution of the pixel constituting the image is made to changed, it can be surely determined whether the banding avoiding process exists or not. For example, in the case of the high-resolution image, if the comparison coefficient DA is calculated in accordance with Equation 4, it is possible to more surely reflect the visual high-frequency region (In brief, when the resolution becomes twice as much as the original resolution, it can be calculated with Equation (4)).

$$DA=D(5,7)+D(6,6)+D(6,7)+D(7,5)+D(7,6)+D(7,7) \quad (4)$$

In the meantime, when the resolution is low, it is unnecessary for the comparison coefficient DA to be determined as D (7, 7).

In addition, the printing device 100 in the first and second embodiments can be applied not only to the line-head-type inkjet printer but also to a multipass-type inkjet printer. If the printing device is the line-head-type inkjet printer, even though the flying curve phenomenon occurs, it is possible to obtain a high definition printing material with one pass without the white stripes or thick stripes being seen by the user. In addition, if the printing device is the multipass-type inkjet printer, the number of the reciprocal operation can be reduced, it is possible to achieve the high-speed printing, as compared with the related art.

Figure 24A:
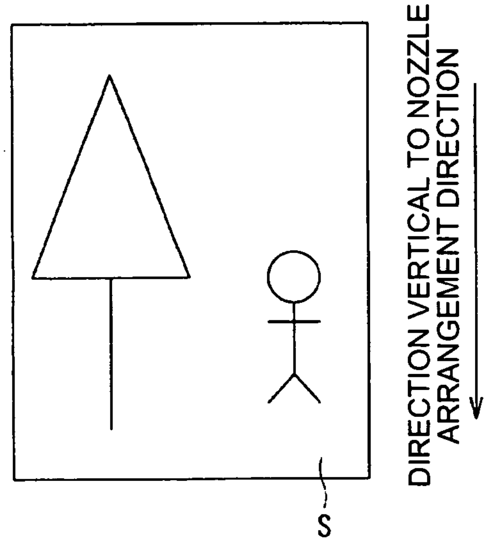
FIG. 24A is a diagram illustrating the difference between a printing mode of a multipass-type inkjet printer and a printing mode of a line-head-type inkjet printer.
Figure 24B:
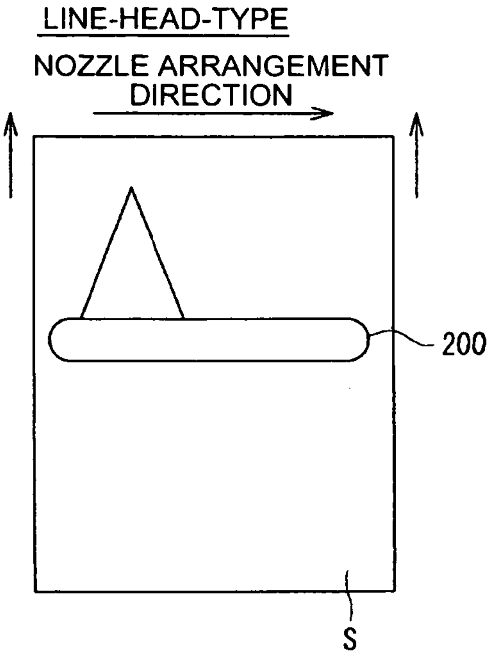
FIG. 24B is a diagram illustrating the difference between a printing mode of a multipass-type inkjet printer and a printing mode of a line-head-type inkjet printer.
Figure 24C:
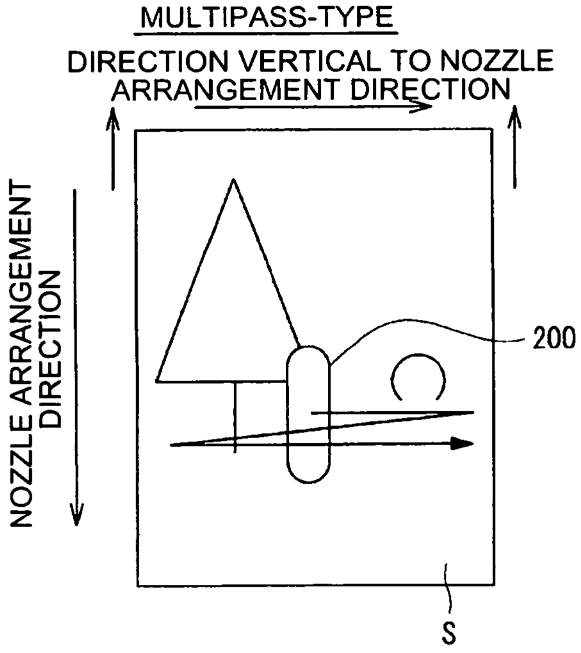
FIG. 24C is a diagram illustrating the difference between a printing mode of a multipass-type inkjet printer and a printing mode of a line-head-type inkjet printer.

FIGS. 24A to 24C are diagrams illustrating printing types by the line-head-type inkjet printer and the multipass-type inkjet printer.

As shown in FIG. 24A, in the case in which the image (not shown) is printed on the rectangular printing paper S, when the width direction of the rectangular printing paper S is set to the nozzle arrangement direction of the image data and the longitudinal direction of the rectangular printing paper S is set to the direction perpendicular to the nozzle arrangement direction of the image data, as shown in FIG. 24B, in the line-head-type inkjet printer, the printing head 200 has a length corresponding to the paper width of the printing paper S, the printing head 200 is fixed, and the printing paper S is moved with respect to the printing head 200 in the direction perpendicular to the nozzle arrangement direction. As a result, the printing is completed with a so-called one pass (operation). In addition, in the so-called flat-head-type scanner, the printing paper S is fixed, the printing head 200 moves in the direction perpendicular to the nozzle arrangement direction or the printing paper S and the printing head 200 are moved in directions opposite to each other, and the printing is performed. In the meantime, in the multi-pass-type inkjet printer, as shown in FIG. 24C, when the longitudinal direction of the printing paper S is set to the nozzle arrangement direction of the image data and the width direction of the printing paper S is set to the direction perpendicular to the nozzle arrangement direction of the image data, the printing head 200 which is much shorter than the length of the paper width is located in the nozzle arrangement direction, the printing paper S is moved in the nozzle arrangement direction a predetermined pit-by-a predetermined pitch while the printing head 200 is moved reciprocally in a direction perpendicular to the nozzle arrangement direction by a predetermined number of times, and the printing is performed. Accordingly, in the case of the multipass-type inkjet printer of the latter, it takes a long printing time as compared with line-head-type inkjet printer of the former. However, the printing head 200 can be repeatedly positioned at any location in the multipass-type inkjet printer, it is possible to reduce the white stripe phenomenon in the above-mentioned banding phenomenon to some degree.

In addition, in the first and second embodiments, the inkjet printer has been described in which the ink is ejected in a dot type and the printing is performed, but the invention can be applied to another printing device using the printing head in which the printing mechanism is arranged in a line shape, for example, a heat transferring printer or a thermal head printer called thermal printer.

Figure 25:
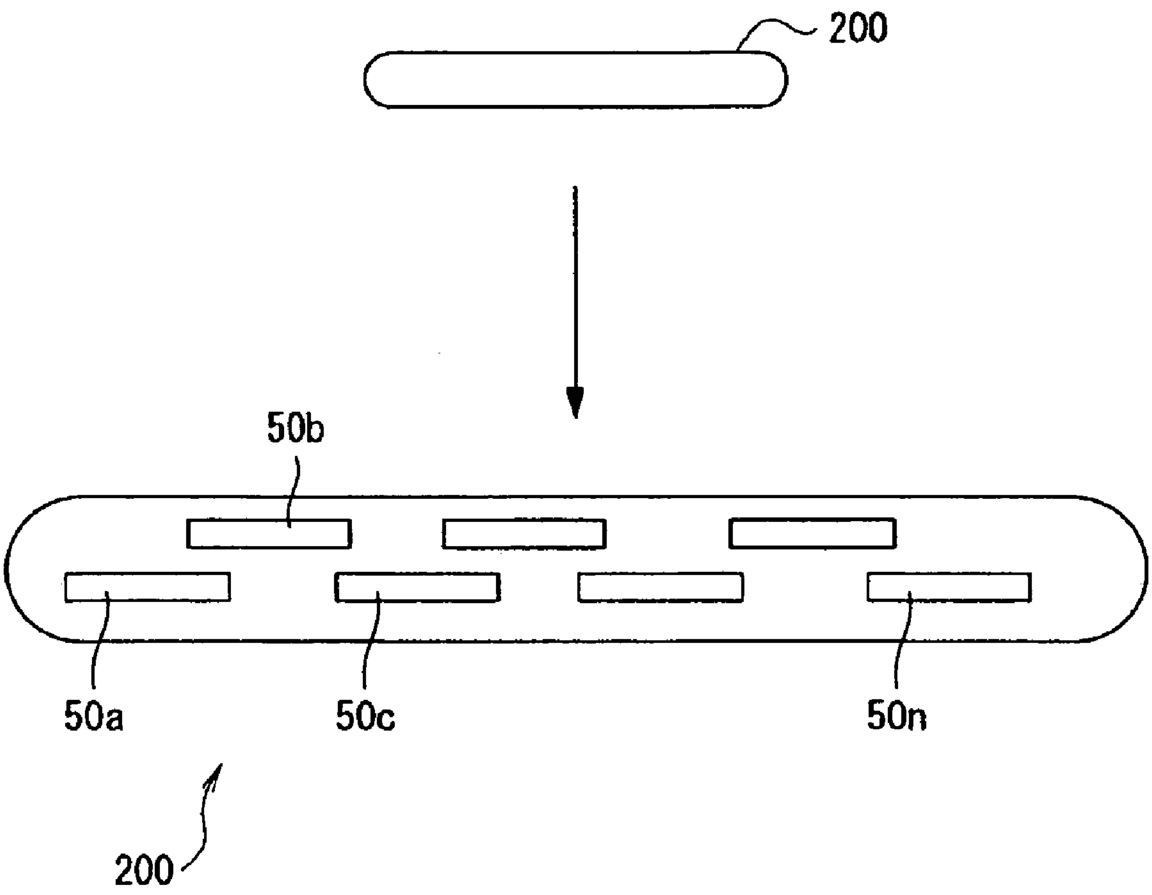
FIG. 25 is a conceptual diagram illustrating another example of a structure of a printing head.

In addition, in FIG. 3, the respective nozzle modules 50, 52, 54, and 56 provided for the respective colors of the printing head 200 have a type in which the nozzles N are continuously disposed in a linear shape in the longitudinal direction of the printing head 200, but as shown in FIG. 25, each of the nozzle modules 50, 52, 54, and 56 may be composed of a plurality of short nozzle units 50*a*, 50*b*, . . . , and 50*n*, and these may be disposed in the moving direction of the printing head 200. As such, if each of the nozzle modules 50, 52, 54, and 56 may be composed of a plurality of short nozzle units 50*a*, 50*b*, and 50*n*, since the short nozzle module can be formed by using the head in which each of nozzle units 50*a*, 50*b*, and 50*n* is short, it is possible to improve the manufacturing yield of the nozzle module.

Further, until now, the printing head has been described which has as structure in which 'the nozzle arrangement direction' and 'the printing direction (paper carrying direction' are perpendicular or approximately perpendicular to each other, like the line-head-type printing head in which the plurality of nozzles are linearly disposed in the same direction as the width direction of the rectangular printing paper, the corresponding width direction is set to 'the nozzle arrangement direction', and the longitudinal direction of the rectangular printing paper is set to 'the direction perpendicular to the nozzle arrangement direction', and the short multipass-type printing head in which the plurality of nozzles are disposed in the same direction as the longitudinal direction, the corresponding longitudinal direction is set to 'the nozzle arrangement direction', and the width direction of the rectangular printing paper is set to 'the direction perpendicular to the nozzle arrangement direction', or the like. However, the invention is not limited thereto. The printing heads having the different structures may be used, like the printing head in which the plurality of short nozzle modules are disposed, the printing head in which 'the nozzle arrangement direction' and 'the printing direction' are not vertical or not substantially vertical.

Hereinafter, some examples of the structure of the line-head-type printing head and the multipass-type printing head will be described with reference to FIGS. 26 and 27. FIGS. 26A to 26D are diagrams illustrating examples of the structures of the printing head of the line-head-type printer. FIGS. 27A to 27D are diagrams illustrating examples of the structures of the printing head of the multipass-type printer.

First, the examples of the structures of the line-head-type printing head will be described.

Figure 26A:
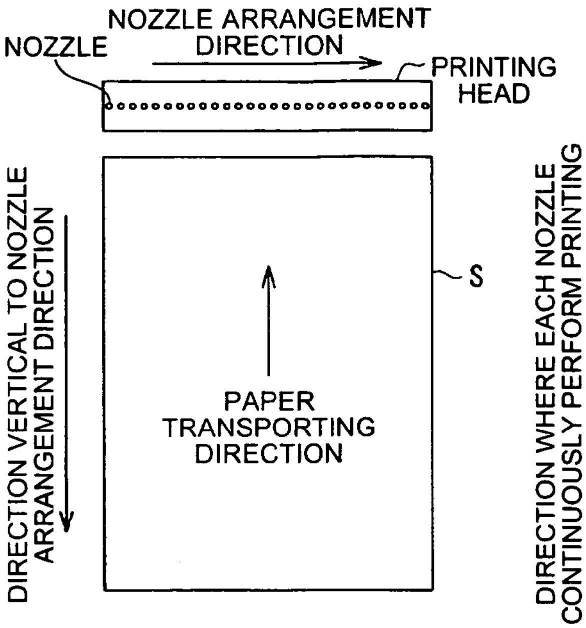
FIG. 26A is a diagram illustrating an example of a structure of a printing head of a line-head-type printer.

The example of the structure of FIG. 26A corresponds to the short printing head in which the plurality of nozzles used in the first and second embodiments are linearly disposed in the same direction as the width direction of the rectangular printing paper S, the corresponding width direction is set to 'the nozzle arrangement direction', and the longitudinal direction of the printing paper S is set to 'the direction perpendicular to the nozzle arrangement direction'. In this structure example, 'the direction perpendicular to the nozzle arrangement direction' is the same as 'printing direction (paper carrying direction)'. That is, 'the nozzle arrangement direction' is perpendicular (or approximately perpendicular) to 'the printing direction'. In contrast, the example of the structure shown in FIG. 26B corresponds to the long printing head in which 'the nozzle arrangement direction' is not the same as the width direction of the printing paper S, and the plurality of nozzles are disposed in the slant direction with respect to the width direction. In this structure example, 'the direction perpendicular to the nozzle arrangement direction' and 'the printing direction' are not the same direction, and 'the direction where the respective nozzles are continuously disposed' becomes 'the printing direction'. That is, 'the nozzle arrangement direction' is not perpendicular (or not substantially perpendicular) to 'the printing direction (paper carrying direction)'. Accordingly, the direction where the longitudinal direction of the printing paper S becomes 'the direction where the respective nozzles are continuously disposed', and the width direction of the printing paper S is not 'the nozzle arrangement direction' but 'the direction perpendicular to the direction where the respective nozzles are continuously disposed'. As such, if the nozzle arrangement direction is slant with respect to the width direction becoming the direction perpendicular to the printing direction, it can be apprehended that the high-resolution image can be obtained.

Figure 26B:
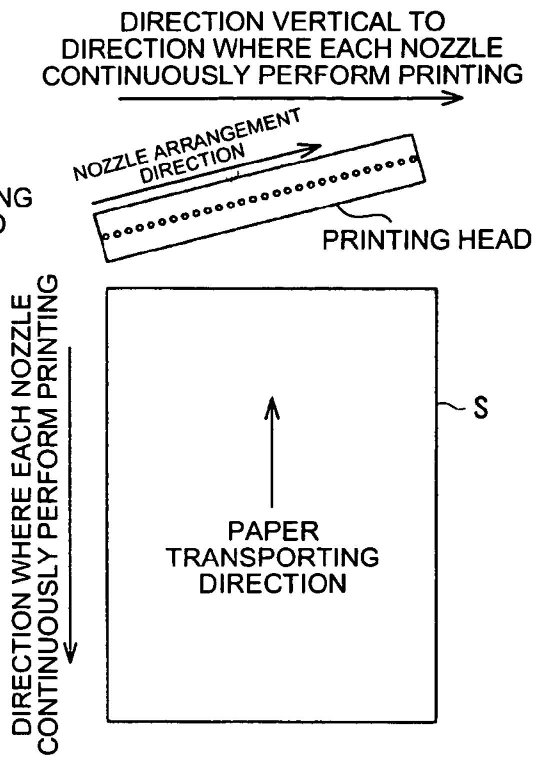
FIG. 26B is a diagram illustrating an example of a structure of a printing head of a line-head-type printer.
Figure 26C:
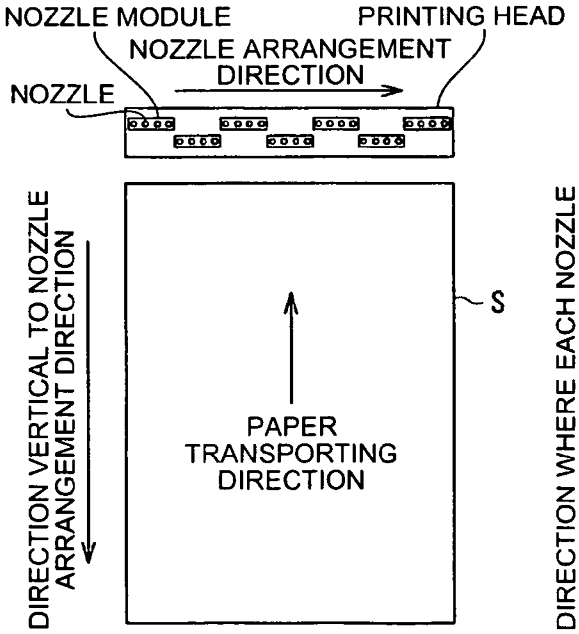
FIG. 26C is a diagram illustrating an example of a structure of a printing head of a line-head-type printer.
Figure 26D:
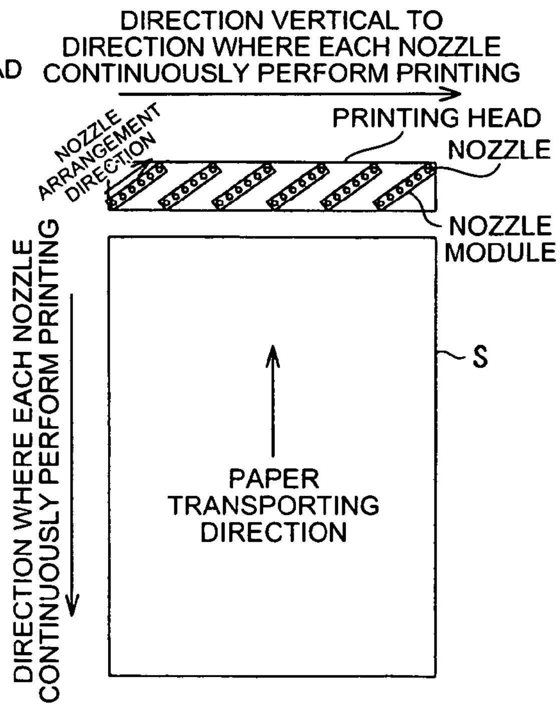
FIG. 26D is a diagram illustrating an example of a structure of a printing head of a line-head-type printer.

In addition, the example of the structure of FIG. 26C corresponds to the printing head having the structure in which the plurality of short nozzle modules are not linearly disposed but disposed at locations different from each other in the width direction, in each of which the plurality of nozzles are linearly disposed in the same direction as the width direction of the rectangular printing paper S. The structure example of FIG. 26C is a structure obtained by dividing the single nozzle module into the plurality of nozzle modules, and has the same structure as the structure example of FIG. 26A. Therefore, 'the nozzle arrangement direction' becomes the width direction of the printing paper S and 'the direction perpendicular to the nozzle arrangement direction' becomes the longitudinal direction of the printing paper S and 'the printing direction'. In the meantime, similar to the structure example of FIG. 26B, the structure example of FIG. 26D corresponds to the printing head which has a structure in which the plurality of nozzles are disposed in a slant direction with respect to the width direction of the printing paper S. In this structure example shown in FIG. 26D, the plurality of short nozzle modules in each of which the plurality of nozzles are disposed in a slant direction are disposed in the width direction of the printing paper S in a state in which they are slanted with respect to the corresponding width direction. The structure example of FIG. 26D is a structure obtained by dividing the single nozzle module into the plurality of nozzle modules, and has the same structure as the structure example of FIG. 26B. Therefore, the longitudinal direction of the printing paper S becomes 'the direction where the respective nozzles are continuously disposed', and the width direction of the printing paper S becomes 'the direction perpendicular to the direction where the respective nozzles are continuously disposed'.

Next, the example of the structure of the multipass-type printing head will be described.

Figure 27A:
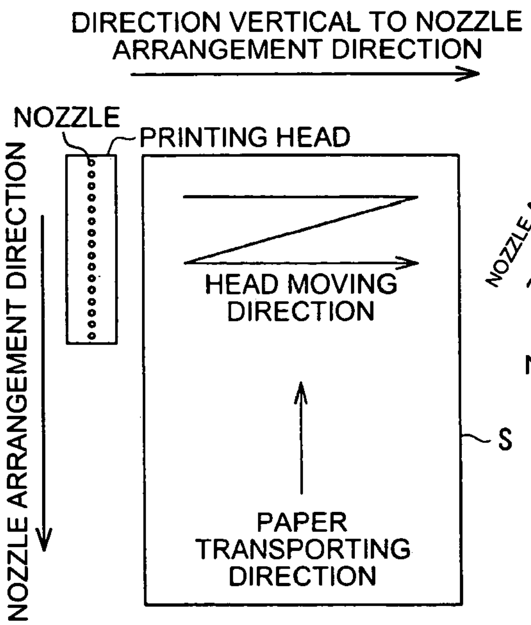
FIG. 27A is a diagram illustrating an example of a structure of a printing head of a multipass-type printer.

The example of the structure of FIG. 27A corresponds to the short printing head in which the plurality of nozzles are linearly disposed in the same direction as the width direction of the rectangular printing paper S, the longitudinal direction is set to 'the nozzle arrangement direction', and the width direction of the printing paper S is set to 'the direction perpendicular to the nozzle arrangement direction'. In this structure example, 'the direction perpendicular to the nozzle arrangement direction' is the same as 'printing direction (paper carrying direction)'. That is, 'the nozzle arrangement direction' is perpendicular (or approximately perpendicular) to 'the printing direction'. In addition, according to the progressing direction of the printing head, the printing head is moved reciprocally with respect to the width direction of the printing paper S, as shown in FIG. 27A. In contrast, the example of the structure shown in FIG. 27B corresponds to the long printing head in which 'the nozzle arrangement direction' is not the same as the width direction of the printing paper S, and the plurality of nozzles are disposed in the slant direction with respect to the longitudinal direction. In this structure example, 'the direction perpendicular to the nozzle arrangement direction' and 'the printing direction' are not the same direction, and 'the direction where the respective nozzles are continuously disposed' becomes 'the printing direction'. That is, 'the nozzle arrangement direction' is not perpendicular (or not substantially perpendicular) to 'the printing direction (paper carrying direction)'. Accordingly, the width direction of the printing paper S becomes not 'the nozzle arrangement direction' but 'the direction where the respective nozzles are continuously disposed', and the longitudinal direction of the printing paper S is 'the direction perpendicular to the direction where the respective nozzles are continuously disposed'. As such, if the nozzle arrangement direction is slant with respect to the longitudinal direction becoming the direction perpendicular to the printing direction, it can be apprehended that the high-resolution image can be obtained.

Figure 27B:
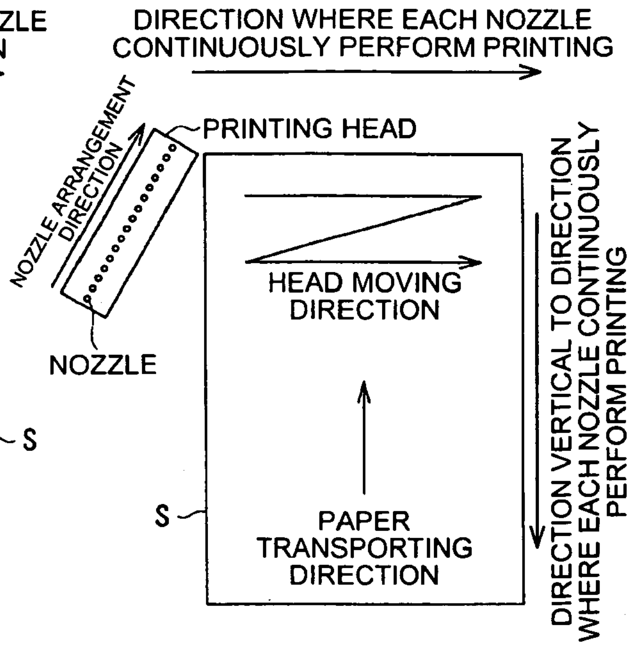
FIG. 27B is a diagram illustrating an example of a structure of a printing head of a multipass-type printer.
Figure 27C:
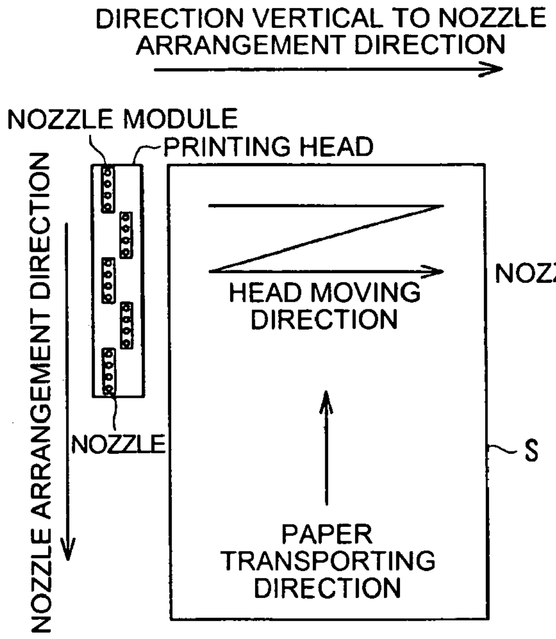
FIG. 27C is a diagram illustrating an example of a structure of a printing head of a multipass-type printer.
Figure 27D:
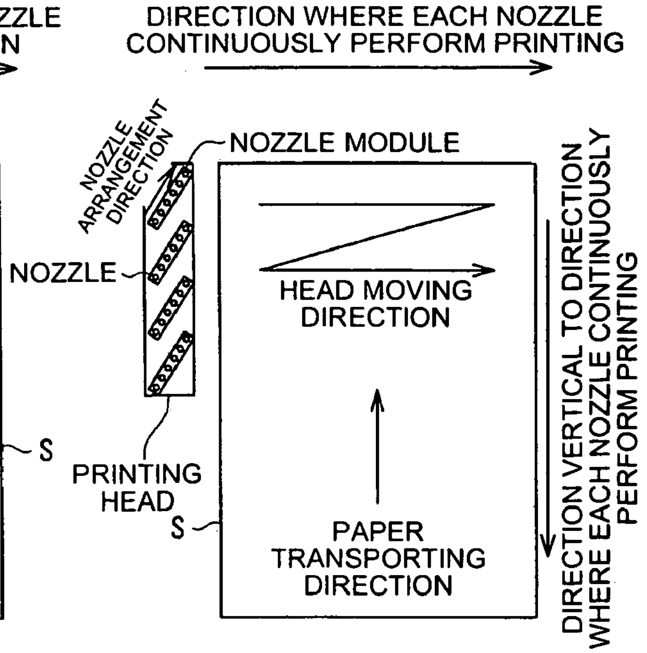
FIG. 27D is a diagram illustrating an example of a structure of a printing head of a multipass-type printer.

In addition, the example of the structure of FIG. 27C corresponds to the short printing head having the structure in which the plurality of short nozzle modules are not linearly disposed but disposed at locations different from each other in the width direction, in each of which the plurality of nozzles are linearly disposed in the same direction as the width direction of the rectangular printing paper S. The structure example of FIG. 27C is a structure obtained by dividing the single nozzle module into the plurality of nozzle modules, and has the same structure as the structure example of FIG. 27A. Therefore, 'the nozzle arrangement direction' becomes the width direction of the printing paper S and 'the direction perpendicular to the nozzle arrangement direction' becomes the longitudinal direction of the printing paper S and 'the printing direction'. In the meantime, similar to the structure example of FIG. 27B, the structure example of FIG. 27D corresponds to the short printing head which has a structure in which the plurality of nozzles are disposed in a slant direction with respect to the longitudinal direction of the printing paper S. In this structure example shown in FIG. 27D, the plurality of short nozzle modules in each of which the plurality of nozzles are disposed in a slant direction are disposed in the longitudinal direction of the printing paper S in a state in which they are slanted with respect to the corresponding longitudinal direction. The structure example of FIG. 27D is a structure obtained by dividing the single nozzle module into the plurality of nozzle modules, and has the same structure as the structure example of FIG. 27B. Therefore, the width direction of the printing paper S becomes 'the direction where the respective nozzles are continuously disposed', and the longitudinal direction of the printing paper S becomes 'the direction perpendicular to the direction where the respective nozzles are continuously disposed'.

The invention can be applied to not only the printing head having the structure in which 'the nozzle arrangement direction' is perpendicular to 'the printing direction', as in the line-head-type printing head shown in FIGS. 26A and 26C and the multipass-type printing head shown in FIGS. 27A and 27C, but also the printing head having the structure in which 'the nozzle arrangement direction' is not perpendicular to 'the printing direction' as in the line-head-type printing head shown in FIGS. 26B and 26D and the multipass-type printing head shown in FIGS. 27B and 27D.

What is claimed is:

1. A printing device which prints an image on a printing medium by a printing head, the printing head having a plurality of nozzles for forming a dot on the printing medium, the printing device comprising:

a printing unit that executes a printing process for reducing deterioration of a printed image quality caused by a banding phenomenon;

a characteristic information extracting unit that extracts characteristic information for every predetermined region of the image; and a printing control unit that controls the printing process for reducing the deterioration based on nozzle information indicating a characteristic of each nozzle and the characteristic information for every predetermined region of the image;

wherein the characteristic information includes density information for every predetermined region of the image and for each color of ink corresponding to the printing head, and wherein the characteristic information extracting unit extracts density information for every predetermined region of the image and for each color of ink corresponding to the printing head.

2. The printing device according to claim 1, further comprising a printing data creating unit that performs a process of creating information concerning dot forming contents of each pixel value of the image, including information for reducing the deterioration of the printed image quality caused by the banding phenomenon with respect to at least a part of the image of the predetermined region which is determined by a deterioration determining unit that determines whether deterioration of a printed image quality is visible.

3. The printing device according to claim 1, wherein the characteristic information includes frequency information of the image of the predetermined region.

4. The printing device according to claim 3, wherein the frequency information includes edge information of the image of the predetermined region.

5. The printing device according to claim 3, wherein the characteristic information extracting unit extracts the frequency information for each color of ink corresponding to the printing head.

6. The printing device according to claim 3, further comprising a printing data creating unit that performs a creating process of information including the information for reducing the deterioration of a printed image quality caused by the banding phenomenon as information about dot forming contents with respect to at least a part of image data of the image of the predetermined region which is determined by a deterioration determining unit that determines whether deterioration of the printed image quality is visible.

7. The printing device according to claim 1, wherein the nozzle information includes information indicating whether an ink ejection failure of each nozzle exists.

8. The printing device according to claim 1, wherein the nozzle information includes information of a positionally deviated amount between an actual forming position of the dot and an ideal forming position of the dot in each nozzle.

9. The printing device according to claim 1, wherein the nozzle information includes information about a deviated amount between a density value of the dot which each nozzle actually forms and an ideal density value of the corresponding dot.

10. The printing device according to claim 1, wherein in the printing head, the nozzles are continuously arranged over a range larger than a region where the printing medium is mounted, and the printing head can perform printing through one scanning operation.

11. The printing device according to claim 1, wherein the printing head performs printing while performing a reciprocal motion in a direction orthogonal to a transporting direction of the printing medium.

* * * * *